(12) United States Patent
Takagi

(10) Patent No.: US 7,034,755 B2
(45) Date of Patent: Apr. 25, 2006

(54) MOBILE RADIO COMMUNICATION APPARATUS

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 10/790,878

(22) Filed: Mar. 3, 2004

(65) Prior Publication Data

US 2005/0035912 A1  Feb. 17, 2005

(30) Foreign Application Priority Data

Aug. 14, 2003 (JP) ............................. 2003-293360

(51) Int. Cl.
*H01Q 1/24* (2006.01)
(52) U.S. Cl. ....................................... 343/702; 455/90
(58) Field of Classification Search ................ 343/702; 455/90, 90.1, 575, 550
See application file for complete search history.

(56) References Cited

U.S. PATENT DOCUMENTS

| | | | |
|---|---|---|---|
| 5,926,748 A * | 7/1999 | Yoshihara et al. | 455/575.7 |
| 6,208,874 B1 * | 3/2001 | Rudisill et al. | 455/575.4 |
| 6,782,273 B1 * | 8/2004 | Ono et al. | 455/575.4 |
| 2002/0173281 A1 | 11/2002 | Kobayashi | 455/90 |

FOREIGN PATENT DOCUMENTS

| | | |
|---|---|---|
| EP | 975 131 | 1/2000 |
| FR | 2 791 842 | 10/2000 |
| FR | 2 812 975 | 2/2002 |
| JP | 8-065369 | 3/1996 |
| JP | 2002-295446 | 10/2002 |
| WO | WO 00/69150 | 11/2000 |

OTHER PUBLICATIONS

European Search Report corresponding to Application No. 04005251.6-2414-dated Oct. 14, 2004.
Patent Abstracts of Japan, JP 2001 165144, vol. 2000, No. 23, Feb. 10, 2001.
Office Action dated Mar. 31, 2005, for related Application No. 04 005 251.6.

* cited by examiner

*Primary Examiner*—Trinh V Dinh
*Assistant Examiner*—Huedung X. Cao
(74) *Attorney, Agent, or Firm*—Staas & Halsey LLP

(57) ABSTRACT

A mobile radio communication apparatus includes a first housing, a second housing foldable over the first housing, and a hinge part that foldably connects the second housing to the first housing around a rotational center axis, wherein the hinge part includes a one touch opening part that automatically opens the second housing from a folded state by a first angle relative to the first housing around the rotational center axis in a non-stop motion, an auxiliary rotational part that rotates the second housing around an orthogonal shaft orthogonal to the rotational center axis of the hinge part, and an opening permission section that allows the second housing to open at an angle greater than the first angle relative to the first housing.

18 Claims, 42 Drawing Sheets

MOBILE RADIO COMMUNICATION APPARATUS

This application claims the right of priority under 35 U.S.C. §119 based on Japanese Patent Application No. 2003-293360, filed on Aug. 14, 2003, which is hereby incorporated by reference herein in its entirety as if fully set forth herein.

BACKGROUND OF THE INVENTION

The present invention relates generally to a foldable portable phone (which includes a personal digital cellular ("PDC") and a personal handy phone system ("PHS")), and another mobile communication terminal, which are generically referred to as "mobile radio communication apparatus" in the instant application, and more particularly to an internal structure of its hinge part.

Recent widespread mobile radio communication apparatuses, such as PDCs, have roused various demands including operational comfortableness and safety, apparatus's versatility and smaller housing, etc. in addition to mere communications.

In general, there are two types of portable phones, i.e., foldable portable phones and non-foldable, rod-shaped portable phones. The foldable portable phones typically include a movable part that contains a liquid crystal display ("LCD") screen, a fixed part that contains a ten-key, and a hinge part that connects them foldably. Some foldable portable phones include a free stop function, a one touch opening function, and a safety-improving oil damper (see, for example, Japanese Patent Applications Publications Nos. 2002-344597, 2001-165144, 2001-177266 and 10-65778).

The free stop function is one that maintains an arbitrary angle between the movable part and the fixed part. The one touch opening function is one that automatically opens the movable part when a push button on the fixed part is pressed. The oil damper is such a damper as stores oil in a hinge part's case, and uses oil's viscosity to absorb vibrations when the movable part opens.

A structure has been proposed which prevents damages of the hinge part when the movable part located at an open position receives the load for further opening (see, for example, Japanese Patent Applications Publications Nos. 8-65369 and 2002-295446).

However, these conventional portable phones do not sufficiently satisfy operational comfortableness and safety for calling and non-calling functions.

For example, the ergonomically best angle for calling operations between the movable and fixed parts is between 160° and 170° (referred to as the "best call angle" hereinafter). When an angle between the movable and fixed parts is smaller than the best call angle, a user should manually open the movable part up to the best call angle.

In this respect, Japanese Patent Application Publication No. 2001-165144 discloses, at its paragraph no. 0034, use of a one touch opening function to open an angle at "about 145°" for call. However, a user should actually open the angle to the best call angle, and such twice opening deteriorates the operability and delays starting calling. Similarly, Japanese Patent Application Publication 2001-177266 uses a one touch opening part for opening up to an angle to 20°, and requires subsequent manual opening up to 165°, deteriorating the operability, as disclosed at its paragraph nos. 0014 and 0015.

On the other hand Japanese Patent Applications Publications Nos. 2002-344597 and 10-65778 disclose a one touch opening function for non-stop opening up to the best call angle. However, an opening angle set to the best call angle in a non-stop motion causes a large reaction to be applied at the opening time undesirably and unsafely, such as hopping from a user's hand. In particular, Japanese Patent Application Publication No. 10-65778 provides the movable part with a push button for the one touch opening part, as shown in its FIG. 11, and enables a fixed part to open by its own weight. In view of the fact that the user usually holds the fixed part and enters a telephone number in transmission, the operability deteriorates when a hand holding the movable part changes its position to the fixed part.

Thus, a one touch opening part has not been proposed with excellent operational comfortableness and safety.

In addition, the recently required versatility, such as a camera function and an Internet access function, users need to place, on a desk or another location, a portable phone that inclines by a predetermined open angle, and to view or take a still and motion picture while maintaining the predetermined open angle (or predetermined camera angle). A free stop function has accordingly been required for this versatility.

Thus, recently required high-performance and versatile portable phones need to have a one touch opening function that safely opens the housing up to the best call angle in placing a call, and a free stop function for features other than the call function. As well as these functions, the portable phone should be maintained small. For example, as in Japanese Patent Application Publication No. 2001-165144, a lock/unlock part engaged with a push button for the one touch opening part would undesirably make the housing large when arranged as a separate member at a different position from a forcing part that opens the mobile part from the fixed part.

Those disclosed in Japanese Patent Applications Publications Nos. 8-65369 and 2002-295446 can prevent damages of a hinge in a foldable portable phone that is subject to the excessive load. Nevertheless, the recent portable phones include various functions, such as photographing, games, and accessing to the Internet, and thus are used very frequently. It is thus very convenient for a user who frequently opens and closes the portable phone to prevent hinge's damages and to enable the movable part to rotate around an orthogonal shaft. On the other hand, it is difficult to miniaturize the portable phone as well as enhancing the structural strength of this orthogonal shaft, and thus it is very important to prevent the orthogonal shaft's damages.

BRIEF SUMMARY OF THE INVENTION

Accordingly, with the foregoing in mind, it is an exemplified object of the present invention to provide a mobile radio communication apparatus that improves operational comfortableness and safety for a call function and a secondary function (such as a camera function) as well as maintaining a miniaturization.

A mobile radio communication apparatus of one aspect according to the present invention includes a first housing, a second housing foldable over the first housing, and a hinge part that foldably connects the second housing to the first housing around a rotational center axis, wherein the hinge part includes a one touch opening part that automatically opens the second housing from a folded state by a first angle relative to the first housing around the rotational center axis in a non-stop motion, an auxiliary rotational part that rotates the second housing around an orthogonal shaft orthogonal to the rotational center axis of the hinge part; and an opening permission section that allows the second housing to open at an angle greater than the first angle relative to the first housing.

According to this structure, the one touch opening part opens the second housing up to the best call angle, and improves the operability for calling. Non-stop opening to the best call angle would quicken a response to an incoming call, for example. The second housing that is rotatable around the orthogonal shaft orthogonal to the rotational center axis of the hinge part conveniently enables a user, for example, to enjoy the Internet, photographing, games, etc., by inclining the second housing in various directions. Since the opening permission section allows the second housing to open at an angle greater than the first angle relative to the first housing, the user can use this movable radio communication apparatus at the first angle for normal uses, and increase its opening angle greater than the first angle if necessary.

The opening permission section may allow the second housing to open at an angle greater than the first angle relative to the first housing, when a rotation moment applied to the second housing in an opening direction is equal to or greater than a predetermined rotation moment. Thereby, a large load (or rotation moment) can be mitigated or absorbed which would otherwise force the second housing to further open in this mobile radio communication apparatus that opens at the first angle. Thus, the orthogonal axis, housing, hinge part, etc. can be prevented from getting damaged, and this mobile radio communication apparatus can be used safely and comfortably. The opening permission section may not allow the second housing to open at an angle greater than the first angle relative to the first housing, when a rotation moment applied to the second housing in an opening direction is smaller than a predetermined rotation moment.

The opening permission section may reset an angle between the first and second housings to the first angle, when a rotation moment applied to the second housing in an opening direction changes from a value equal to or greater than a predetermined rotation moment to a value smaller than the predetermined rotation moment. Thereby, the orthogonal axis, housing, hinge part, etc. can be prevented from getting damaged, and the large load in the opening direction can be eliminated. Conveniently, this mobile radio communication apparatus can be used comfortably as usual.

The opening permission section allows opening, only the second housing or the second housing and the hinge part may rotate relative to the first housing by the angle greater than the first angle.

The opening permission section may be a stopper provided on the first housing, the stopper supporting a rear surface of the second housing. Thereby, the hinge part does not have to accommodate the opening permission section, and can simplify its structure. In addition, the stopper that supports the rear surface of the second housing can securely stop the second housing at the first angle. The stopper may elastically deform or rotate around a rotational axis parallel to the rotational center axis, in allowing the second housing to open at an angle greater than the first angle relative to the first housing. Thereby, the opening permission section has a simple structure.

The opening permission section may include a cam member, such as a ball cam and an angled cam, provided on the hinge part. Thereby, this mobile radio communication apparatus does not expose the opening permission section, and can simplify its appearance. In addition, the apparatus can be made small entirely.

The hinge part may include a free stop part that maintains the second housing at a second angle different from the first angle relative to the first housing. The free stop part may not work while the second housing that has been opened by the one touch opening part is being folded. The free stop part may work while the second housing that has been opened by the one touch opening part is being folded.

The hinge part may further include a damper part that brakes an opening action of the second housing by the one touch opening part. Thereby, the second housing quickly opens due to the one touch opening part, while reducing the reaction to the opening. Therefore, this mobile radio communication apparatus does not hop from the user's hand as a result of the one touch opening, and improves safety. The damper part may brake the second housing when the second housing forms a third angle or larger relative to the first housing.

A hinge part of another aspect according to the present invention that foldably connects a first housing includes a one touch opening part that automatically opens the second housing from a folded state by a first angle relative to the first housing around the rotational center axis in a non-stop motion, an auxiliary rotational part that rotates the second housing around an orthogonal shaft orthogonal to the rotational center axis of the one touch opening part, and an opening permission section that allows the second housing to open at an angle greater than the first angle relative to the first housing.

According to this structure, the one touch opening part opens the second housing up to the best call angle, and improves the operability for calling. Non-stop opening to the best call angle would quicken a response to an incoming call, for example. The second housing that is rotatable around the orthogonal shaft orthogonal to the rotational center axis of the hinge part conveniently enables a user, for example, to enjoy the Internet, photographing, games, etc., by inclining the second housing in various directions. Since the opening permission section allows the second housing to open at an angle greater than the first angle relative to the first housing, the user can use this movable radio communication apparatus at the first angle for normal uses, and increase its opening angle greater than the first angle if necessary.

Other objects and further features of the present invention will become readily apparent from the following description of preferred embodiments with reference to the accompanying drawings.

BRIEF DESCRIPTION OF THE DRAWINGS

FIG. 9 is a view near a push button, wherein

FIG. 22 is a view for explaining a structure of an auxiliary rotational part, wherein

FIG. 28 is a schematic sectional view of a hinge unit in the hinge part shown in FIG. 27, wherein

DETAILED DESCRIPTION OF THE PREFERRED EMBODIMENTS

Figure 2:
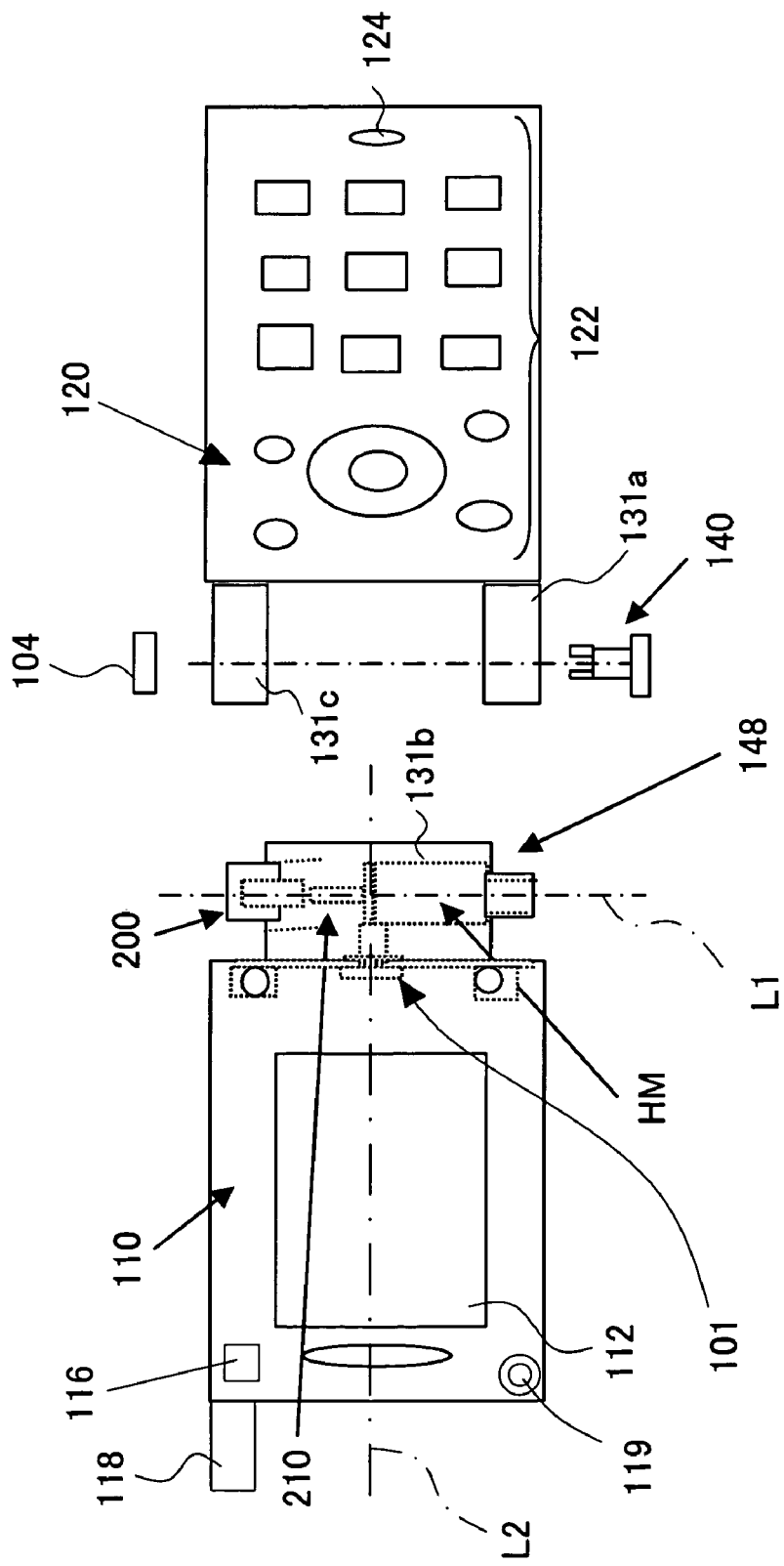
FIG. 2 is an exploded plane view of a hinge part having a trichotomous structure in the portable phone shown in FIG. 1.
Figure 3A:
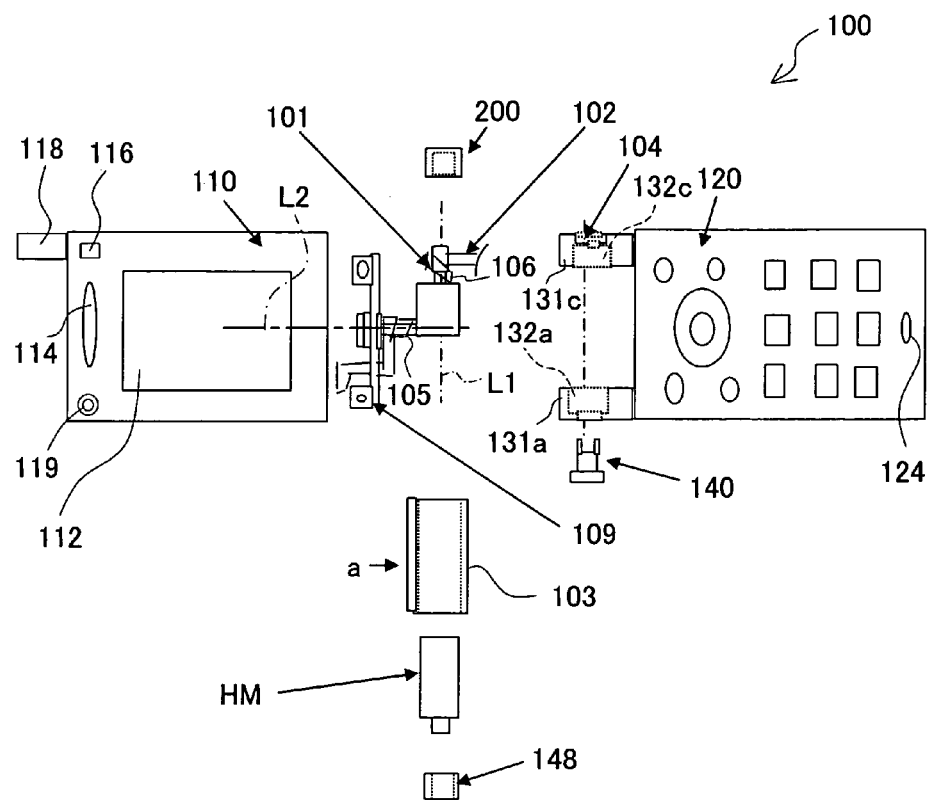
FIG. 3 is an exploded plane view of the hinge part shown in FIG. 2.
Figure 3B:
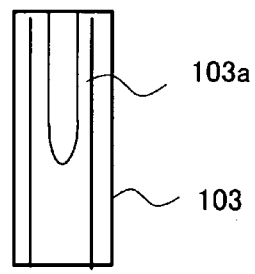

A description will be given of a PDC 100 as an exemplary mobile radio communication apparatus ("MRCA") as one embodiment according to the present invention, with reference to the accompanying drawings. Here, FIG. 1A is a plane view of the PDC 100, FIGS. 2 and 3A are schematic exploded plane view of a hinge part 130 in the PDC 100. FIG. 3B is a view of a hinge cover 103 used for the hinge part 130 in an arrow direction "a".

Description of One Touch Opening Part and Free Stop Part

Figure 1:
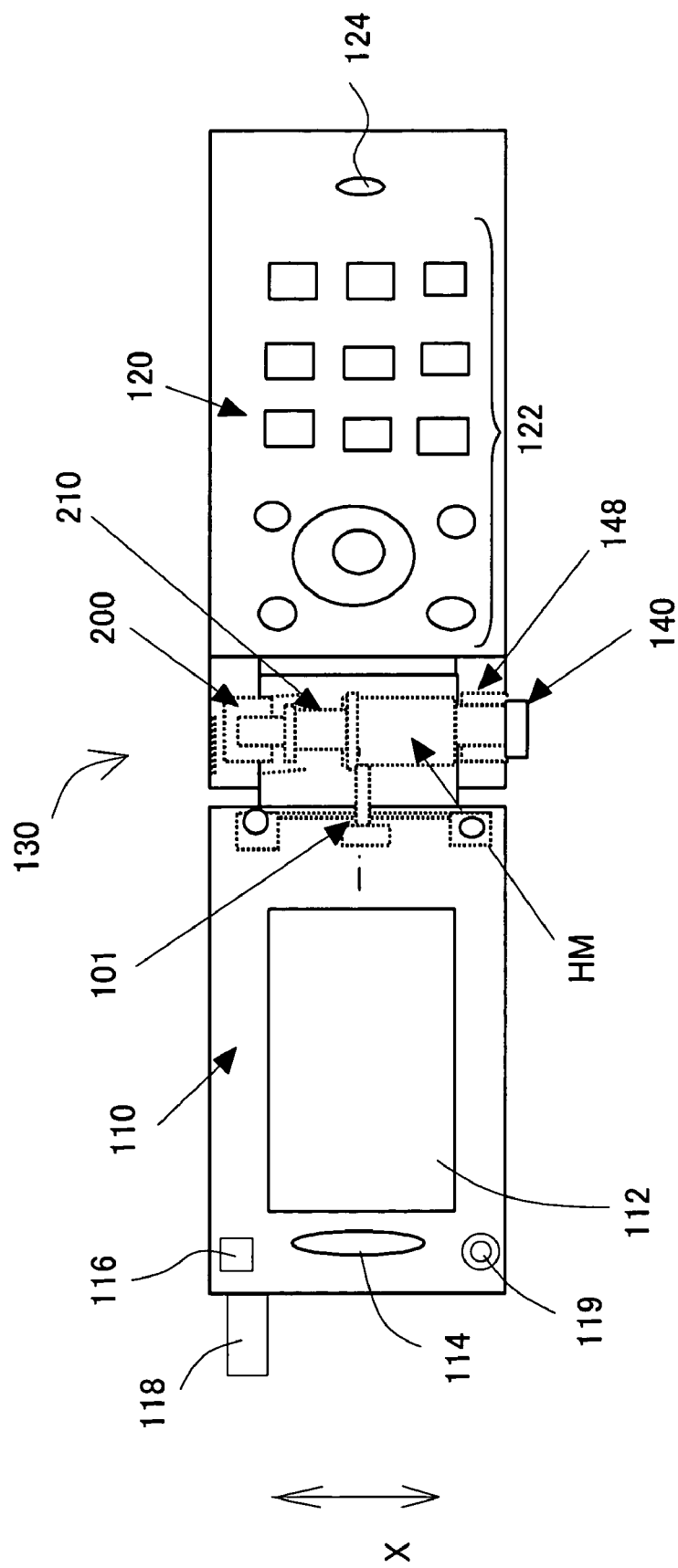
FIG. 1 is a plane view of a portable phone of as an exemplary mobile radio communication apparatus of one embodiment according to the present invention.

The PDC 100 roughly includes, as shown in FIG. 1, a movable-side housing (or a second housing) 110, a fixed-side housing (or a first housing) 120, and a hinge part 130. The hinge part 130 includes a one touch opening part, a damper part, a free stop part, and an auxiliary rotational part 101. The PDC 100 is a foldable portable phone that folds the movable-side housing 110 over and opens the movable-side housing 110 from the fixed-side housing 120 through the hinge part 130. The auxiliary rotational part 101 makes the movable-side housing 110 rotatable relative to the fixed-side housing 120 around an orthogonal rotational axis L2 that is orthogonal to a rotational center axis L1 for folding and opening by the hinge part 130. An opening permission section is provided in or near the hinge part 130, and permits the movable-side housing 110 to open by a first angle greater than the best call angle, as described later. The following description focuses on the one touch open part and free stop part, and the auxiliary rotational part will be discussed later.

The movable-side housing 110 includes a LCD screen (or a display) 112, a speaker 114, an LED 116, an antenna 118, and a lens 119. The LCD screen 112 indicates date and time, calling and called parties' numbers, battery residue, radio-wave strength mark, an out-of-range mark, and various functions. The speaker 114 outputs communicatee's voices and various functions' sounds or voices. The LED 116 indicates various statuses of the PDC 100, such as an incoming call and charging. The antenna 118 is extendable and used to communicate with base or other stations. The lens 119 provides a PDC with a camera function (such as a video camera and/or a still camera), and can be located on a rear surface or another surface of the movable-side housing 110 shown in FIG. 1. The PDC 100 of the instant embodiment can access the Internet through an access point. Each of these components 112 to 119 can use any technology known in the art, and a detailed description thereof will be omitted.

The movable-side housing 120 includes a ten-key (or operational buttons) as an input part 122, and a microphone 124. The ten-key 122 includes not only the ten-key for entries of communicatees' telephone numbers, but also input part of various symbols, alphabets, function keys (such as buttons and controllers), a power on/off part, etc. The microphone 124 receives user's audio inputs. The ten-key 122 and microphone 124 can also use any technology known in the art, and a detailed description thereof will be omitted.

The hinge part 130 foldably connects the movable-side housing 110 to the fixed-side housing 120, and has a dividable structure. The hinge structure of the instant embodiment has, but not limited to, a trichotomic or three-part structure, and may have a pentamerous or five-part structure. The hinge part 130 apparently has, as shown in FIGS. 2 and 3, a pair of convexes 131a and 131c at both sides of the fixed-side housing 120, and a convex 131b connected to the movable-side housing 110 via the auxiliary rotational part 101 between the pair of convexes. FIG. 2 is a partial transmission view of a convex 131b's structure in the movable-side housing 110 separated from the fixed-side hosing 120. FIG. 3 is a schematic exploded plane view of the convex 131b's structure in the movable-side housing 110.

Figure 5:
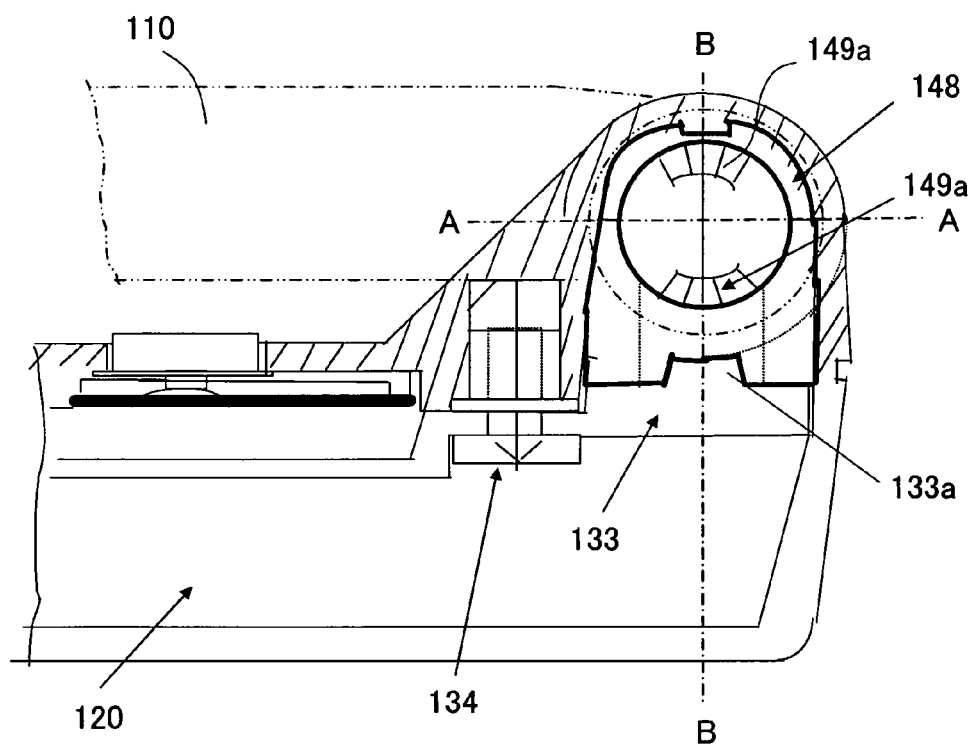
FIG. 5 is a schematic sectional view showing a bush attached to the hinged part.
Figure 15:
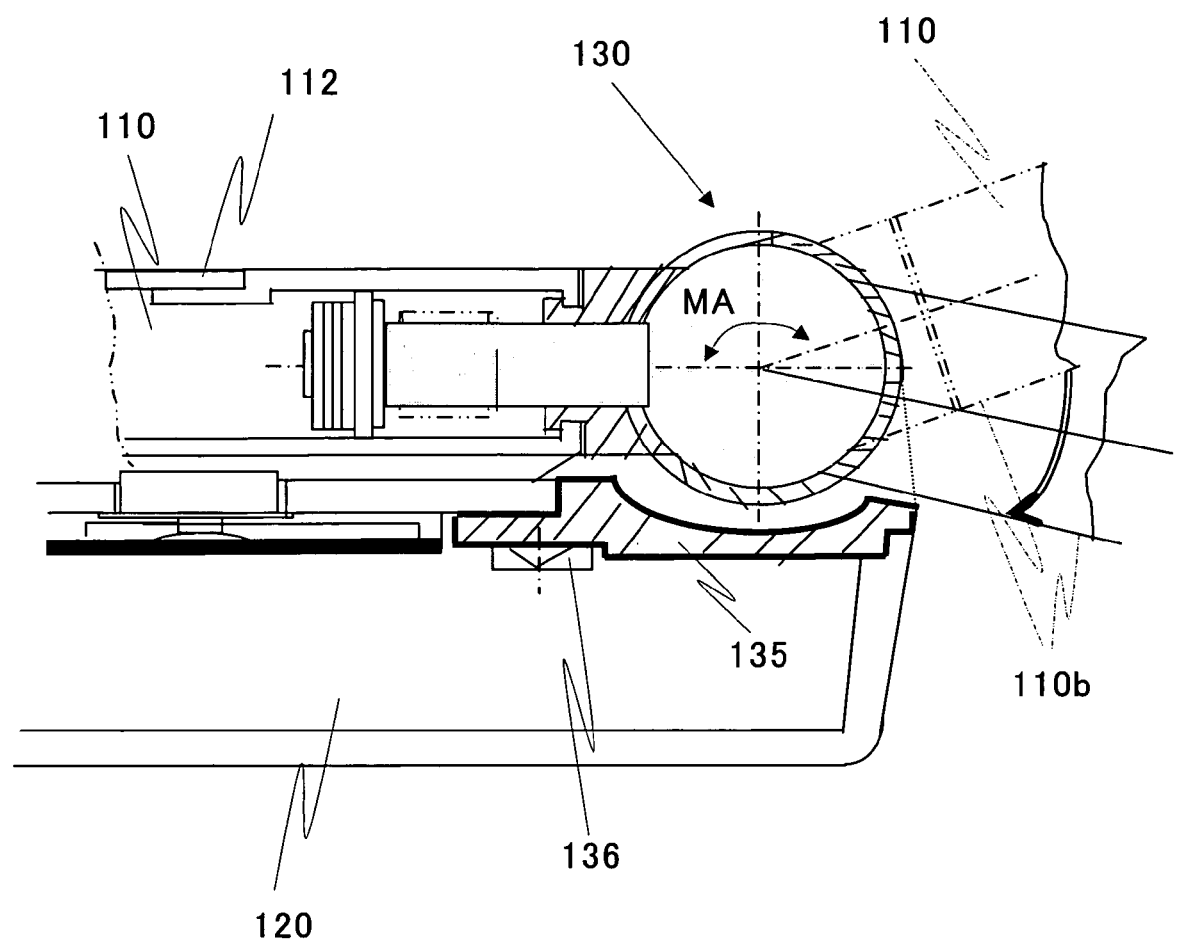
FIG. 15 is a schematic sectional view for explaining a restriction part of an opening angle of a movable-side housing shown in FIG. 1.

As shown in FIG. 3, the convex 131a forms a hollow accommodation part 132a, and the convex 131c forms a hollow accommodation part 132c. As shown in FIG. 5, which will be described later, the fixed-side housing 120 fixes the fixation plate 133, which engages with and secures a bush 148. The convexes 131a and 131c are provided with a stopper 135 and a screw 136, as shown in FIG. 15, which will be described later.

The hinge cover 103 of the hinge part 130 accommodates a hinge module HM, and the auxiliary rotational part 101, and attaches bushes 148 and 200 to its both sides. The hinge module HM accommodates the one touch opening part, and the free stop part, making the PDC 100 small.

The one touch opening part allows the user to press the push button 140, and enables the folded movable-side housing 110 to automatically open relative to the fixed-side housing 120 around the hinge part 130 up to an angle between about 150° and about 170°, such as the best call angle (or a first angle) between about 160° and about 170°, in a non-stop motion, and to maintain the angle. While the instant embodiment sets a maximum opening angle less than 180°, the present invention does not limit the maximum opening angle to be between 150° and 170°, as described later. An angle "between about 150° and about 170°" means a callable angle that enables a user to call without further opening of the movable-side housing 120. An angle "between about 160° and about 170°" is the ergonomically best angle for calling. The one touch opening part in the instant embodiment attempts to open the movable-side housing 110 from 0° (where the movable-side housing 110 is completely folded over the fixed-side housing 120) to the best call angle in a non-stop motion, but allows a slight offset from that range. In the following description, the one touch opening part conveniently opens the movable-side housing 110 by the best call angle from the fixed-side housing 120.

The free stop part maintains an angle between the movable-side housing 110 and the fixed-side housing 120 to be an arbitrary angle as a second angle (which is illustratively between 20° and 140° in the instant embodiment). The free stop part is convenient, for example, to photographing by a lens 119 and viewing of the Internet information on a desk. In the instant embodiment, the free stop part works when the user manually opens the movable-side housing 110 from the closed state, and does not work when the user closes the movable-side housing 110 that has been opened by the one touch open part. However, it is optional whether the free stop part works or does not work at the closing time.

Figure 4:
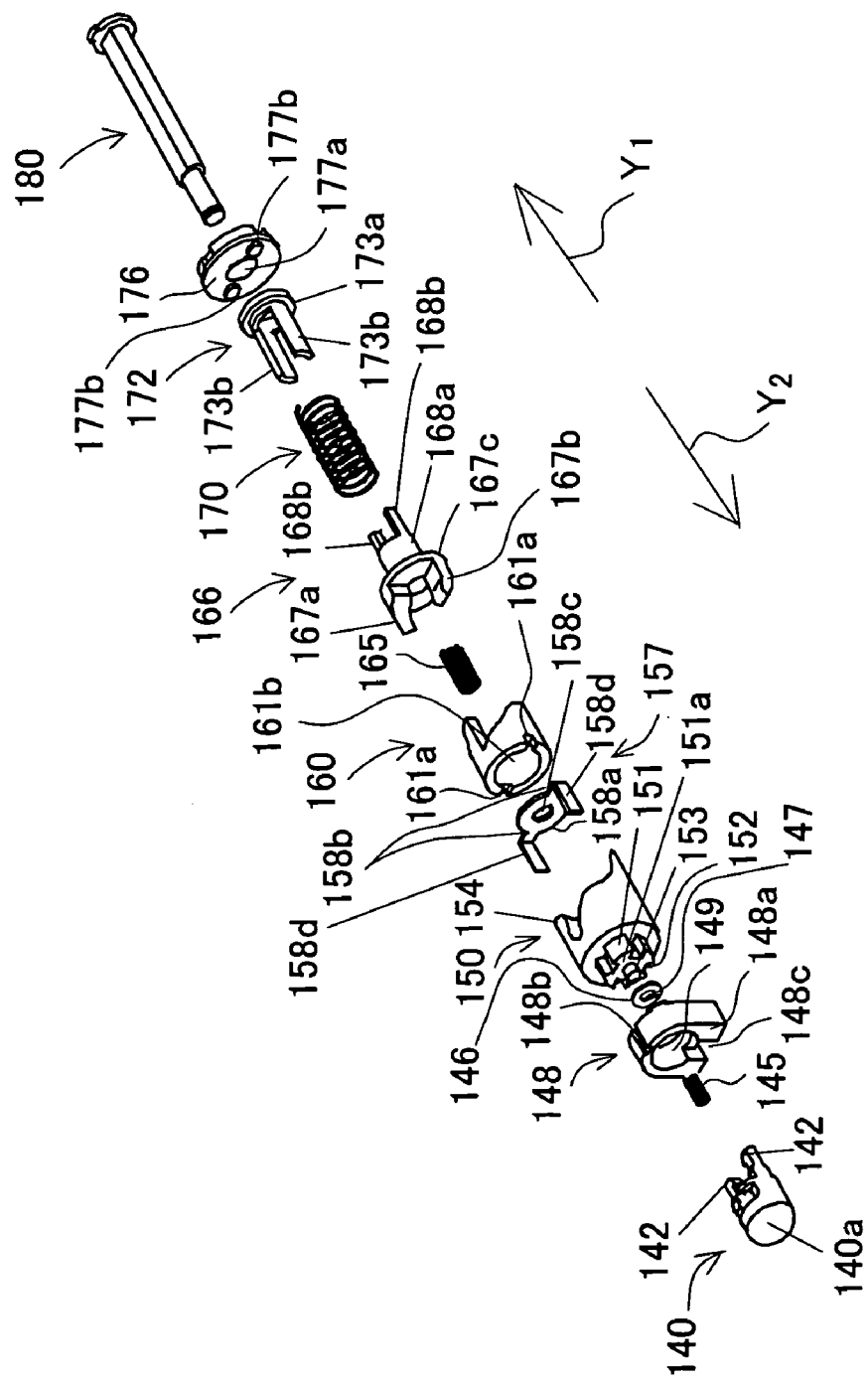
FIG. 4 is an exploded view of an exemplary structure of a part applicable to the hinge part in the portable phone shown in FIG. 2.
Figure 21:
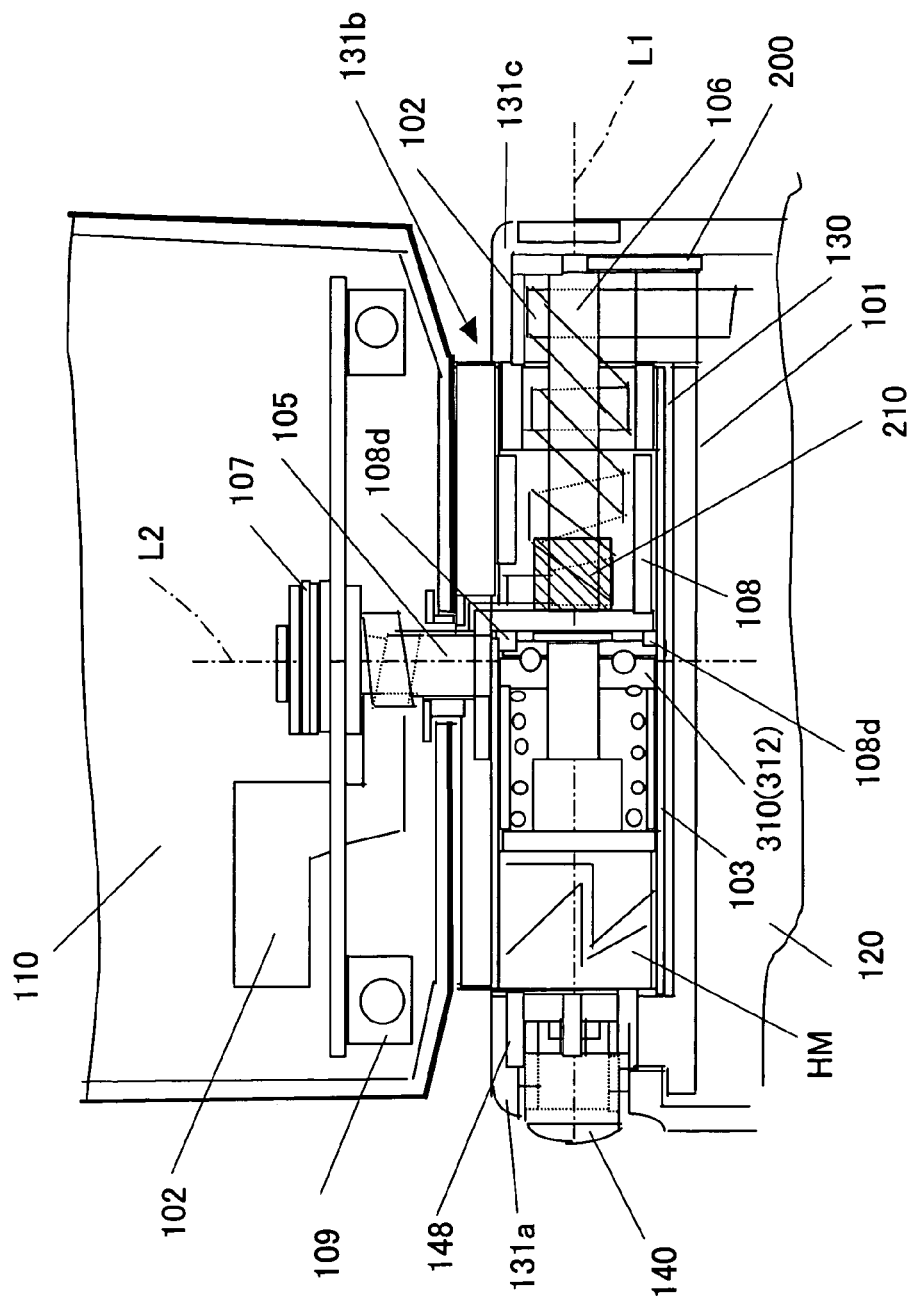
FIG. 21 is an enlarged sectional view of a structure near the hinge part in the portable phone shown in FIG. 1.

Since some members serve as both the one touch opening part and the free stop part in the instant embodiment, a description will now be given of them simultaneously. These versatile components attempt to miniaturize the part accommodated in the hinge part 130 and, in turn, the PDC 100. FIG. 4 is an exploded perspective view of an internal structure of the hinge part 130 schematically shown in FIGS. 2 and 3. FIG. 21 is a schematic sectional view when the part shown in FIG. 4 is installed into the hinge part 130 on the convex 130b.

The part shown in FIG. 4 inactivates the free stop part at the closing time when the one touch opening part has opened the movable-side housing 110, and enables the free stop part to work at the closing time when the user has manually opened the movable-side housing 110. The instant specification sometimes refers to this type of one touch opening/free stop part as a "two-way manner". The two-way manner enables a user not only to open the movable-side housing 110 in a non-stop motion by pressing the push button 140 with his left thumb when the user is in a hurry or uses his right hand for something, but also to manually open the movable-side housing 110 and maintain an arbitrary angle for a fine angular adjustment, for example, for camera functions. As discussed later, the present invention does not limit the part accommodated in the three-part hinge part 130 to the two-way manner.

Referring to FIG. 4, the hinge part 130 includes a push button 140, a compression spring 145, a bush 148, a retaining ring 146, an outer cam 150, a lock 157, an inner cam 160, a compression spring 165, a counter cam 166, a compression spring 170, free stop cams 172 and 176, and a shaft 180. Those members from the retaining ring 146 to the shaft 180 and the opening permission section, which will be described later, are schematically shown as the hinge module HM in FIGS. 1 to 3.

In assembly, the hinge module HM is inserted into the hinge cover 103, and the auxiliary rotational part 101 is inserted into the hinge cover 103 from an opposite side to the hinge module HM. In inserting the hinge module HM into the hinge cover 103, an orthogonal shaft 105 (which has an axial direction that accords with the orthogonal rotational axis L2) for the auxiliary rotational part 101 is inserted along a slit 103a in the hinge cover 103, as shown in FIGS. 3A and 3B. A flexible printed circuit board ("FPCB") 102 is wound around a shaft 106 of the auxiliary rotational part 101 (which shaft 106 has an axial direction that accords with the rotational center axis L1). A screw fixes the movable-side housing 110 onto the auxiliary rotational part 101. The bush 148 is attached to one side of the hinge cover 103 while engaged with the hinge module HM. The bush 200 is attached to the other side of the hinge cover 103. Thereafter, a snap fixes the bush 148 and squeezes the bush 148 into the convex 131a, and a snap fit fixes the push button 140 that houses the compression spring 145 and is squeezed into a side of the convex part 131a. The bush 200 is housed in the hollow accommodation part 132c in the convex 131c, and the cap 104 is attached to the other end of the fixed-side housing 120.

Figure 9A:
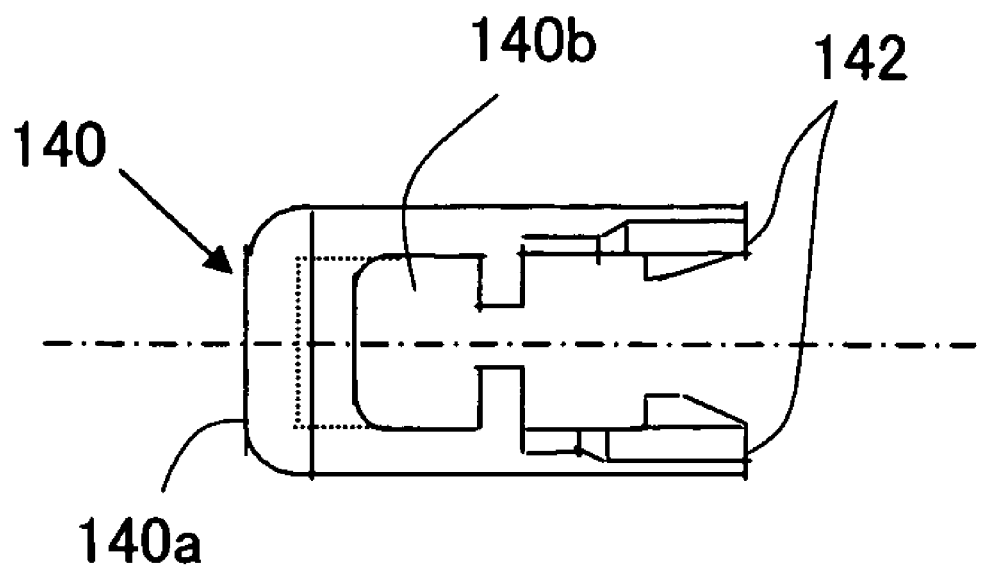
FIG. 9A is a sectional view of a push button shown in FIG. 7.
Figure 9B:
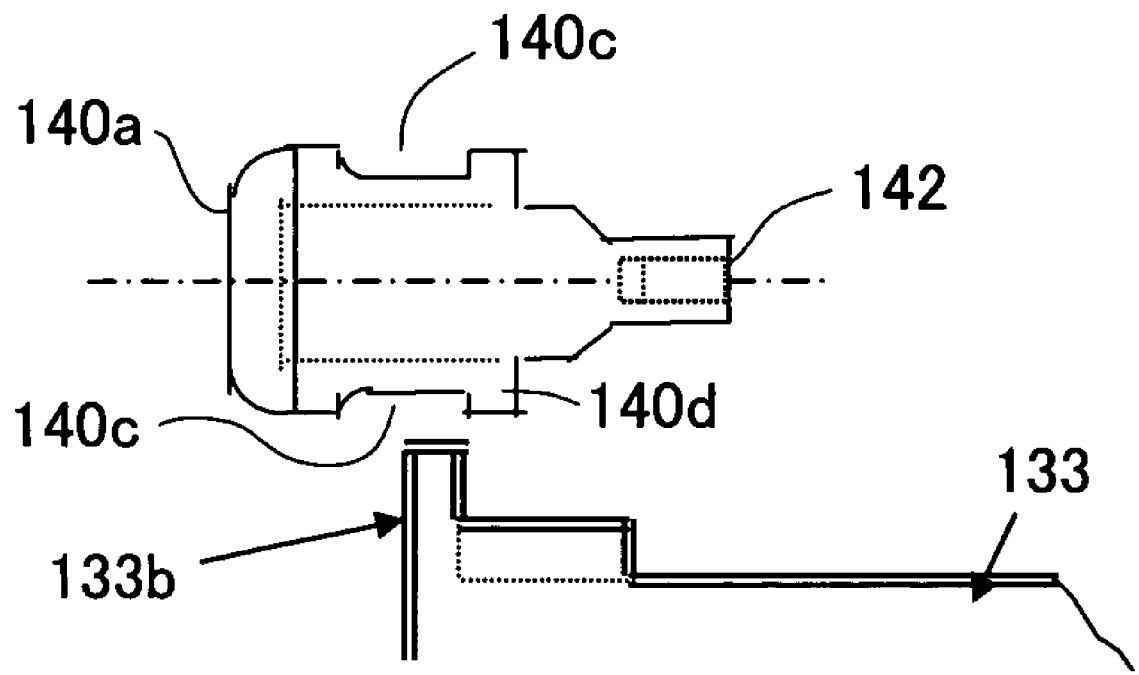
FIG. 9B is a push button and its falling-off preventative part shown in FIG. 8.

The push button 140 is schematically shown in FIGS. 2 and 3, and specifically includes, as shown in FIGS. 4 and 9, a compressed end 140a with an approximately hollow cylindrical shape, and a pair of engagement nails 142. Here, FIG. 9A is a sectional view of the push button 140, and FIG. 9B is a sectional view of the push button 140 and its falling-off preventative part.

The push button 140 projects from the hinge part 130, and is to be pressed by a user in one touch opening. The push button 140 when pressed releases the engagement between the lock 157 and the outer cam 150. The push button 140 is provided on the convex 131a in the instant embodiment, but may be provided apart from the hinge part 130 on the fixed-side housing 120. Anyway, the push button 140 is not provided on (the top of) the movable-side housing 110, and improves the operability since a user does not have to change his hand that holds the movable-side housing to the fixed-side housing after holding the movable-side housing and opening the housing, as in Japanese Patent Application Publication No. 10-65778.

Figure 7:
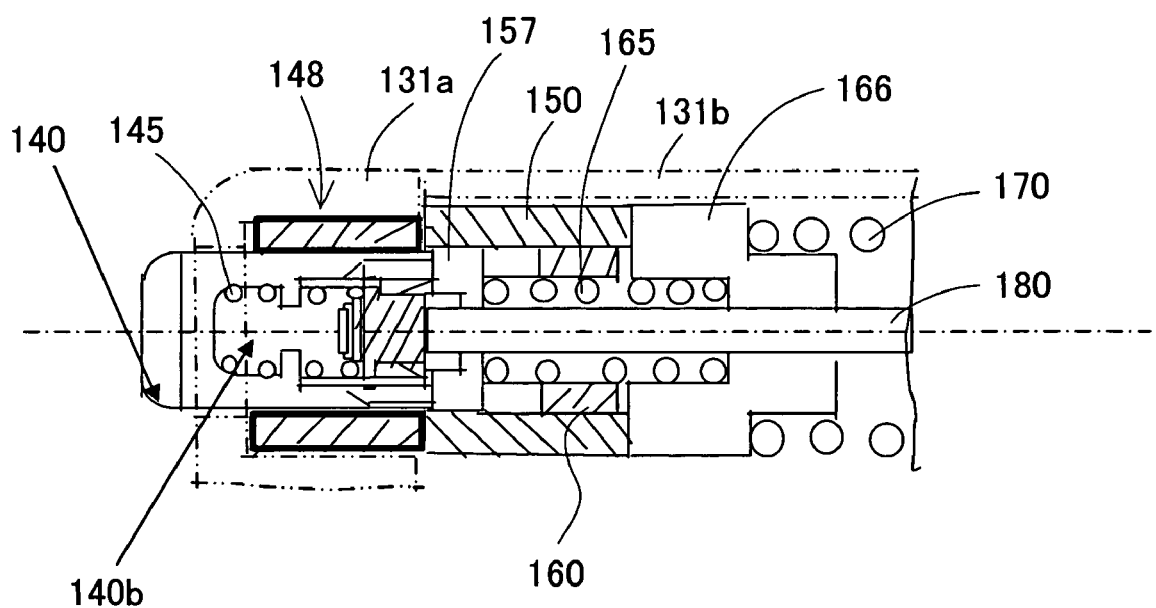
FIG. 7 is a sectional view taken along line A—A in FIG. 5.

The compressed end 140a is a portion subject to a compression force typically applied by the user's left thumb in the one touch opening. While the instant embodiment attaches the push button 140 at the left side of the hinge part 130 so that a right-handed user uses his right hand to make a note, etc. and his left hand to open the PDC 100, the push button 140 may be attached to the right side of the hinge part 130 for left-handed users. While the compressed end 140a has a smoothly chamfered cylindrical or spherical shape, the present invention does not limit a shape of the compressed end 140a. Therefore, the compressed end 140a may have another curved shape. A hollow part 140b is formed inside the compressed end 140a, and accommodates one end of the compression spring 145, as shown in FIG. 7. Here, FIG. 7 is a sectional view of the line A—A in FIG. 5.

The engagement nails 142 each have an approximately right triangle opposite to the compressed end 140a, as shown in FIG. 9A, and are engageable with two of four guide grooves 152 in the outer cam 150.

The push button 140 forms necks 140c on its sides, as shown in FIG. 9B. An insertion of the falling-off preventative projection 133b of the fixation plate 133 into the neck 140c and an engagement between the projection 133b and a wall 140d maintain the push button 140 in place without being fallen out of the hinge part 130 by the compression spring 145's compression force.

The compression spring 145 is a coil spring that serves to force the push button 140 in a projecting direction. One end of the compression spring 145 contacts the end of the hollow part 140b in the push button 140, and the other end contacts the retaining ring 146.

The retaining ring 146 is a partially cut ring or U shape, like an E or C ring, and engaged with the fixation part 151 of the outer cam 150. The retaining ring 146 may have a circular shape instead of a notched outer periphery shown in FIG. 4. The retaining ring 146 does not necessarily require a cutout, although a peripheral notch or cutout can secure a mechanical engagement between the retaining ring 146 and the bush 148. The retaining ring 146 has a perforation 147, which is engaged with a convex 153 of the outer cam 150. The retaining ring 146 supports the compression spring 145 on a surface at the side of the push button 140, and is mounted on a front surface 151a of the outer cam 150. The retaining ring 146 has an area enough to support the compression spring 145, but its size does not shield the guide grooves 152 from the engagement nails 142.

Figure 6:
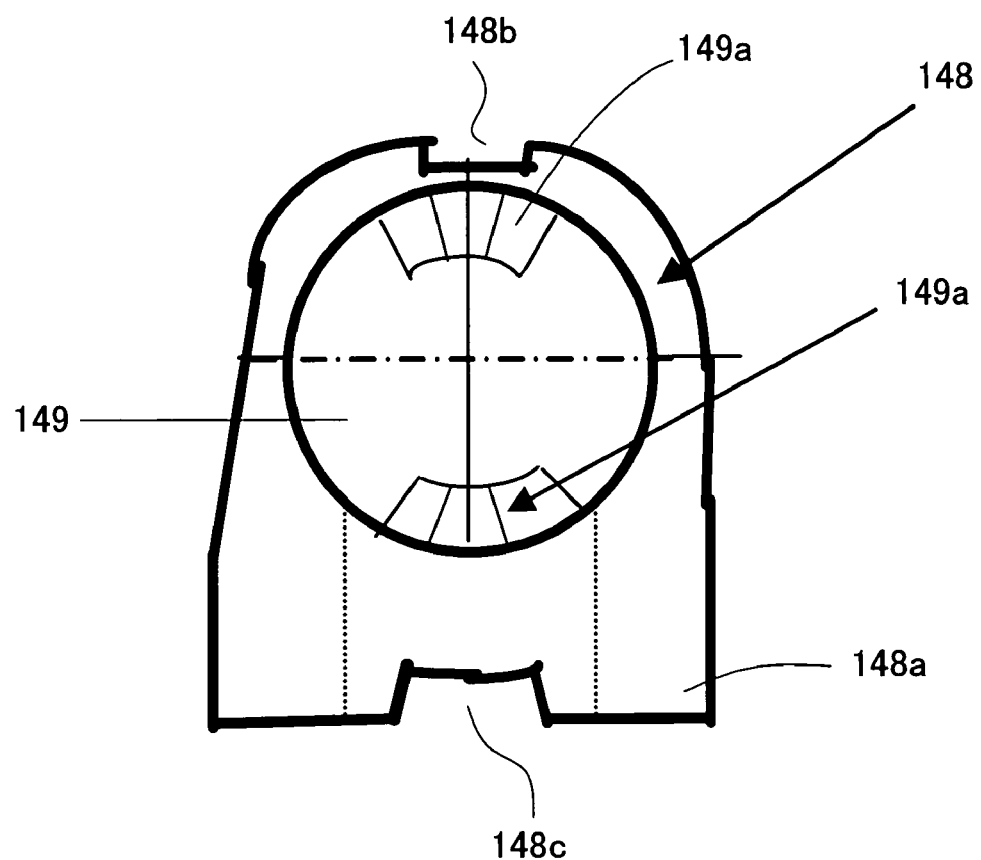
FIG. 6 is a plane view of a bush.

The bush 148 has a shape that combines a rectangle and a semicircle, as shown in FIGS. 4 to 6, and serves to fix the outer cam 150. Here, FIG. 5 is a sectional view of the bush 148 mounted on the hinge part 130, and FIG. 6 is a plane view of the bush 148.

The bush 148 forms a perforation 149 in its center, into which the push button 140, the fixation part 151 of the outer cam 150, the shaft 180 are inserted. The bush 148 has a rectangular support part 148a, and engagement grooves 148b and 148c as a notched part. The support part 148a and the engagement groove 148b are engaged with the convex 131a of the fixed-side housing 120. The engagement groove 148c is engaged with the engagement part 133a of the fixation plate 133 fixed on the fixed-side housing 120 via a screw 134. As a result, the bush 148 is non-rotatably fixed on the convex 131a in the fixed-side housing 120. A shape of the bush 148 is illustrative in the instant embodiment, and the bush 148 may have another shape as long as it is fixed onto the convex 131a.

Figure 8:
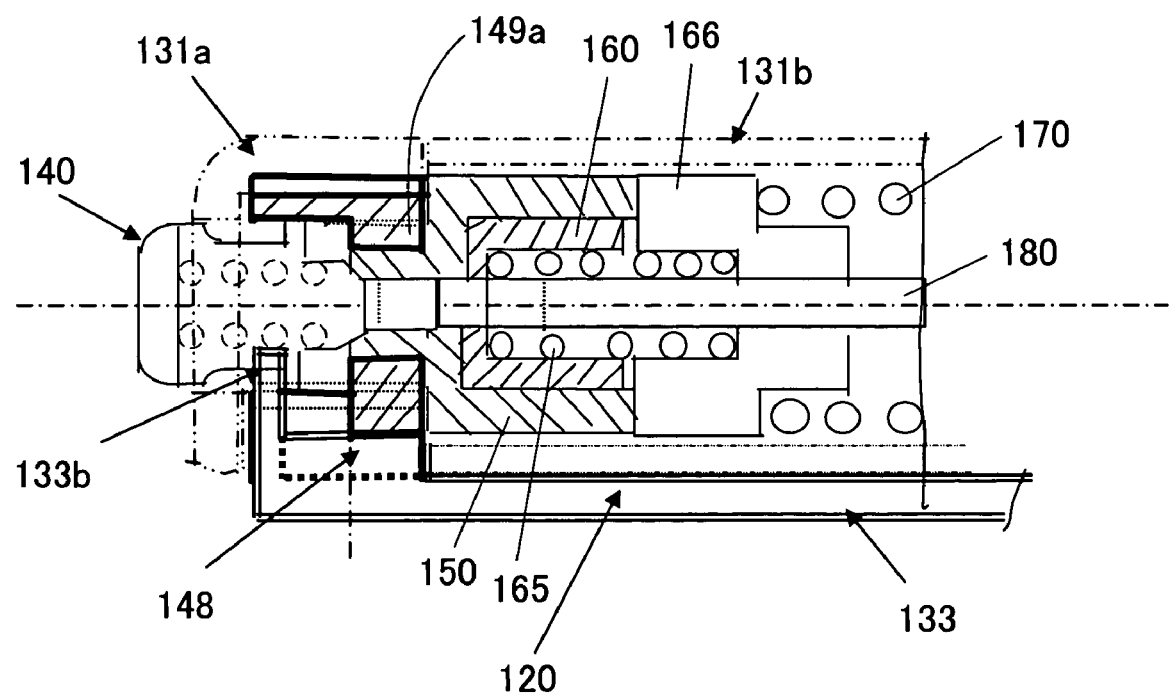
FIG. 8 is a sectional view taken along line B—B in FIG. 5.
Figure 14:
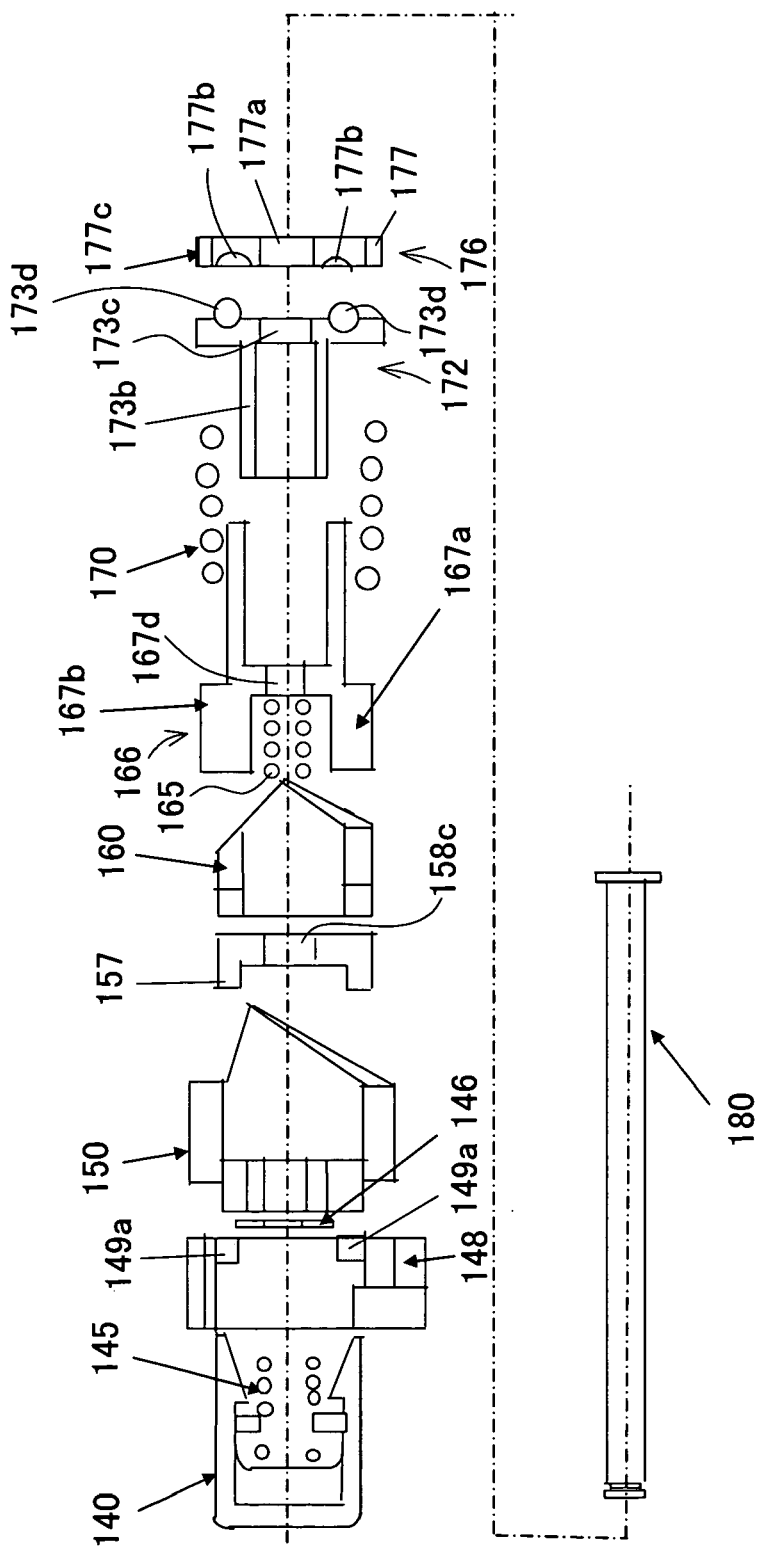
FIG. 14 is a schematic exploded sectional view of a part shown in FIG. 4.

The fixation part 151 of the outer cam 150 is inserted into the perforation 149, and the perforation 149 has a pair of engagement parts 149a, which are engageable with the pair of guide grooves 152 of the outer cam 150, as shown in FIGS. 8 and 14. As a result, the outer cam 150 is fixed non-rotatably onto the bush 148. Here, FIG. 8 is a sectional view taken along line B—B in FIG. 5. FIG. 14 is a schematic sectional view of the part shown in FIG. 4. The instant embodiment provides the bush 148 with the convex engagement parts 149a and the outer cam 150 with the guide grooves 152, but their relationship may be reversed.

The outer cam 150 moves the counter cam 166 in cooperation with the inner cam 160 to realize the one touch opening function, and has the fixation part 151 and a body 154.

The fixation part 151 projects in a direction $Y_2$ in FIG. 4, and has a pillar shape with an approximately cross or X-shaped section. The fixation part 151 has an approximately cylindrical convex part 153 at its center. The convex part 153 projects in the direction $Y_2$, and is inserted into the perforation 147 in the retaining ring 146. The fixation part 151 supports the retaining ring 146 on its front surface 151a. The front surface 151a has a completely or cut circular portion approximately as large as the retaining ring 146, and supports the retaining ring 146. The fixation part 151 is, for example, a cylinder bored with four circular or elliptical portions at intervals of 45°, and four bored portions as guide grooves 152 perforate the outer cam 150 in the direction $Y_2$. Since a pair of guide grooves 152 are engaged with the engagement parts 149a of the bush 148, as shown in FIG. 8, to fix the bush 148 in the fixed-side housing 120 as discussed, the outer cam 150 is fixed non-rotatably in the hinge part 130. A pair of arms 158d of the lock 157, which will be described later, and the engagement nail 142 of the pressed push button 140 can be inserted into the rest of two guide grooves 152.

Figure 11:
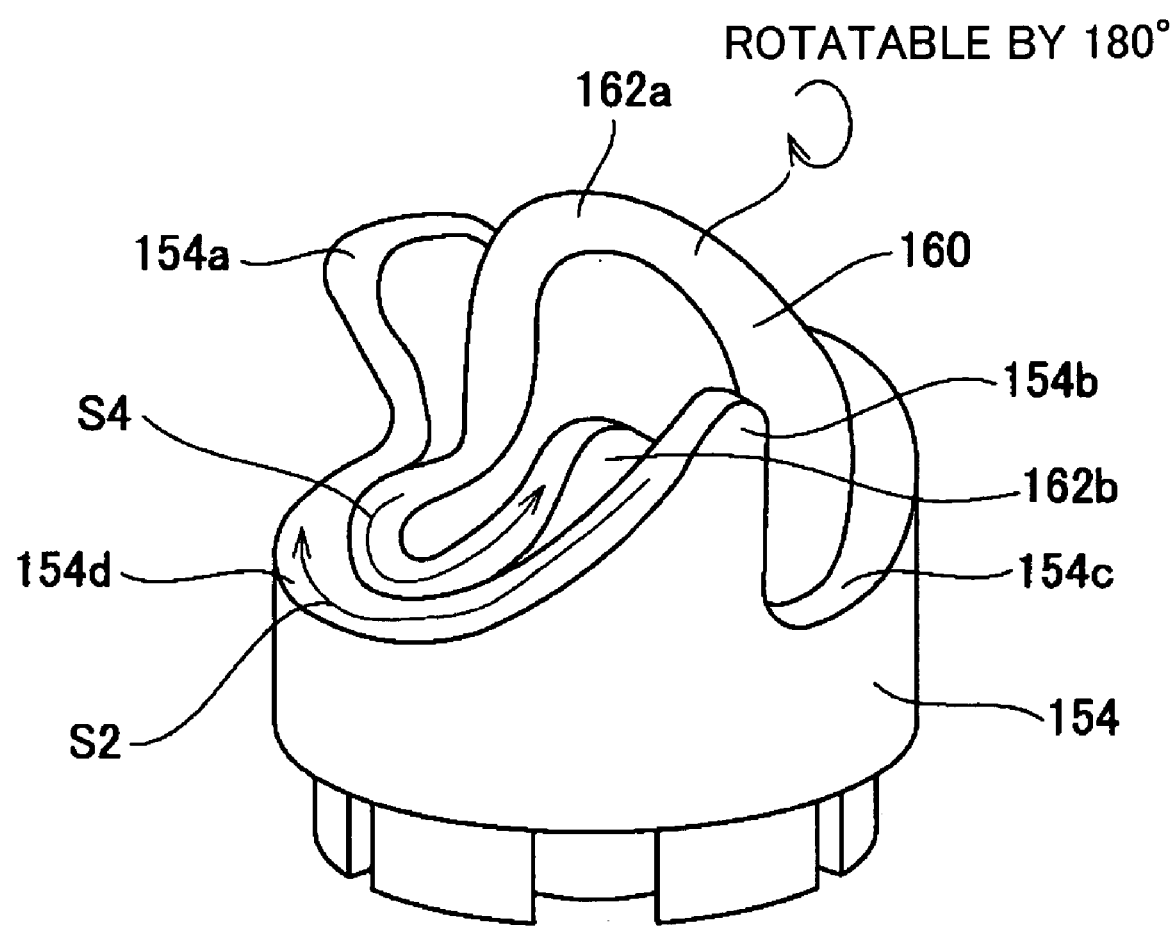
FIG. 11 is a schematic perspective view showing an assembly between outer and inner cams shown in FIG. 4.
Figure 12:
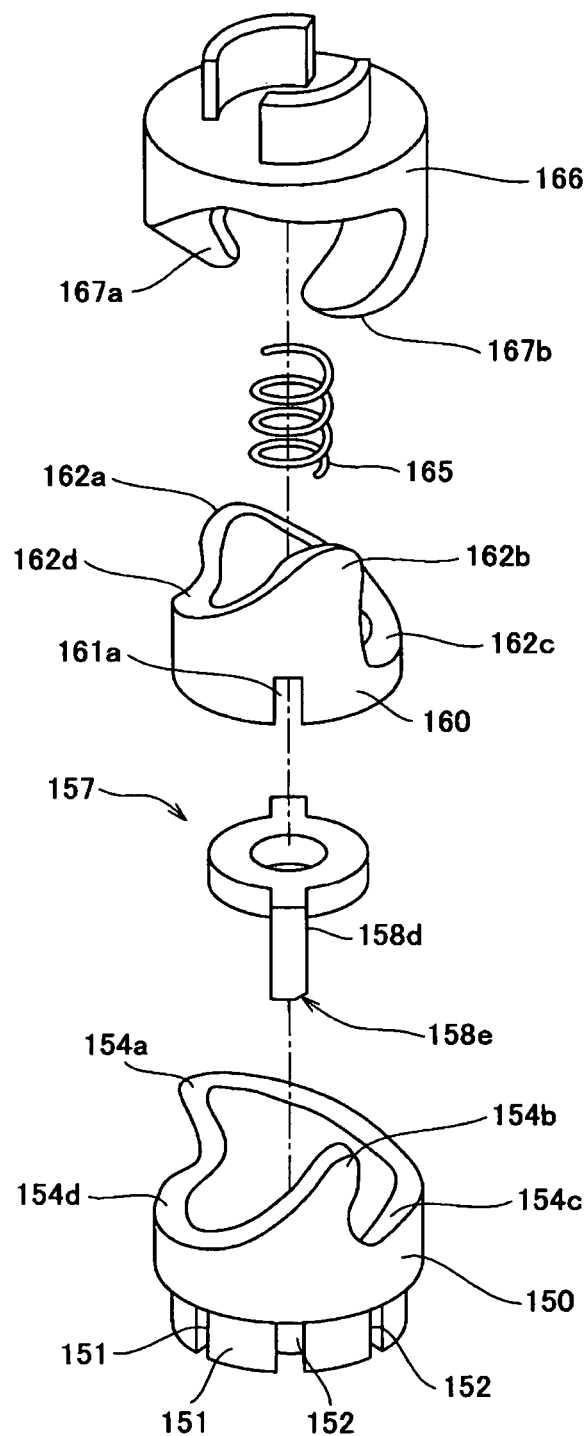
FIG. 12 is an exploded perspective view from the outer cam and a counter cam shown in FIG. 4, which is viewed from a different angle.

The body 154 forms, as shown in FIGS. 11 and 12, a pair of hills 154a and 154b and a pair of indents 154c and 154d. The hill 154a and the indent 154c may have shapes symmetrical to or different from those of the hill 154a and the indent 154c. Here, FIG. 11 is a perspective overview of the outer cam 150, into which the inner cam 160 is inserted, while the lock 157 is engaged with the guide grooves 152. FIG. 12 is an exploded perspective view from the outer cam 150 to the counter cam 166 viewed from a different angle.

In cooperation with the push button 140's engagement nails 142, the lock 157 serves to engage the movable-side housing 110 with the fixed-side housing 120 and to disengage the movable-side housing 110 from the fixed-side housing 120. The lock 157 includes a disc 158a, a pair of shoulders 158b, a perforation 158c, and a pair of arms 158d. The lock 157 is made, for example, of an insulated metal plate.

The disc 158a supports one end of the compression spring 165, and forms the perforation 158c into which the shaft 180 is inserted. The disc 158a has a pair of shoulders 158b at symmetrical positions. The shoulders 158b extend with a predetermined width from the disc 158a in opposite directions, and are engaged with a pair of fixation grooves 161a in the inner cam 160. As a result, the lock 157 works together with the inner cam 160.

Figure 13A:
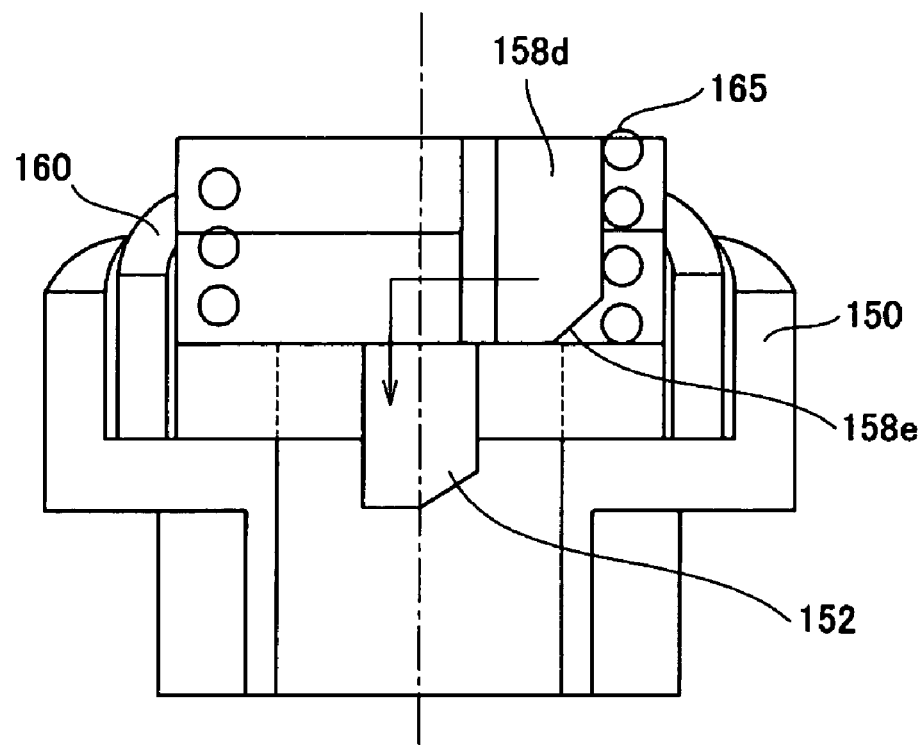
FIG. 13 is a schematic sectional view of a rotation of a lock by 180° shown in FIG. 4.
Figure 13B:
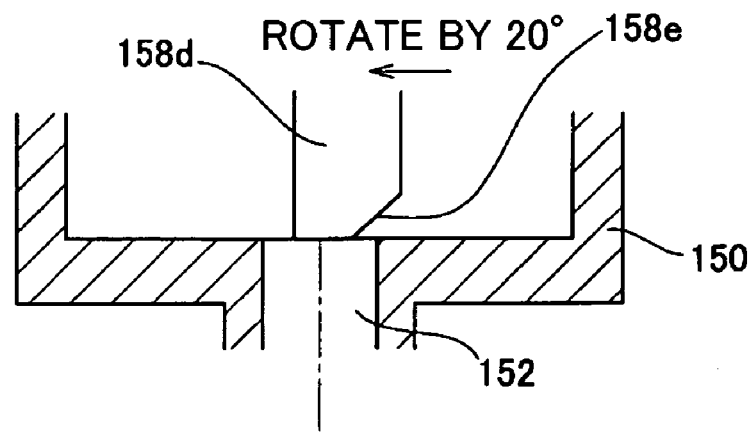

A pair of arms 158d are formed by bending the shoulders 158b at 90° in the direction $Y_2$, and inserted into the pair of guide grooves 152 in the outer cam 150. As shown in FIGS. 12 and 13, each arm 158d has a chamfered part 158e at its top. Here, FIGS. 13A and 13B are schematic sectional views for explaining a rotation of 180° of the lock.

As discussed, the stopper 135 sets the movable-side housing 110's maximum opening angle MA to the best call angle using the opening permission section, which will be described later, and the lock 157 thus rotates by 160° as the movable-side housing 110 opens by 160°. In this state, as shown in FIG. 13B, the chamfered part 158e of each arm 158d of the lock 157 contacts an edge of the outer cam 150's guide groove 152 (that is located at a position rotated by 180° relative to the guide groove 152 before the movable-part 110 opens). However, the spring 165 forces the lock 157 toward the outer cam 150, and the chamfered parts 158e proceed into the guide groove 152. This proceeding corresponds to a rotational angle of 20°. In other words, the lock 157 further rotates by 20°, as shown by an arrow in FIG. 13A, after the movable-side part 110 opens by 160°, whereby the arms 158d are engaged with the guide grooves 152 in the cam 150. Thus, when the push button 140 is pressed, the movable-side housing 110 rotates by about 160°, but the lock 157 rotates by 180° and is engaged with the guide grooves 152. Of course, the guide grooves 152, into which each arm 158d is inserted, changes position by 180° in this case.

The inner cam 160 is inserted into the outer cam 150, and allows movements and rotations of the counter cam 166. As shown in FIG. 12, the inner cam 160 includes a pair of hills 162a, 162b and a pair of indents 162c, 162d. As shown in FIG. 11, when the inner cam 160 is inserted into the outer cam 150 and the arms 158d of the lock 157 are inserted into the guide grooves 152 in the outer cam 150, dents are created between the hill 154a of the outer cam 150 and the hill 162a of the inner cam 160 and between the hill 154b of the outer cam 150 and the hill 162b of the inner cam 160. The inner cam 160 is fixed since the outer cam 150 is fixed onto the bush 148 and the lock 157 is fixed onto the outer cam 150. Therefore, before the push button 140 is pressed, the hills 162a and 162b of the inner cam 160 prevent a pair of convexes 167a and 167b of the counter cam 166 from sliding down to the indents 154c, 154d of the outer cam 150 beyond the dents. The inner cam 160 in the instant embodiment shows the same state as that of the opening angle of 0° of the movable-side housing 110 when the lock 157 rotates by 180°.

The compression spring 165 contacts the disc 158a of the lock 157 at its one end, and a base 167c of the counter cam 166 at its other end, and serves to force the arms 158d of the lock 157 toward the guide grooves 152 in the outer cam 150.

The counter cam 166 serves to open the movable-side housing 110 up to the best call angle relative to the fixed-side housing 120 by moving and rotating relative to the outer cam 150 and the inner cam 160. The lock 157 and the inner cam 160 rotate by 180° when the movable-side housing 110 rotates, for example, by 160°; the counter cam 166 simply slides down to the indents 154c, 154d along the inclined surfaces on the outer cam 150, and its rotational angle is 160°. The counter cam 166 includes the pair of convexes 167a, 167b, the base 167c, a body 168a, and a pair of legs 168b. These convexes 167a, 167b may have the same shape or different shapes.

Figure 10:
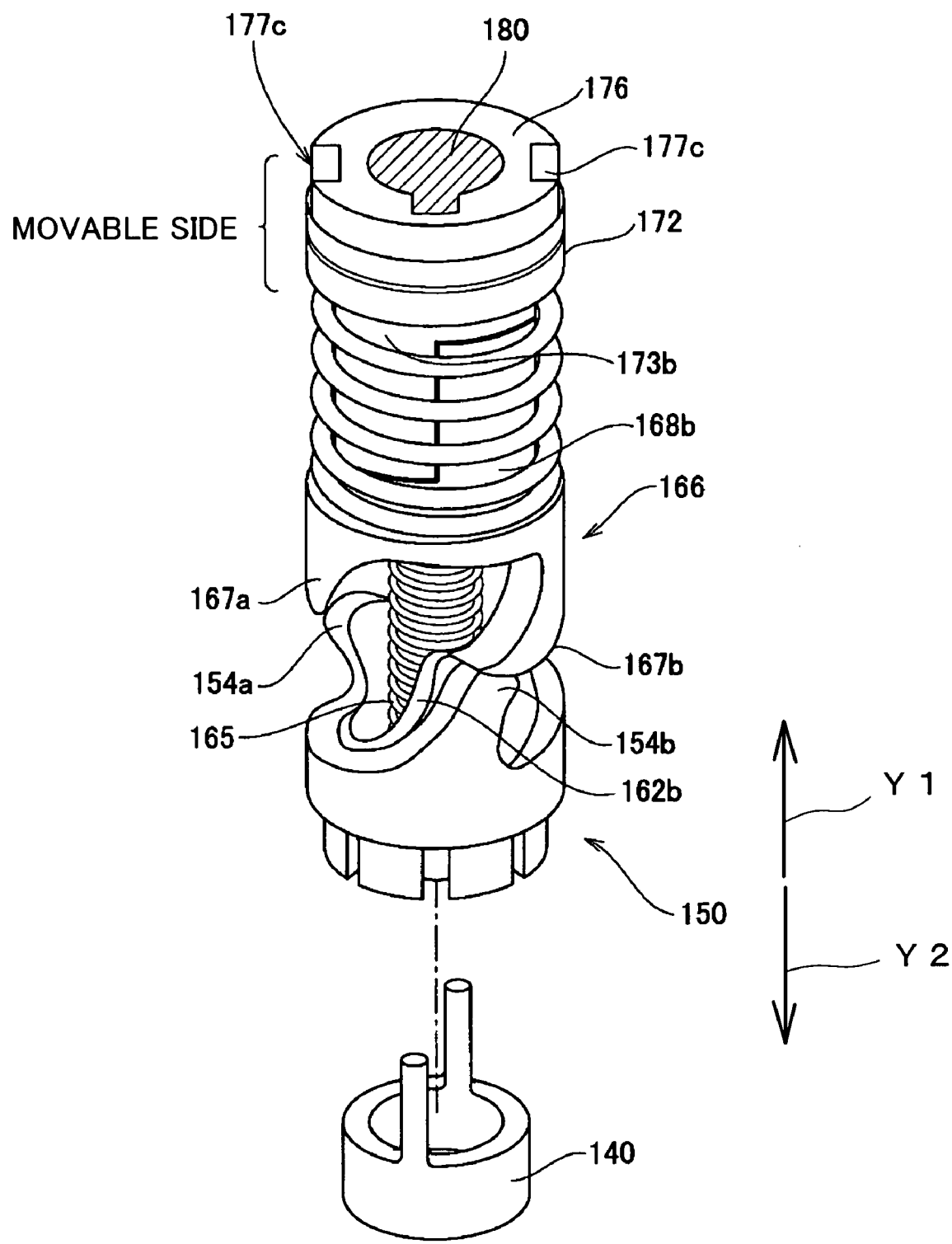
FIG. 10 is a schematic perspective view of an assembly that omits a bush and damper part shown in FIG. 4.

Before the push button 140 is pressed, the convex 167a is located near the hill 154a of the outer cam 150, and the convex 167b is located near the hill 154b of the outer cam 150, as shown in FIG. 10. Here, FIG. 10 is a schematic perspective view of an assembly from the push button 140 to the free stop cam 176, and omits the bush 148. In this state, as discussed with reference to FIG. 11, the hills 162a and 162b of the inner cam 160 prevent the convexes 167a and 167b from moving along the inclined surface on the outer cam 150.

The base 167c has a perforation 167d in its center, and supports other end of the compression spring 165. The body 168a has a hollow cylindrical shape, and is fixed onto a rear surface of the base 167c. A pair of legs 168b have such lengths that they are engaged with (i.e., not separated from) the arms 173b of the free stop cam 172 when the convexes 167a, 167b are located near the hills 154a, 154b and the indents 154c, 154d of the outer cam 150, as shown in FIG. 10.

The compression spring 170 is provided between the counter cam 166 and the free stop cam 172 and around the body 168a and legs 168b and the arms 173b of the free stop cam 172, and forces the counter cam 166 in the direction $Y_2$ and the free stop cam 172 in the direction $Y_1$. Thus, the instant embodiment uses only the compression springs 145, 165 and 170, and does not use any torsion spring. The movable-side housing 110 does not open due to a spring's torsion force, but opens due to the counter cam 166's movements and rotations.

The free stop cams 172 and 176 have some features. First, the free stop cams 172 and 176 assist the one touch opening function in cooperation with the counter cam 166. Second, the free stop cams 172 and 176 serve as a free stop function. Third, the free stop cams 172 and 176 force the movable-side housing 110 so that the opening angle can be 0° when the movable-side housing 10 temporarily opens relative to the fixed-side housing 120 at an angle between 0° and 20°, while the opening angle can be 160° when the temporal angle is between 140° and 160°. The instant embodiment uses this versatility to miniaturize the hinge part 130 and, in turn, the PDC 100.

As shown in FIGS. 4 and 14, the free stop cam 172 has a disc base 173a having a perforation 173c, a pair of arms 173b that symmetrically extend from the base 173a in the direction $Y_2$, and a pair of semispherical projections 173d symmetrically located in the direction $Y_1$. The convex 131b accommodates those members from the outer cam 150 to the free stop cam 176 and shaft 180 as the hinge module HM.

The free stop cam 176 includes a disc base 177, which has a perforation 177a, a pair of semispherical dimples 177b, and a fixation part 177c. The dimples 177b are formed on the surface of the base 177, and the fixation part 177c is provided on the side surface of the base 177.

A pair of arms 173b of the free stop cam 172 are engageable with the legs 168b of the counter cam 166. In other words, the arms 173b have such lengths that the arms 173b are engaged with (i.e., not separated from) the legs 168b when the convexes 167a, 167b of the counter cam 166 are located at the dents between hills of the outer and inner cams 150 and 160, as shown in FIG. 10, and at the indents 154c and 154d. When the arms 173b are disengaged from the legs 168b, the rotational force applied to the counter cam 166 does not transmit to the free stop cam 172.

A pair of projections 173d of the free stop cam 172 are engageable with a pair of dimples 177b on the free stop cam 176 in a certain angular range. The instant embodiment sets this angular range to about 30°. In FIG. 14, the free stop cams 172 and 176 twist relative to each other but the twisted angle is within about 30°, the projections 173d are located within the dimples 177b. When the projections 173d are located within the dimples 177b, the compression spring 170's elastic force is applied to correct an angular offset between the projection 173d and the dimple 177b. Therefore, when the twisted angle is within about 30°, the free stop cams 172 and 176 are subject to a force to reset twisting. This is the above third function. The third function enables a user to feel a click, and has an advantage in that the movable-side housing 110 is maintained stable when the fixed-side housing 120 is shaken. A feel of a click enables a user who has changed an opening angle of the movable-side housing 110 to 0° or about 160° to actually feel that angle.

When an opening angle of the movable-side housing 110 is 0°, an angular offset between the projection 173d and the dimple 177b is set 10°. When the opening angle of the movable-side housing 110 is 20°, the angular offset between them becomes 30°. Therefore, when the opening angle of the movable-side housing 110 is between 0° and 20°, the movable-side housing 110 is subject to a closing force.

On the other hand, as the movable-side housing 110 opens by about 160°, the counter cam 166 rotates with the free stop cam 172 by about 160°. Therefore, the free stop cam 172' projections 173d also rotate by about 160°. When the opening angle of the movable-side housing 110 is 140°, the angular offset between the projection 173d and the opposite dimple 177b becomes 30°. When the opening angle of the movable-side housing 110 is 160°, the angular offset between them becomes 10°. Therefore, when the opening angle of the movable-side housing 110 is between 140° and 160°, the movable-side housing 110 is subject to an opening force.

The fixation part 177c of the free stop cam 176 includes, as shown in FIG. 10, a pair of key grooves, into which convexes (not shown) on the convex 131b are inserted for fixations. Therefore, the free stop cam 176 rotates with the convex 131b.

When the push button 140 is pressed, the counter cam 166 moves and rotates. Since the counter cam 166 and the free stop cam 172 are engaged with each other via the legs 168b and arms 173b, the free stop cam 172 rotates with the counter cam 166. The convex 167b of the counter cam 166 slides down on the inclined surface S2 along the arrow in FIG. 11. Since the free stop cams 172 and 176 are engaged with each other, the rotational force transmits to the free stop cam 176. As a result, the free stop cams 172 and 176 rotate together. This is the above first function.

When the movable-side housing 110 is manually opened without pressing of the push button 140, the inner cam 160 does not rotate and the counter cam 166 is locked in place shown in FIG. 10. Therefore, the counter cam 166 and the free stop cam 172 engaged with the counter cam 166 stand still even when the movable-side housing 110 opens. On the other hand, the free stop cam 176 rotates with the convex 131b.

For the opening angle of the movable housing 110 between 20° and 140°, the projections 173d of the free stop cam 172 move on the surface of the base 177 apart from the dimples 177b of the free stop cam 176. This is a relative movement viewed from the free stop cam 176, and what moves indeed is the free stop cam 176. In this case, the compression spring 170 compresses the free stop cam 172 against the free stop cam 176, and this compression force or contact force fixes the free stop cam 176 in place against the free stop cam 172 at an arbitrary angle. This is the above second function.

Suppose a case where the push button 140 is pressed, the movable-side housing 110 moves to the best call angle, and then the movable-side housing 110 is manually closed. When the push button 140 is pressed and the movable-side housing 110 moves to the best call angle, the convexes 167a and 167b of the counter cam 167 in FIG. 10 are located on the indents 154c and 154d of the outer cam 150. Even in this state, the legs 168b are engaged with the arms 173b. The lock 157 rotates by 180° and is engaged with the outer cam 150 again, and the inner cam 160 is locked.

Then, when the movable-side housing 110 is manually closed, the free stop cam 176 rotates with the convex 131b. The free stop cam 172 rotates with the free stop cam 176, and the free stop function does now work. The rotational force transmits to the counter cam 166 via the arms 173b and legs 168b. The inner cam 160 does not rotate, and the convexes 167a, 167b of the counter cam 166 slide up on the inclined surface. For example, the convex 167b of the counter cam 166 slides up on the inclined surface S4 along the arrow direction. Thus, while the counter cam 166 slides down on the inclined surface of the outer cam 150 in one touch opening, the counter cam 166 moves up on the inclined surface of the inner cam 160 and returns to the state shown in FIG. 10, if the movable-side housing 110 is then manually closed.

The shaft 180 perforates through the perforation 177a in the free stop cam 176, the perforation 173c of the free stop cam 172, between the pair of arms 173b, between the pair of legs 168b of the counter cam 166, the perforation 167d, the perforation 161b in the inner cam 160, and the perforation 158c in the lock 157, and facilitates rotations from the lock 157 to the free stop cam 176. Since the shaft 180 has the stopper 182 engageable with the free stop cam 176, the shaft 180 and the free stop cam 176 rotate together.

The cap 104 has a disc shape, as shown in FIGS. 2 and 3, and hides the part shown in FIG. 4 from the outside. With this hiding function, the cap 104's shape is not limited to a disc and may have a partially convex shape.

The damper part 210 serves to brake the opening movable-side housing 110 in one touch opening, and is arranged adjacent to the shaft 106, as shown in FIG. 21. The damper part 210 includes a damper body, and a damper bush that is accommodated in the damper body and rotatable relative to the damper body. Viscous fluid, such as oil, exists between the damper body and the damper bush. The viscosity applies the viscous load to them when the damper body and the damper bush rotate, and mitigates rotation-induced impacts, etc. The internal structure of the damper is well-known, and a detailed description thereof will be omitted.

The damper body is fixed onto the bobbin 108, and made rotatable around the rotational center axis L1 with the hinge case 103 and the movable-side housing 110. The damper bush is directly or indirectly connected to the shaft 106, which is pivotally fixed by the bush 200 and can rotate around the rotational center axis L1 with the fixed-side housing 120. Therefore, for example, when the one touch opening part opens the movable-side housing 110, the damper part 210 absorbs the vibrations and impulses. Even when the movable-side housing 110 opens to the best call angle in a non-stop motion, the opening reaction does not cause the PDC 100 to hop from the user's hand, and thus the safety improves.

The damper bush is directly connected to the shaft 106 when the damper bush and the shaft 106 are connected or fixed to each other so that they rotate together. Since the damper bush rotates in synchronization with the shaft 106, the damper part 210 works as the movable-side housing 110 starts opening. Therefore, the movable-side housing 110 opens at a relatively slow speed and with high safety.

Figure 16:
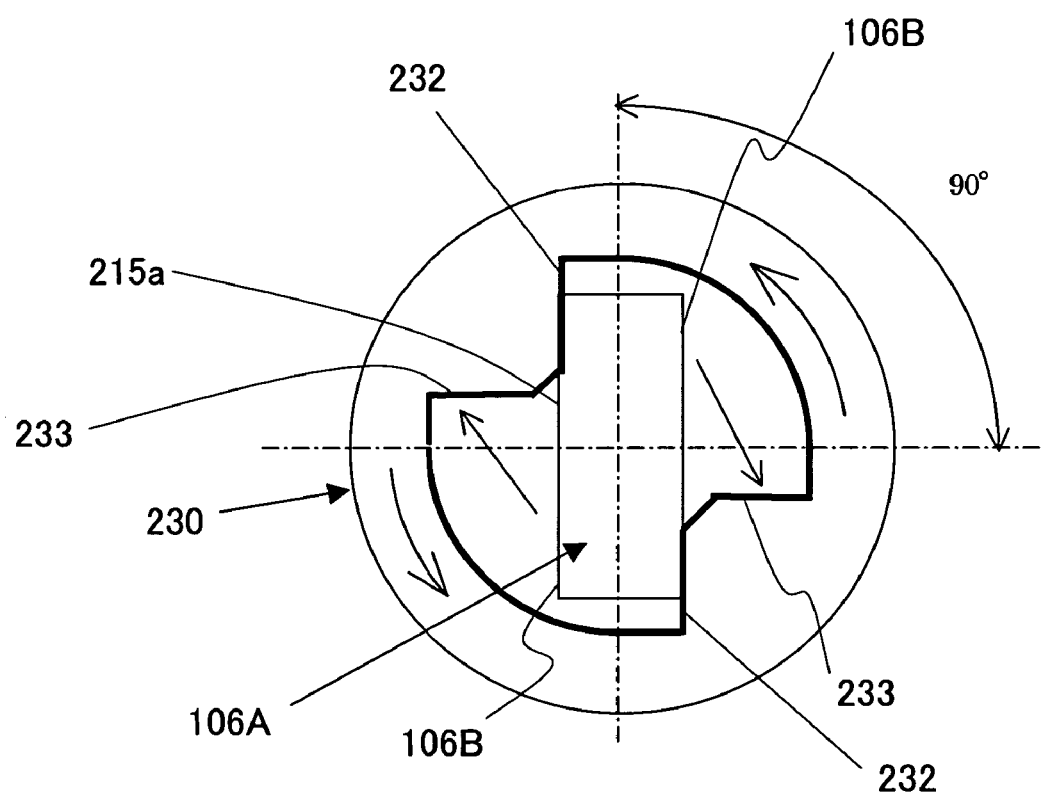
FIG. 16 is a sectional view for explaining an indirect connection between a damper bush and a shaft.

On the other hand, the damper bush is indirectly connected when the connection is partial as shown in FIG. 16. That is, the damper bush forms a connection hole 231 at an end 230, and the end 106A of the shaft 106 is inserted into the connection hole 231. As illustrated, the connection hole 231 diagonally forms a pair of approximately sectorial openings with a center angle of 90°, and each has inner walls 232 and 233.

When the folded PDC 100 arranges the ends 230 and 106A as shown in FIG. 16 and the movable-side housing is opened by the one touch opening, the damper bush rotates with the movable-side housing 110 and the end 230 rotates counterclockwise in FIG. 16. When the ends 230 and 106A relatively rotate and the movable-side housing 110 opens by about 90°, the wall surface 106B of the end 106A contacts the inner wall 233. When the movable-side housing 110 attempts to further open, the end 106A of the shaft 106 relatively forces the damper bush's end 230 to rotate clockwise, activating the damper.

This structure does not activate the damper part 210 at the initial opening stage of the movable-side housing 110, and enables the damper part 210 to work in the middle of the opening. The damper part 210 does not work at the initial opening stage, and quickens opening. In addition, the damper part 210 works in the middle of opening and absorbs the vibrations and impacts in the long run, improving the safety.

Of course, the sector's center angle in the connection hole 231 is not limited to 90° but is variable according to designs, such as the best call angle of the movable-side housing 110 and the damper activation angle. Similar effects are available when the damper body is directly or indirectly connected to the shaft 106 and the damper bush is fixed onto the bobbin 108.

Figure 17:
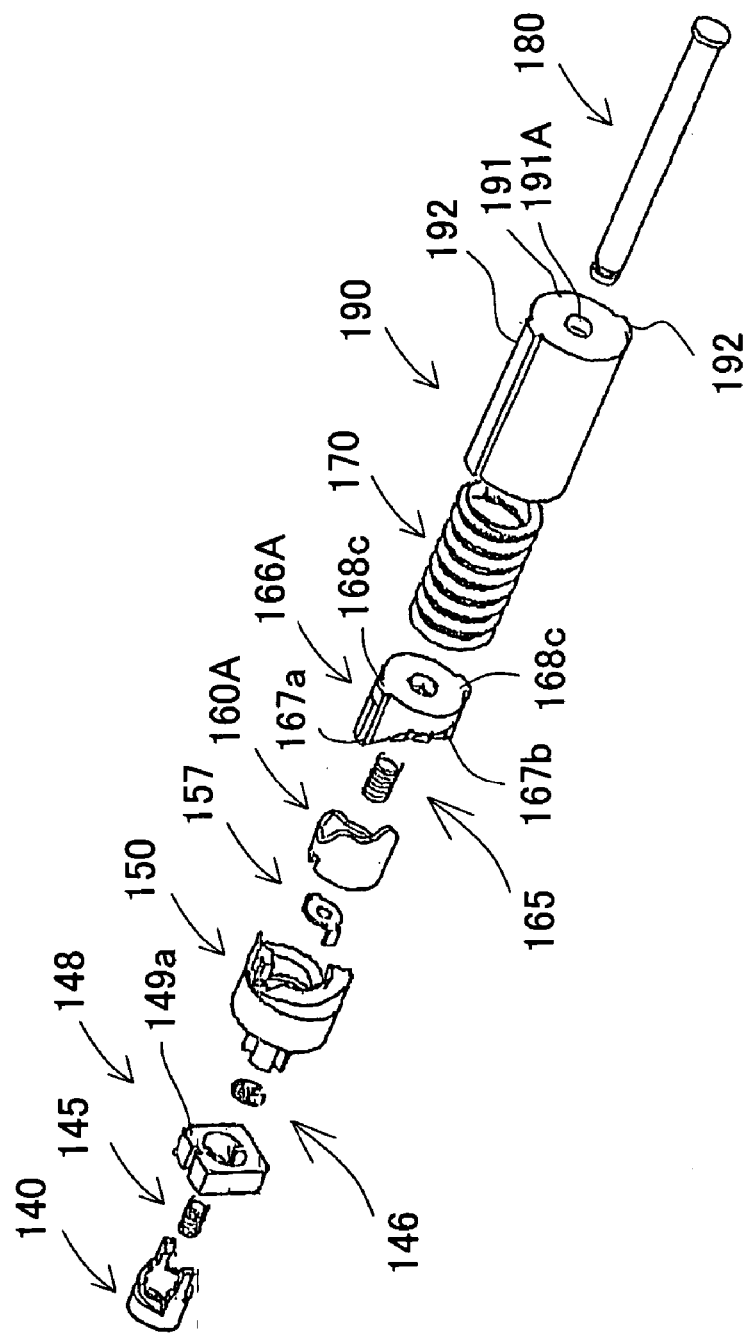
FIG. 17 is an exploded perspective view of another exemplary structure of the part applicable to the hinge part in the portable phone shown in FIG. 2.

The present invention is not limited to the above "two-way" hinge part 130, but can employ the "one-way manner". Referring now to FIGS. 17 to 20, a description will be given of the one-way part applicable to the three-part hinge part 130. According to the "one-way manner" in the instant application, a press of the push button 140 opens the movable-side housing 110 up to about 160° in a non-stop motion and the free stop does not work when it is being closed. On the other hand, in manually opening the movable-side housing 110 from the closed state, the movable-side housing 110 opens to a predetermined angle in a non-stop motion and then the free stop function works. Here, FIG. 17 is an exploded perspective view of another structural example applicable to the hinge part 130. Those elements in FIG. 17, which are corresponding elements in FIG. 4, are designated by the same references, and a duplicate description thereof will be omitted.

Referring to FIG. 17, the hinge part 130 includes the push button 140, the compression spring 145, the bush 148, the retaining ring 146, the outer cam 150, the lock 157, an inner cam 160A, the compression spring 165, a counter cam 166A, the compression spring 170, a support 190, and the shaft 180. Those elements from the push button 140 to the retaining ring 146 are installed in the convex 131a at the side of the fixed-side housing 120, and the bush 148 is fixed onto the convex 131a. Those elements from the outer cam 150 to the shaft 180 are installed in the convex 131b at the side of the movable-side housing 110.

Figure 18:
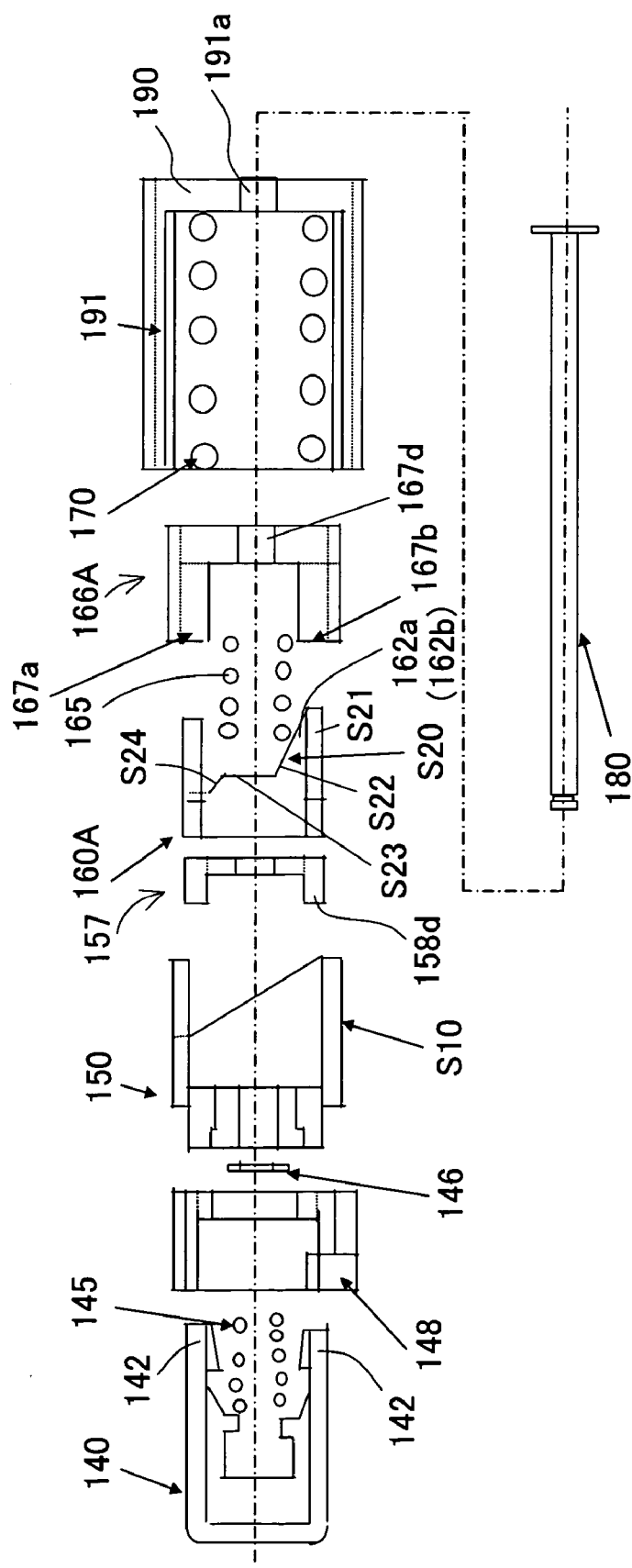
FIG. 18 is a schematic exploded sectional view of the part shown in FIG. 17.

Referring to FIG. 18, the hinge part 130 of the instant embodiment has the inner cam 160A, the counter cam 166A, and the support 190, which are different from that shown in FIG. 4. Here, FIG. 18 is a schematic exploded section of the part shown in FIG. 17. The inner cam 160A has a slide surface S20 for use with the free stop. S20 has inclined surfaces S21, S22, S24, and a flat surface S23. The counter cam 166A includes convexes 167a, 167b, a base 167c, and a pair of engagement parts 168c. The support 190 has a base 191 having a perforation 191a, and a pair of stoppers 192 that are engageable with the convex 131b of the hinge part 130, and accommodates the compression spring 170 and counter cam 166A. The engagement parts 168c are inserted into the stopper 192.

The one touch open part is substantially the same as those shown in FIG. 4. In other words, the convexes 167a, 167b of the counter cam 166A are arranged as shown in FIGS. 10 and 11 relative to the outer cam 150 and the inner cam 160A before the push button 140 is pressed. When the push button 140 is pressed, the engagement nails 142 disengage the arms 158d of the lock 157 from the outer cam 150, and make rotatable the lock 157 and the inner cam 160A combined with the lock 157. The convexes 167a and 167b of the counter cam 166A compress the hills 162a, 162b (not shown) of the inner cam 160A, as discussed above, and rotate with the inner cam 160A by 180°, whereby the lock 157 and the outer cam 150 are engaged with each other again.

Figure 19:
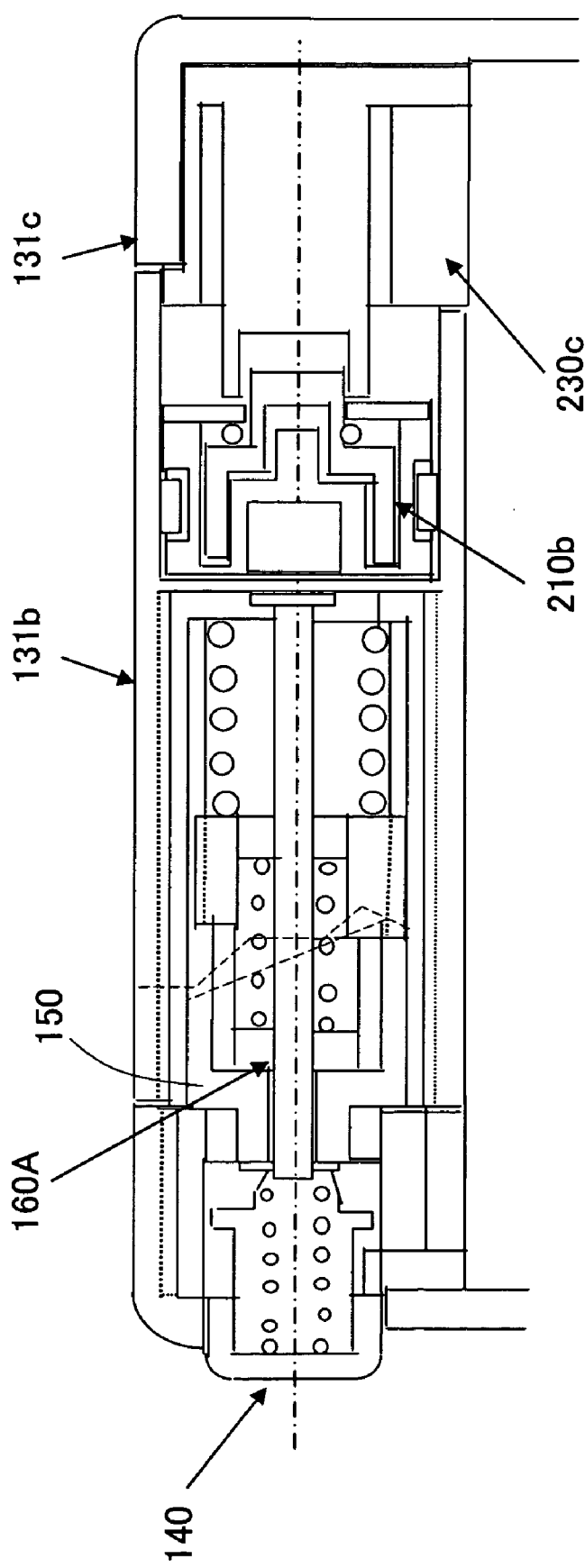
FIG. 19 is a schematic sectional view of a hinge part that incorporates the part shown in FIG. 17.
Figure 20:
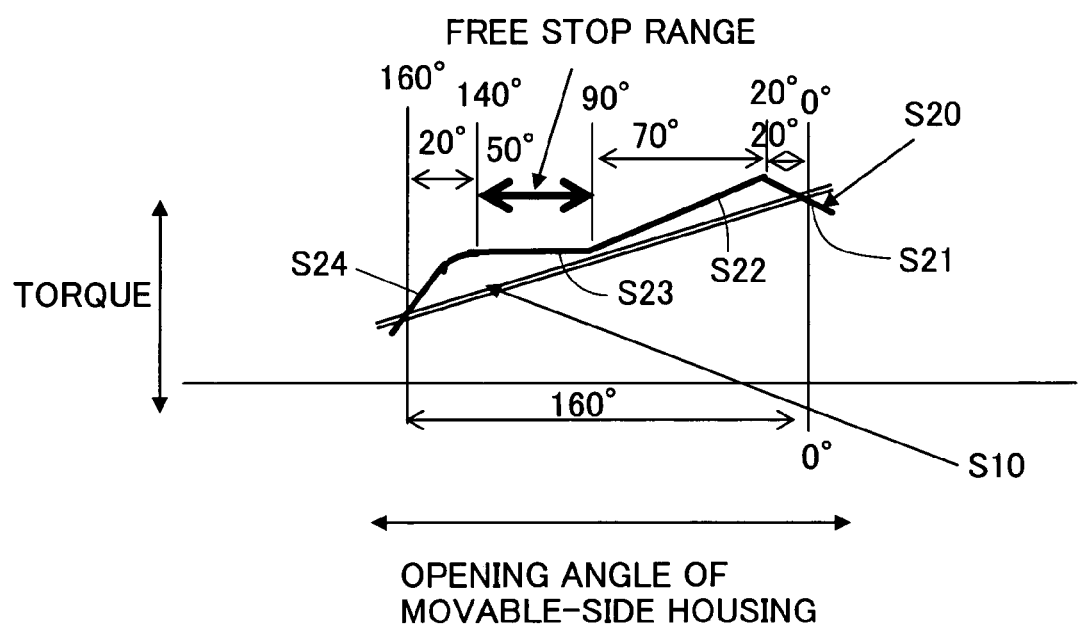
FIG. 20 is a graph showing a relationship between a one touch opening part and a free stop part shown in FIG. 17.

On the other hand, the free stop parts shown in FIGS. 18 and 4 are different. As shown in FIGS. 19 and 20, the surface of the inner cam 160A is set higher than the inclined surface S10 of the outer cam 150 shown in FIG. 18 except for part of the inclined surface S21. Here, FIG. 19 is a schematic sectional view of the hinge part 130 that incorporates the part of the instant embodiment. FIG. 20 is a graph showing a relationship between the one touch open part and the free stop part in the instant embodiment. As a result, as shown in FIG. 20, as the opening angle of the movable-side housing 110 increases from 0°, only the surface S20 of the inner cam 160A effects in an angular range where the inclined surface S21 exceeds the surface S10. As discussed with reference to FIGS. 10 and 11, the convexes 167a, 167b of the counter cam 166A are located at the dents between the hills 154a and 162a and between the hills 154b and 162b. Thus, the inclined surface S21 exceeds the surface S10, when the user manually moves the convexes 167a, 167b towards the hills 162a, 162b.

Referring to FIG. 20, when the user does not manually open the movable-side housing 110 beyond the surface S21 (or until the opening angle of the movable-side housing 110 reaches 20°), the counter cam 166A's convexes 167*a* and 167*b* return to the dents between the hills 154*a* and 162*a* and between the hills 154*b* and 162*b*. When the user manually opens the movable-side housing 110 beyond the surface S21, the movable-side housing 110 opens up to 90° in a non-stop motion along the inclined surface S22. This state does not generate a damper effect. When the opening angle of the movable-side housing 110 is between 90° and 140°, the counter cam 166A is subject to a compression force by the compression spring 170A, and the convexes 167*a* and 167*b* stand still at an arbitrary angle on the flat surface S23, activating the free stop function. A range where the free stop function works is adjustable by a range of the flat surface S23. When the opening angle of the movable-side housing 110 is between 140° and 160°, the convexes 167*a* and 167*b* move to the indents 162*c*, 162*d* along the inclined surface S24. A force resetting to 0° applies when the opening angle of the movable-side housing 110 is between 0° and 20°, whereas a force resetting to 160° when the opening angle of the movable-side housing 110 is between 140° and 160°.

Description of Auxiliary Rotational Part

A description will now be given of the auxiliary rotational part 101, which makes rotatable the movable-side housing 110 around the orthogonal rotational axis L2. The following description sometimes refers to a rotation of the movable-side housing 110 around the orthogonal rotational axis L2 as a "twist" to distinguish the rotation from the rotation (or opening/folding actions) of the movable-side housing 110 around the rotational center axis L1 relative to the fixed-side housing 120. The twistable movable-side housing 110 enables, as discussed later, a user, for example, to easily hold the fixed-side housing 120 and to view the LCD screen 112 in photographing with the camera function in the PDC 100, as well as folding the PDC 100 while the LCD screen 112 faces up.

As shown in FIG. 21, the auxiliary rotational part 101 is provided in the hinge part section 130, which is located in the convex 131*c*. Roughly speaking, the auxiliary rotational part 101 includes an orthogonal shaft 105, a shaft 106, a bearing 107, and a bobbin 108.

Figures 22A, 22B:
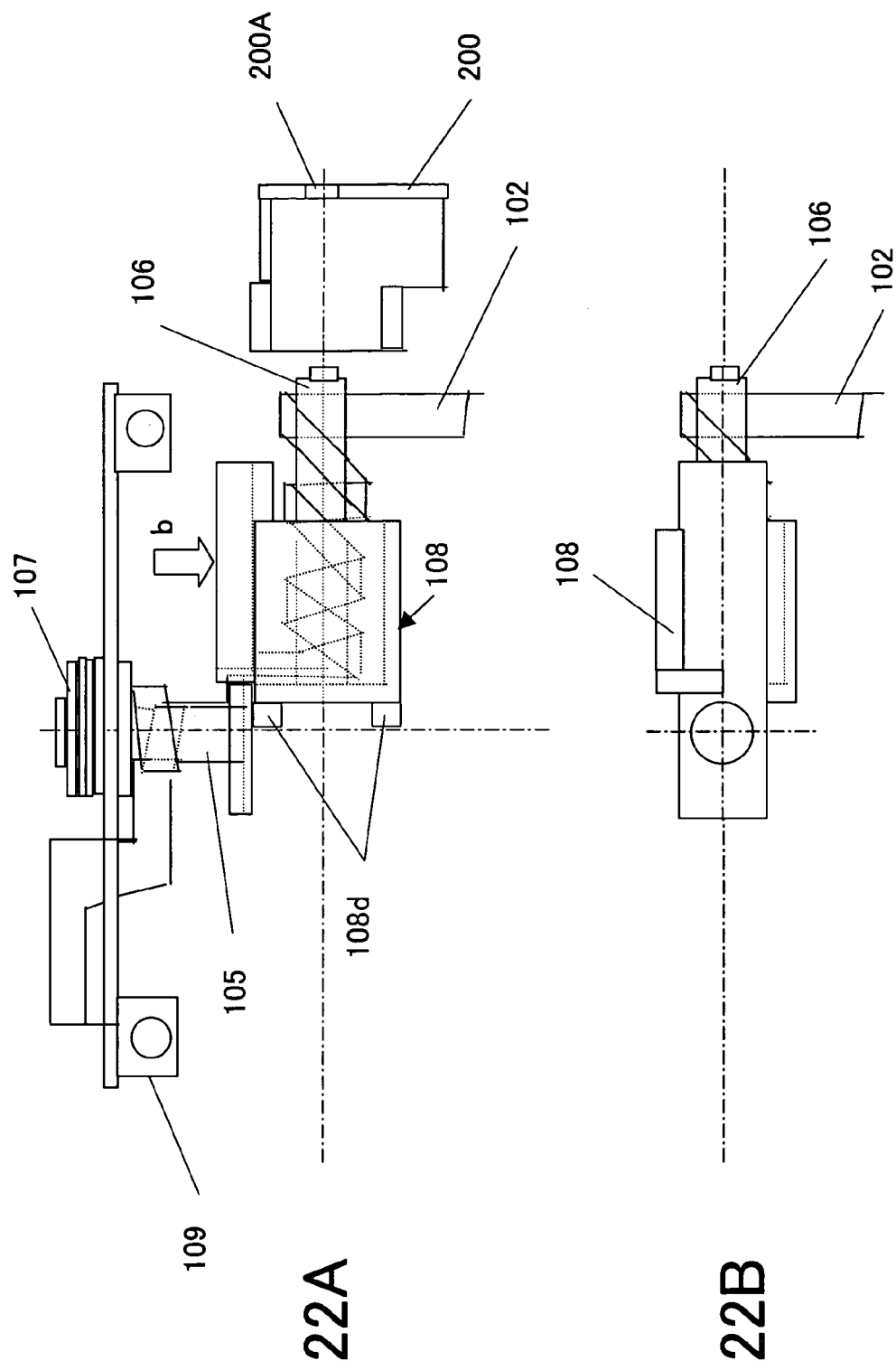
FIG. 22A is a front view of the auxiliary rotational part.
FIG. 22B is a top view of its bobbin.
Figure 23:
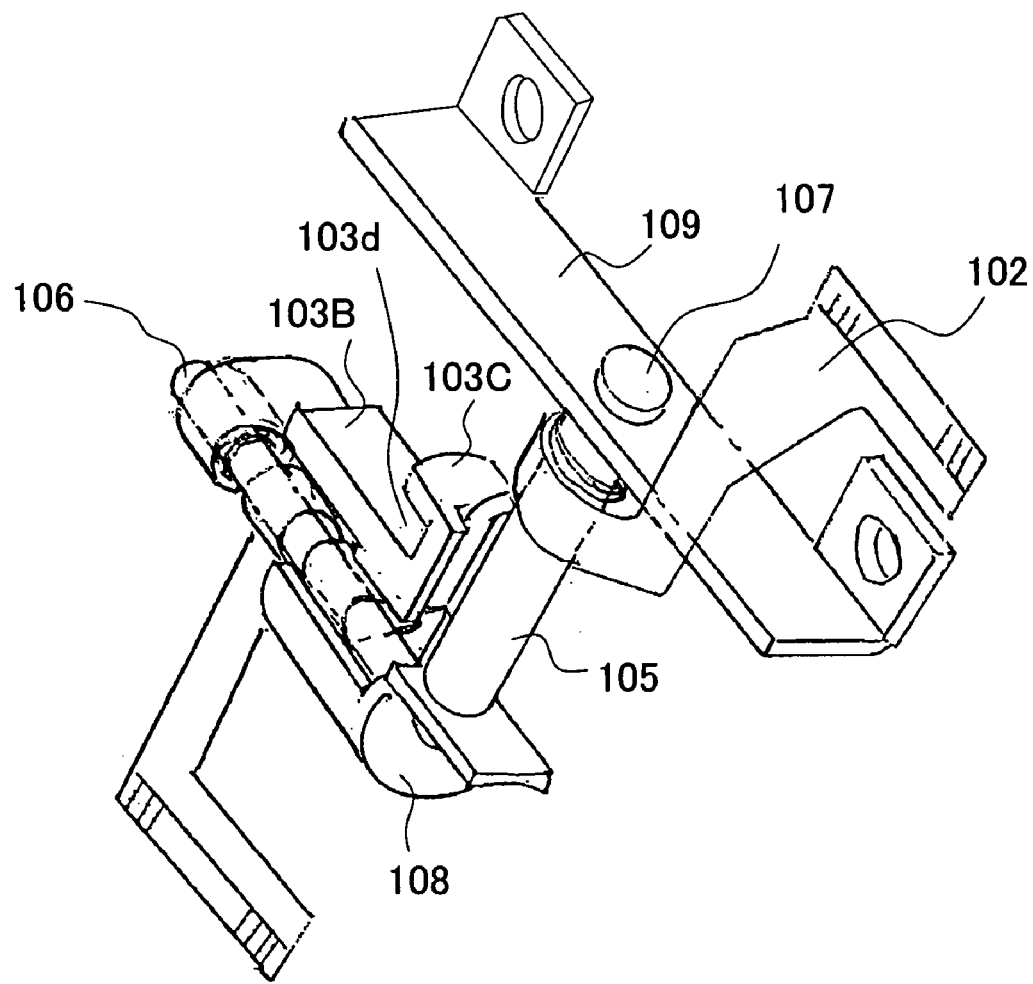
FIG. 23 is a perspective view of the auxiliary rotational part incorporated with a FPCB.
Figure 24:
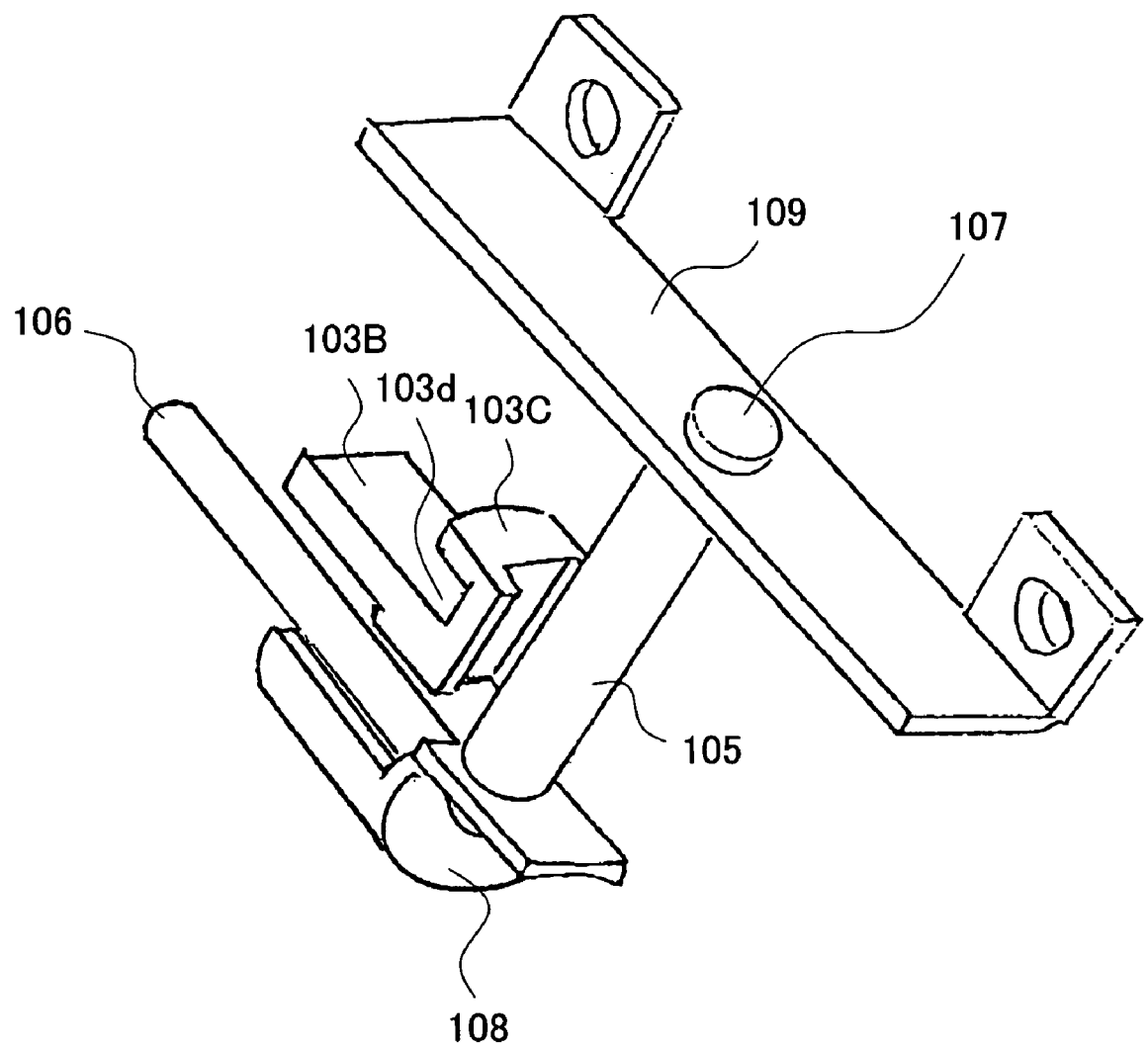
FIG. 24 is a perspective view of the auxiliary rotational part incorporated into a hinge cover.

The orthogonal shaft 105 is inserted into the movable-side housing 110 from a portion of the movable-side housing 110 near the hinge part 130. The movable-side housing 110 is made twistable around the orthogonal shaft 105. The orthogonal shaft 105 is fixed onto the bobbin 108, as shown in FIGS. 22 to 24, by calking, press fit, etc. A bracket 109 is attached to its top via the bearing 107, and made twistable around the orthogonal shaft 105.

The bearing 107 accommodates, for example, a ball cam part, an angled cam part, etc. (not shown). Whenever the bracket 109 rotates by 90° and 180°, a click with a semifixed state is obtained. The bracket 109 is fixed onto the movable-side housing 110 at screw-hole parts at its both ends.

The bobbin 108 accommodates the shaft 106 that is orthogonal to the orthogonal shaft 105, and having a center axis that accords with the rotational center axis L1. In other words, the hinge part 130 rotates the movable-side housing 110 relative to the fixed-side housing 120 around the shaft 106. One end of the shaft 106 is fixed on the inner wall of the bobbin 108, and the other end of the shaft 106 is pivotally supported by the reception hole 200A in the bush 200, as shown in FIGS. 21 and 22.

Figure 25:
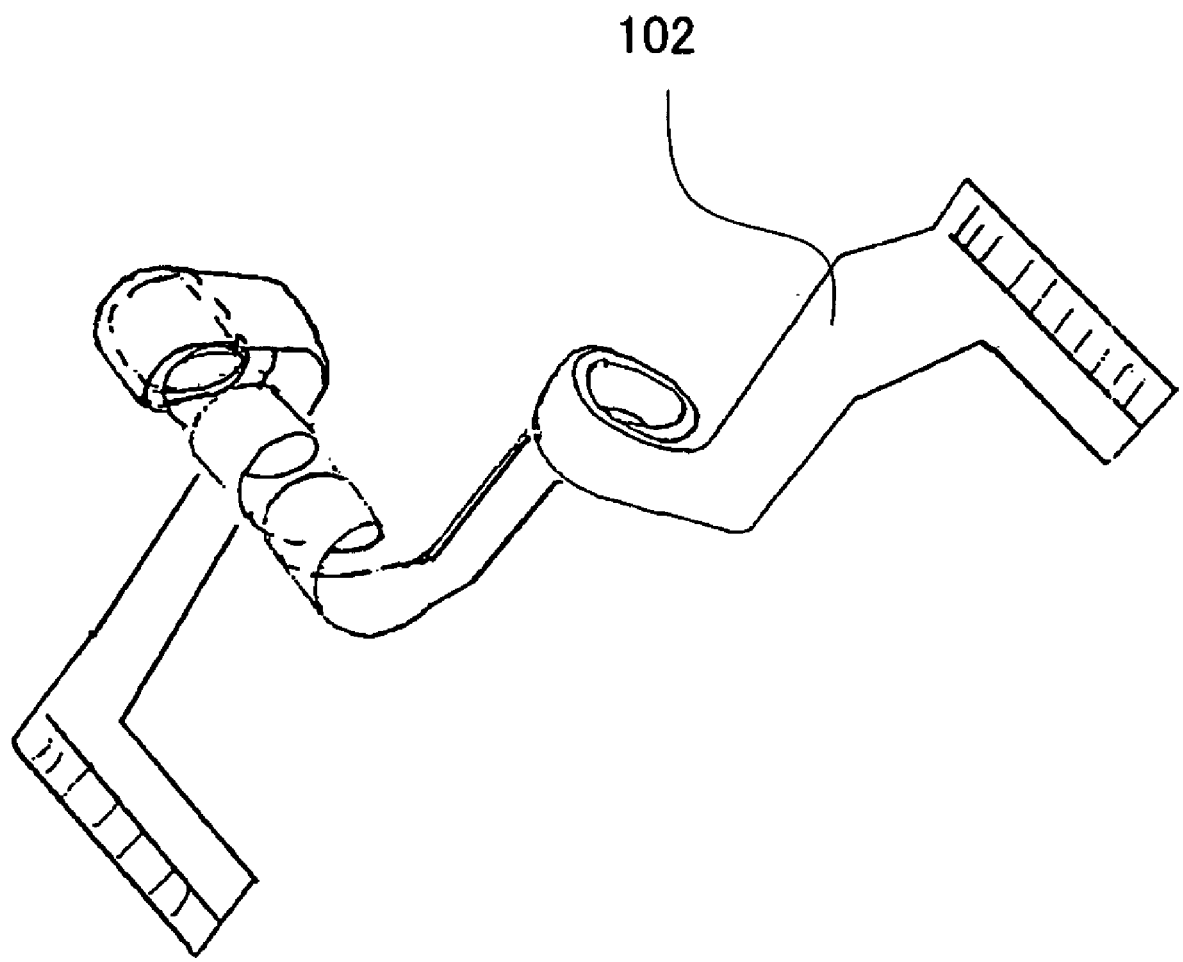
FIG. 25 is an overview of the FPCB.

A flexible printed circuit board ("FPCB") 102 is loosely wound from the fixed-side housing 120 to the movable-side housing 110 (see FIG. 25). This FPCB 102 connects a substrate (not shown) for the LCD screen 112 accommodated in the movable-side housing 110 to a substrate (not shown) for the ten-key 122 accommodated in the fixed-side housing 120, and coats signal lines with an insulated elastic material. The signal lines are arranged on a film-shaped substrate. The signal line and insulated elastic material can use any technology known in the art, and a detailed description thereof will be omitted.

The loosely wound FPCB 102 around the shaft 106 does not damage the FPCB 102 even when the movable-side housing 110 rotates relative to the fixed-side housing 120. This FPCB 102 passes through the inside of the bobbin 108, as shown in FIGS. 21 to 26, and loosely winds around the orthogonal shaft 105 to the movable-side housing 110. Therefore, even when the movable-side housing 110 is twisted, the FPCB 102 does not get damaged. Other cables ("Non-FPCB or NFPCB"), such as an antenna's coaxial cable and a power cable, which are attached to the FPCB 102 and overlap the FPCB 102, are also wound together with the FPCB 102.

The bobbin 108 includes, as shown in FIG. 22, an approximately plate-shaped fixation part 108B around a round surface of an approximately cylindrical body 108A. The orthogonal axis 105 is fixed onto the fixation part 108B.

Figure 26:
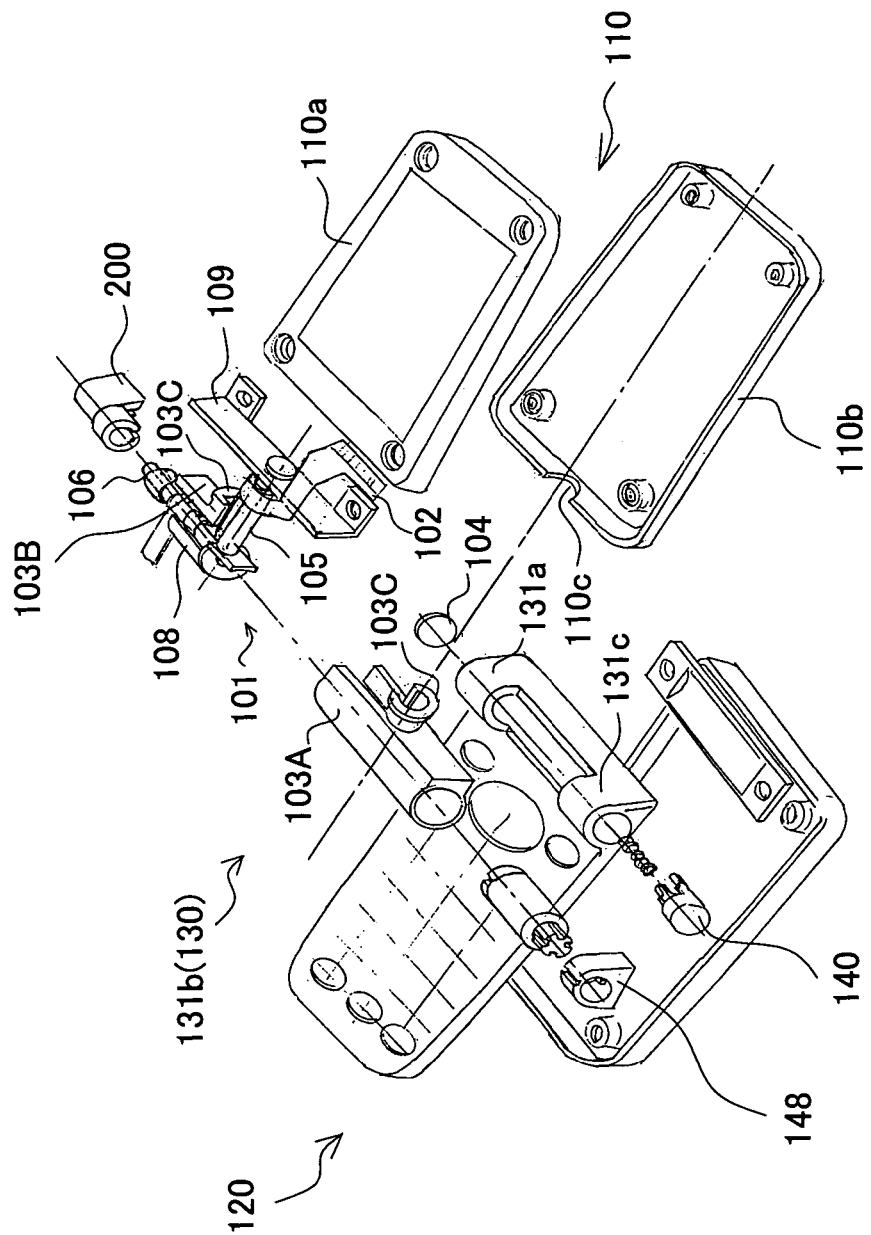
FIG. 26 is an exploded perspective view of the portable phone shown in FIG. 1.
Figure 43:
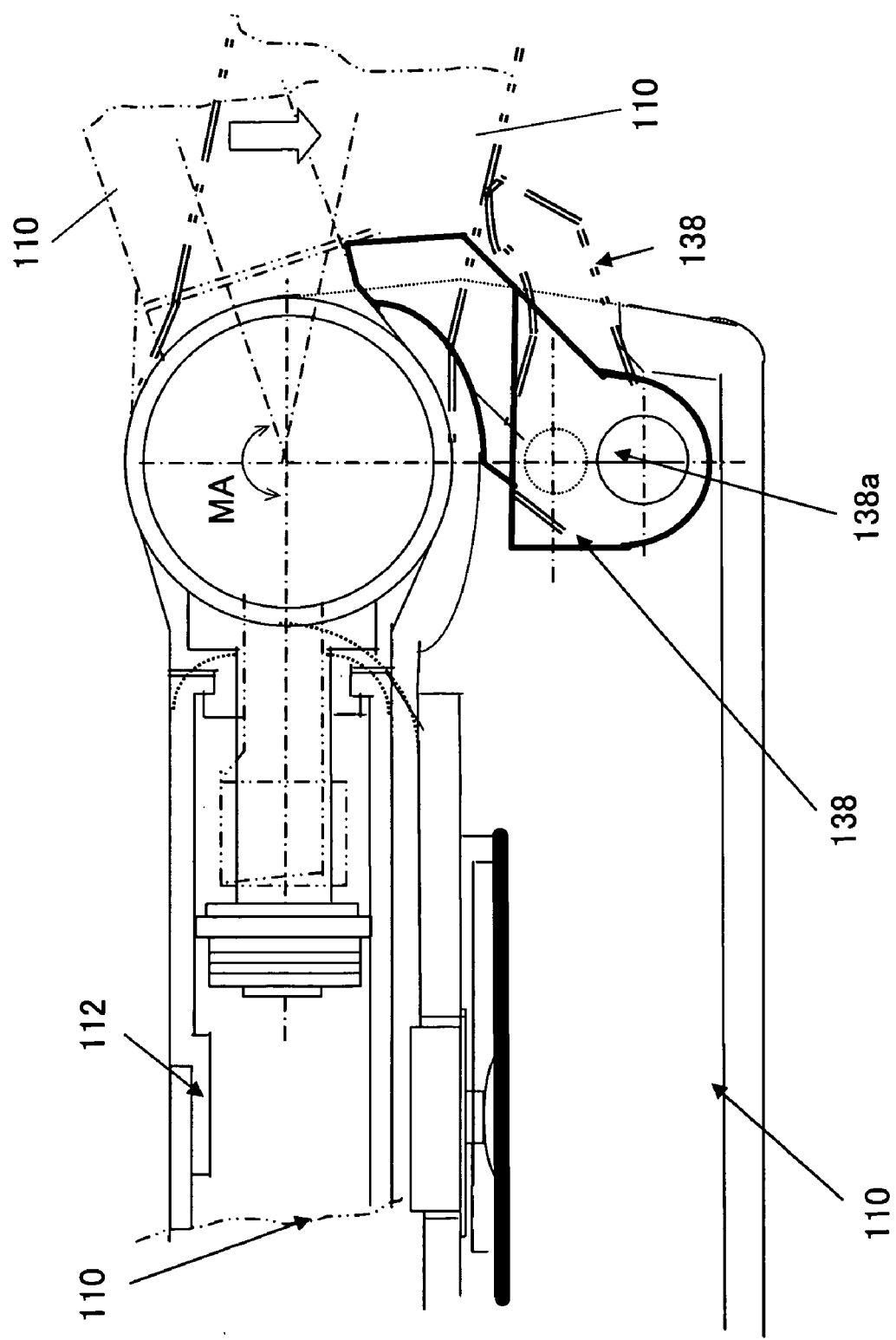
FIG. 43 is a schematic sectional view of another stopper as one exemplary opening permission section of the third variation according to the present invention.

This auxiliary rotational part 101 is provided in the hinge cover 103, which includes a body 103A and a lid 103B (see FIGS. 23, 43 and 46). The orthogonal shaft 105 is inserted into the slit 103*a* in the body 103A, the auxiliary rotational part 101 is inserted into the hinge cover 103, and then the lid 103B is inserted into the slit 103*a*. As shown in FIG. 26, the hinge module HM is inserted into the hinge cover 103, and the bush 148 is attached. The bush 200 is attached to the shaft 106 of the auxiliary rotational part 101, and these members form the hinge part 130 in the convex 131*b* in the movable-side housing 110. The PDC 100 is formed by fixing the bracket 109 onto the movable-side housing 110, and by attaching the hinge part 130 between the convexes 131*a*, 131*c* of the fixed-side housing 120, and then by attaching the push button 140 and the cap 104. The bracket 109 is screwed between the front surface part 110*a* and the rear surface part 10*b* of the movable-side housing, as shown in FIG. 26.

This hinge cover 103 serves as a reinforcing member (or a first reinforcing member) that covers and reinforces an outer periphery of the orthogonal shaft 105. As shown in FIGS. 23 to 26, this hinge cover 103 forms a cylindrical part 103*c*. This cylindrical part 103*c* has a hollow inside, into which the orthogonal shaft 105 is inserted. In other words, the cylindrical part 103*c* covers the peripheral of the orthogonal shaft 105, and reinforces the flexural strength of the orthogonal shaft 105. Therefore, when the movable-housing 110 is opened and folded, the reinforcing cylindrical part 103*c* supports any large load (or bending moment) applied to the orthogonal shaft 105, preventing the orthogonal axis 105 from bending or breaking.

In addition, the cylindrical part 103*c* forms a peripheral groove 103*d* along its outer periphery. An end surface of the perforation 110*c*, which is formed at the lower portion of the movable-side housing 110 and perforates the orthogonal shaft 105, is inserted into this peripheral groove 103*d*. Thereby, as the movable-side housing 110 twists, this perforation 110*c* rotates along the peripheral groove 103*d* for smooth rotations. When the movable-side housing 110 is being opened and closed, an engagement part between the perforation 110*c* and the peripheral groove 103*d* supports the bending moment, enhancing the reinforcing effect.

Description of Opening Permission Section

Figure 27:
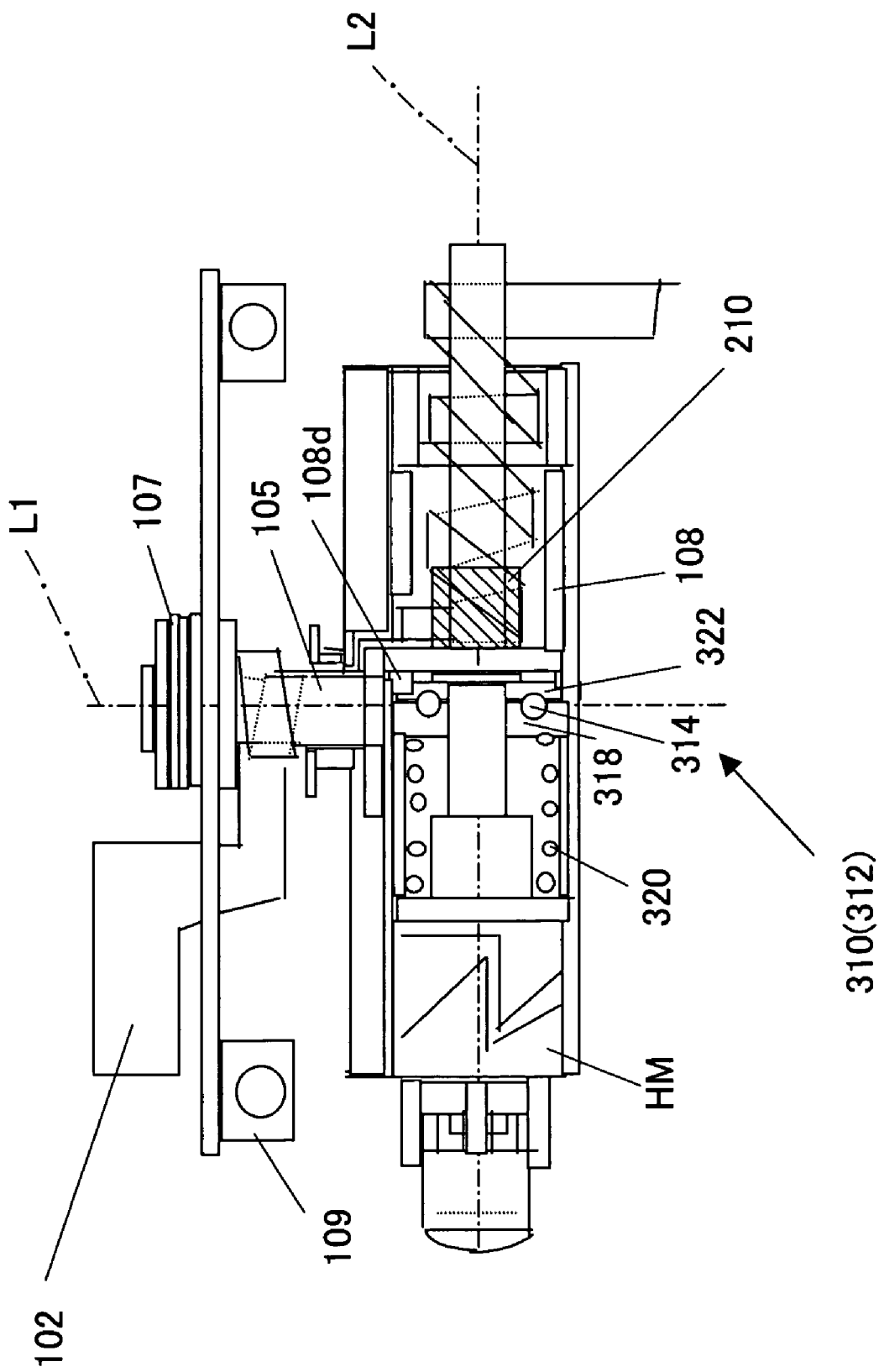
FIG. 27 is a schematic sectional view for explaining the inside of the hinge part in the portable phone shown in FIG. 1.

As shown in FIGS. 21 and 27, this PDC 100 includes an opening permission section 310 in the hinge part 130. The opening permission section 310 includes a ball cam 312 adjacent to the hinge module HM in this embodiment. The hinge module HM and the ball cam 312 are integrated into a hinge unit HU as one unit, as shown in FIG. 28.

The ball cam 312 includes balls 314, a holding plate 322 that holds the balls 314, a groove plate 318 that has a groove 316 corresponding to the balls 314, and a coil spring 320 as forcing means, etc., which forces the groove plate 318 against the holding plate 322. A rear surface 322a of the holding plate 320 (which is opposite to a surface that holds the balls 314) has a concave 322b, into which a convex 108d that projects from the bobbin 108 (see also FIG. 22) is inserted. As a result, this holding plate 322 rotates with the bobbin 108 and the hinge cover 103.

Figure 28A:
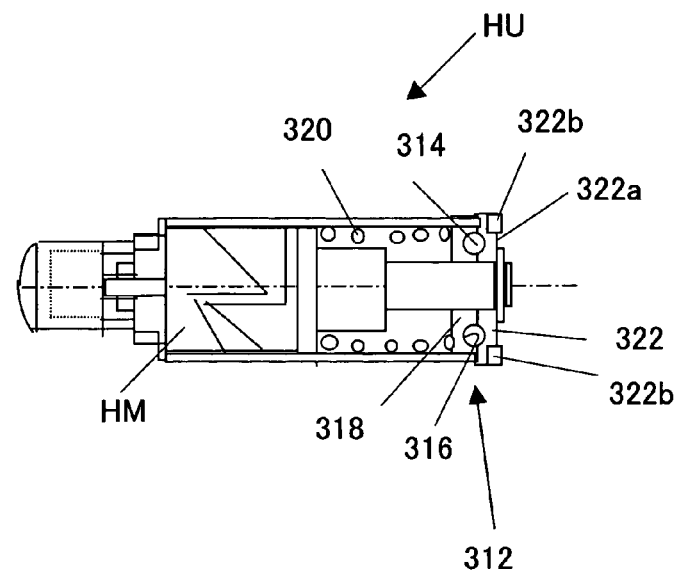
FIG. 28A is a ball engaged with a groove.

The balls 314 are inserted into the groove 316 in the folded PDC 100, as shown in FIG. 28A. When the one touch opening, etc. opens the movable-side housing 110, the groove plate 318 rotates with the holding plate 322 up to the best call angle due to a force by the coil spring 322 while the balls 314 are inserted into the groove 316. This is realized when the (escape) torque generated by an engagement force between the balls 314 and the groove 316 is set greater than the torque generated by a rotational force of the outer cam 150 and the inner cam 160A.

When the movable-side housing 110 opens to the best call angle, a rotation stop means (not shown) stops rotations of the outer and inner cams 150 and 160A and groove plate 318 and the movable-side housing 110 stops opening. Thereby, the opening angle of this PDC 100 is maintained to be the best call angle, and a user can comfortably place a call and execute other operations. At this time, the stopper 135 does not contact the rear surface 10b of the movable-side housing 110, as shown in FIG. 15.

Figure 29:
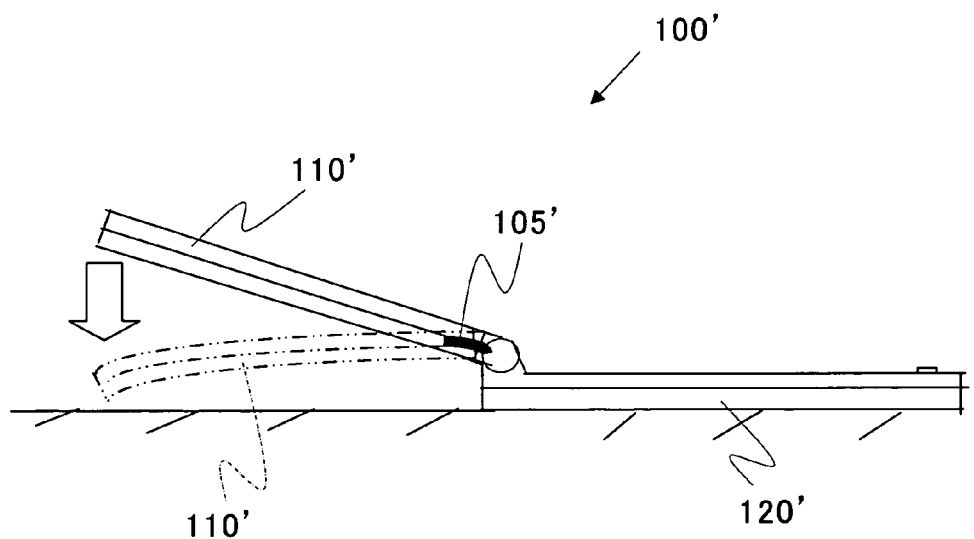
FIG. 29 is a side view showing that the movable-side housing gets damaged due to large load in the portable phone shown in FIG. 1.
Figure 30:
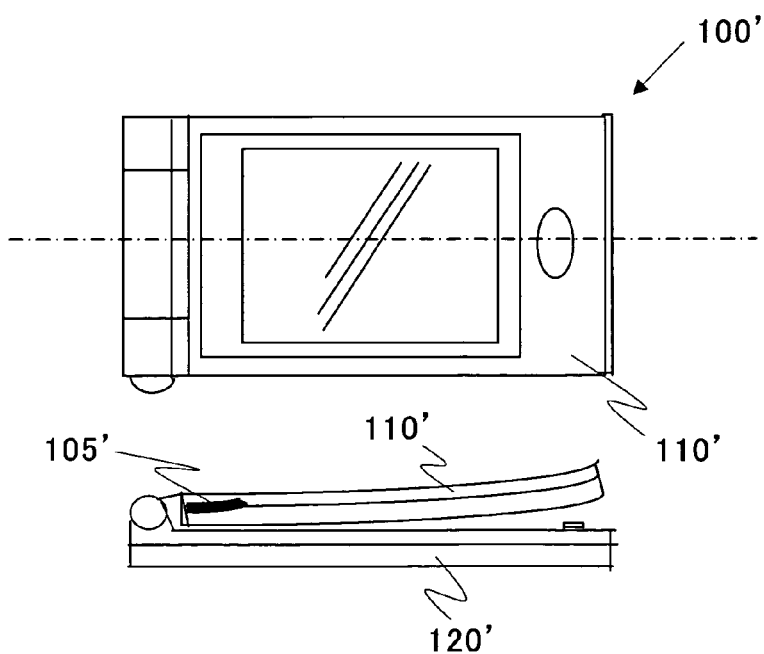
FIG. 30 is a side view of the folded portable phone after it is broken as in FIG. 29.

With the large load or rotation moment for further opening the movable-side housing 110, for example, the movable-side housing 110' deforms or the orthogonal shaft 105' bends in the conventional PDC 100, as shown in FIG. 29. When the movable-side housing 110' and the orthogonal shaft 105' break, this PDC 100' cannot be folded at all or incompletely, as shown in FIG. 30, in which the movable-side housing 110' is spaced from the fixed-side housing 120' and their ends do not fit well.

Figure 28B:
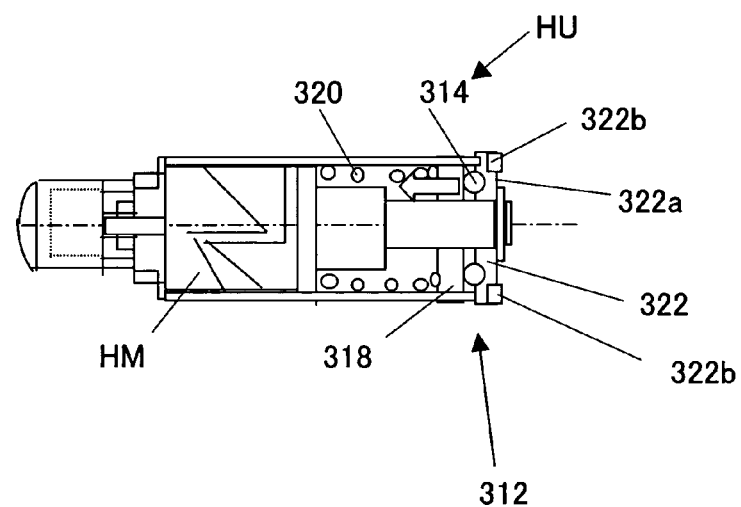
FIG. 28B is a ball disengaged with the groove.

On the other hand, the PDC 100 of the instant embodiment allows the balls 314 in the ball cam 312 to come off from the groove 316 in the groove plate 318 and the holding plate 322 to further rotate, as shown in FIG. 28B, with the large load. As the holding plate 322 rotates, the movable-side housing 110 rotates and reduces the load in the opening direction until the stopper 135 contacts the rear surface 110b of the movable-side housing 110.

The moment that disengages the balls 314 from the groove 316 depends upon parameters, such as the coil spring 320's force, diameters of balls 314 and groove 316. A designer of this PDC 100 can set these parameters so that the balls 314 completely come off from the groove 316 when a moment greater than a predetermined rotation moment is applied. The predetermined rotation moment is within a permissible range for the orthogonal shaft 105 and the movable-side housing 110, and the "moment greater than a predetermined rotation moment" can be equal to or smaller than an utmost possible limit for orthogonal shaft 105 and the movable-side housing 110. Preferably, the balls 314 are designed not to completely come off from the groove 316 when the stopper 135 contacts the rear surface 10b. This is because the coil spring 320's force can reset the balls 314 to the groove 316 when the moment subsequently changes from a value greater than the predetermined rotation moment to a value smaller than the predetermined rotation moment.

When the large load is applied, the movable-side housing 110, the auxiliary rotational part 101 and the hinge cover 103 rotate in the above case. Therefore, the hinge cover does not have to form a recess of a U-shaped groove.

Figure 31:
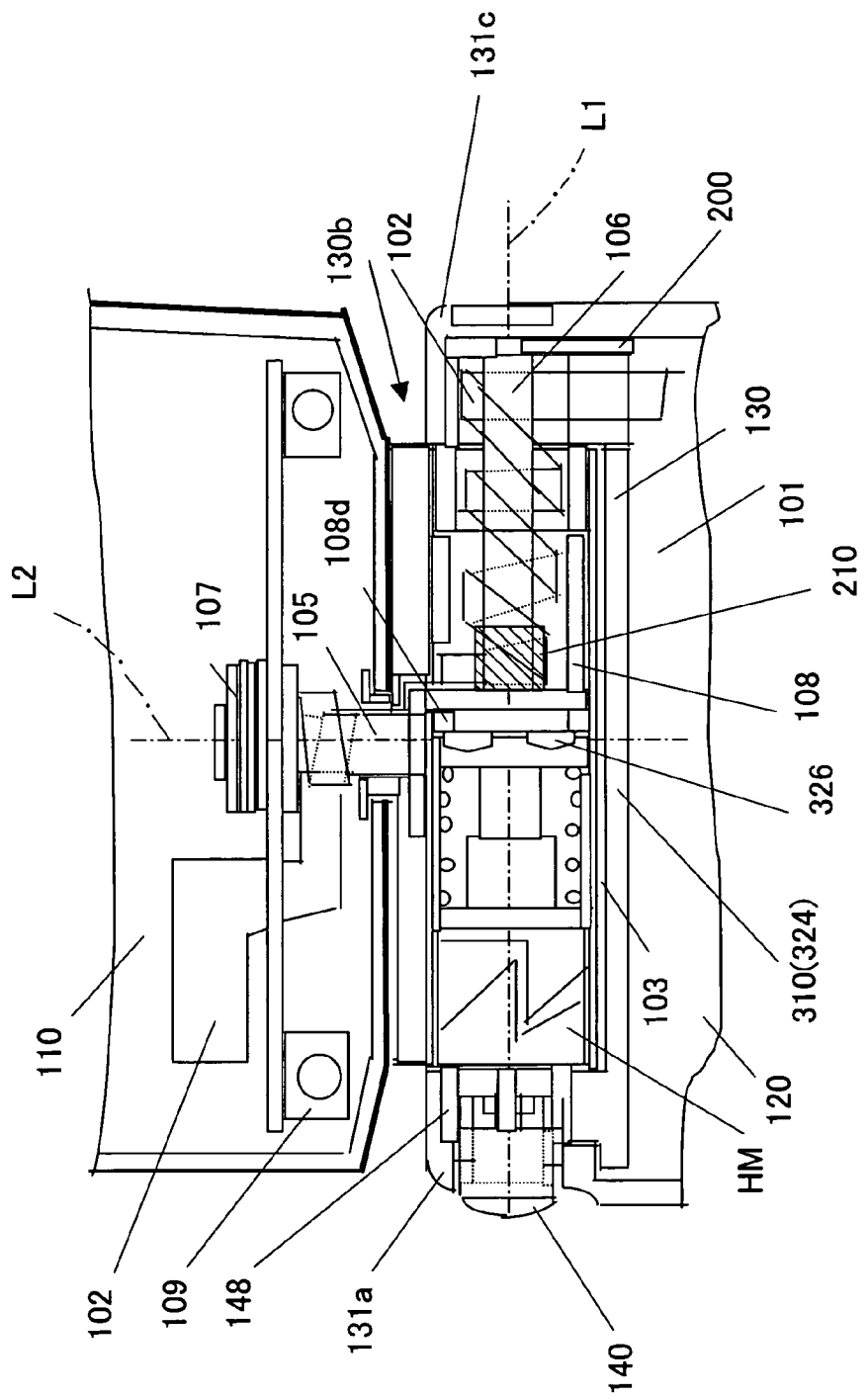
FIG. 31 is an enlarged sectional view of the hinge part shown in FIG. 21 that uses an angled cam instead of a ball cam.

As shown in FIG. 31, the opening permission section 310 that uses an angled cam 324 have similar effects. The angled cam 324 uses a cone cam 326 as an engagement member corresponding to balls 314 in the ball cam 312. A groove plate has a cone groove corresponding to the cone cam 326, and a coil spring forces the cone cam 326 against the groove and engages the cone cam 326 with the groove. Since the structure and operation are similar to those in the ball cam 312, a description thereof will be omitted.

A description will now be given of operations of the inventive PDC 100. A description will now be given of the PDC 100 that includes the hinge part 130 shown in FIG. 4. Initially, the movable-side housing 110 is folded over the fixed-side housing 120.

In one touch opening, a user presses the push button 140. Then, the push button 140's engagement nails 142 are inserted into the outer cam 150's guide grooves 152, and disengage the arms 158d of the lock 157 from the guide grooves 152, unlocking the inner cam 160. The compression spring 170 applies the compression force to the convexes 167a, 167b of the counter cam 166 arranged on the inclined surface of the outer cam 150 in a downward direction on the inclined surface. Since the inner cam 160 is unlocked, the convexes 167a, 167b slide down to the indents 154c, 154d along the inclined surface on the outer cam 150 while pressing the inner cam 160. This movement and rotation of the counter cam 166 correspond to the best call angle of about 160°, and transmit to the free stop cam 176 that contacts the free stop cam 172 via the compression spring 170 with a predetermined contact force. The free stop cams 172 and 176 rotate together. As a result, the convex 131b fixed on the free stop cam 176 rotates with the free stop cam 176, and opens the movable-side housing 110 up to the best call angle in a non-stop motion. When the movable-side housing opens up to the best call angle, the rotational stop means (not shown) stops rotations of the groove plate 318 and thus the movable-side housing 110 stops opening.

Since the damper 200 provides a damper effect, reduces the reaction at the opening time, and improves the safety. A damper effect in a limited angular range, like the damper 210B, shortens the open time. Since the movable-side housing 110 opens at the best call angle, a user immediately starts calling with improved operability.

In an attempt to manually close the movable-side housing 110 that has opened by the best call angle, the convex 131b and the free stop cam 176 rotate together. Since the compression spring 170 brings the free stop cam 172 into contact with the free stop cam 176, the free stop cam 172 rotates with the free stop cam 176 without free stop function. The free stop cam 172 is engaged with the counter cam 166 via the arms 173b and legs 168b, the rotational force of the free stop cam 172 transmits to the counter cam 166. Thereby, the convexes 167a, 167b of the counter cam 166 slide up on the inclined surface of the inner cam 160, and return to the state shown in FIG. 10.

When a user attempts to manually open the movable-side housing 110 from the initial state, the guide grooves 152 in the outer cam 150 are engaged with the arms 158d of the lock 157 and thus the inner cam 160 is locked. The convexes 167a, 167b of the counter cam 166 are locked at dents between the hills 154a and 154b of the outer cam 150 and the hills 162a and 162b of the inner cam 160. Therefore, the user's force is used to relatively rotate the free stop cams 172 and 176.

At an opening angle of the movable-side housing 110 between 0° and 20°, the projections 173d of the free stop cam 172 are located within the dimples 177b in the free stop cam 176, and the compression spring 170 applies a correction force to correct an angular shift between them. As a result, a torsion resetting force applies between the free stop cams 172 and 176, and the movable-side housing 110 is subject to a force resetting to 0°.

At an opening angle of the movable-side housing 110 between 20° and 140°, the projections 173d of the free stop cam 172 are located outside the dimples 177b in the free stop cam 176, and the free stop function maintains the projections 173d on the base 177's surface at an arbitrary angle under a compression (or contact) force of the compression spring 170. Thereby, a user can enjoy the Internet with the PDC 100 placed on the desk, and a camera function using the lens 119.

At an opening angle of the movable-side housing 110 between 140° and 160°, the projections 173d of the free stop cam 172 are located within the opposite dimples 177b in the free stop cam 176, and thus the compression spring 170 applies a correction force to correct an angular shift between them. As a result, a torsion resetting force applies to the free stop cams 172 and 176, and the movable-side housing 110 is subject to a force resetting to 160°. A user can feel a click at 160°. The damper effect works in the free stop action.

Figure 32:
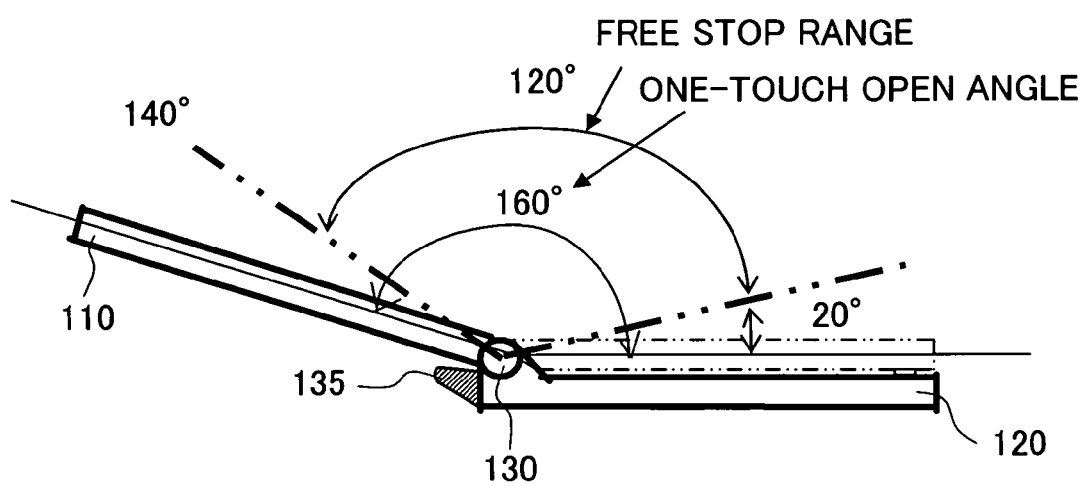
FIG. 32 is a schematic side view for explaining an effect of the part shown in FIG. 4.

The movable-side housing 110 that has opened by 160° is manually closed in the similar manner to the above: At an opening angle of the movable-side housing 110 between 140° and 160°, the movable-side housing 110 is subject to a force resetting to 160°. The free stop function works at an opening angle of the movable-side housing 110 between 20° and 140°. At an opening angle of the movable-side housing 110 between 20° and 0°, the movable-side housing 110 is subject to a force resetting to 0°. A user can feel a click at 0°. FIG. 32 summarizes the above effects.

A description will now be given of the PDC 100 that has the hinge part 130 shown in FIG. 17. The damper bush of the damper part 210 is connected indirectly to the shaft 106. Initially, the movable-side housing 110 is folded over the fixed-side housing 120.

A one touch open action is similar to the above, and the counter cam 166A moves on the surface S10 of the outer cam 150 in FIG. 20. The damper 210B provides a damper effect at 90° or larger in this embodiment. In manually closing the movable-side housing 110 that has opened by the best call angle, a rotational force transmits from the movable-side housing 110 to the counter cam 166A via the stopper 192 and the engagement part 168c. Other than that, the structure is similar. For example, the counter cam 166A similarly slides up along the inclined surface of the inner cam 160A.

Suppose that a user attempts to manually open the movable-side housing 110 from the initial state. The guide grooves 152 in the outer cam 150 are engaged with the arms 158d of the lock 157, and the inner cam 160 is locked. The convexes 167a, 167b of the counter cam 166 are locked at dents between the hills 154a and 154b of the outer cam 150 and the hills 162a and 162b of the inner cam 160. When the user applies an additional force, the convexes 167a, 167b climb over the hills 162a and 162b of the inner cam 160. This state corresponds to a straight line S21 in FIG. 20.

At an opening angle of the movable-side housing 110 between 0° and 20°, the convexes 167a, 167b do not climb over the hills 162a and 162b of the inner cam 160 and the movable-side housing 110 is subject to a force resetting to 0°.

At an opening angle of the movable-side housing 110 between 20° and 90°, the convexes 167a, 167b climb over the hills 162a and 162b of the inner cam 160 and lead to non-stop opening. Such a state corresponds to a straight line S22 in FIG. 20. In this range, the movable-side housing 110 is subject to a force resetting to 90°, and the user can feel a click at 90°.

At an opening angle of the movable-side housing 110 between 90° and 140°, the convexes 167a, 167b are located on the flat surface S23 of the inner cam 160, and the free stop function maintains the convexes 167a, 167b on a surface of the base 177 at an arbitrary angle under a compression (or contact) force by the compression spring 170. Thereby, a user can enjoy the Internet with the PDC 100 placed on the desk, and a camera function using the lens 119. This state corresponds to a straight line S23 in FIG. 20.

At an opening angle of the movable-side housing 110 between 140° and 160°, the convexes 167a, 167b on the inclined surface S24 on the inner cam 160 provide non-stop opening. This state corresponds to the straight line S24 in FIG. 20. In this case, the damper 210b provides a damper effect. The user can feel a click at 160°.

Figure 33:
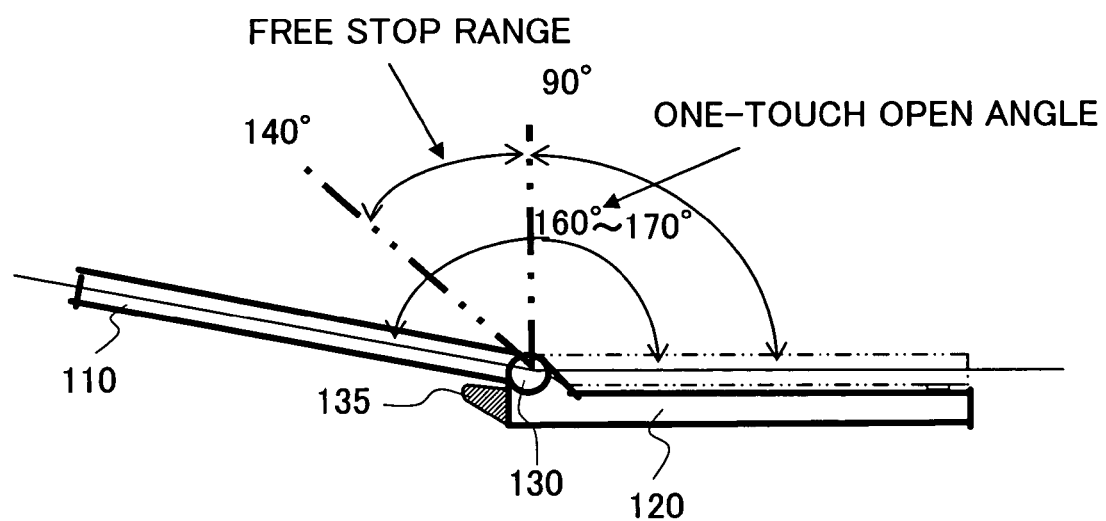
FIG. 33 is a schematic side view for explaining an effect of the part shown in FIG. 17.

The movable-side housing 110 that has opened by 160° is manually closed in the manner similar to the above: At an opening angle of the movable-side housing 110 between 140° and 160°, the movable-side housing 110 is subject to a force resetting to 160°. A free stop function works at an opening angle of the movable-side housing 110 between 90° and 140°. At an opening angle of the movable-side housing 110 between 20° and 90°, the movable-side housing 110 is subject to a force resetting to 90°. At an opening angle of the movable-side housing 110 between 20° and 0°, the movable-side housing 110 is subject to a force resetting to 0°. The user can feel a click at 0°. FIG. 33 summarizes the above effects.

When the movable-side housing 110 that has opened at the best call angle is subject to a large rotation moment greater than the predetermined rotation moment in the further opening direction for some reasons, the balls 314 of the ball cam 312 come off from the groove 316 in the groove plate 318 and the holding plate 322 rotates. As the holding plate 322 rotates, the movable-side housing 110 rotates and reduces the load in the opening direction until the stopper 135 contacts the rear surface 110b of the movable-side housing 110. The hinge part 130 including the movable-side housing 110 and the orthogonal axis 105 is prevented from getting damaged. When the rotation moment decreases below the predetermined rotation moment, the coil spring 320's force resets the balls 314 to the groove 316 and the movable-side housing 100 resets to the best call angle.

Figure 34:
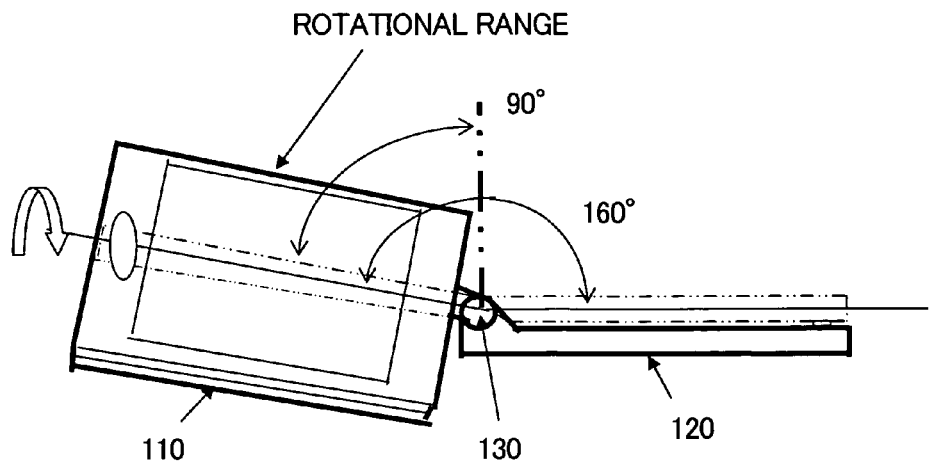
FIG. 34 is an exploded perspective view for explaining the reinforcing bracket attached to the hinge cover.
Figure 35:
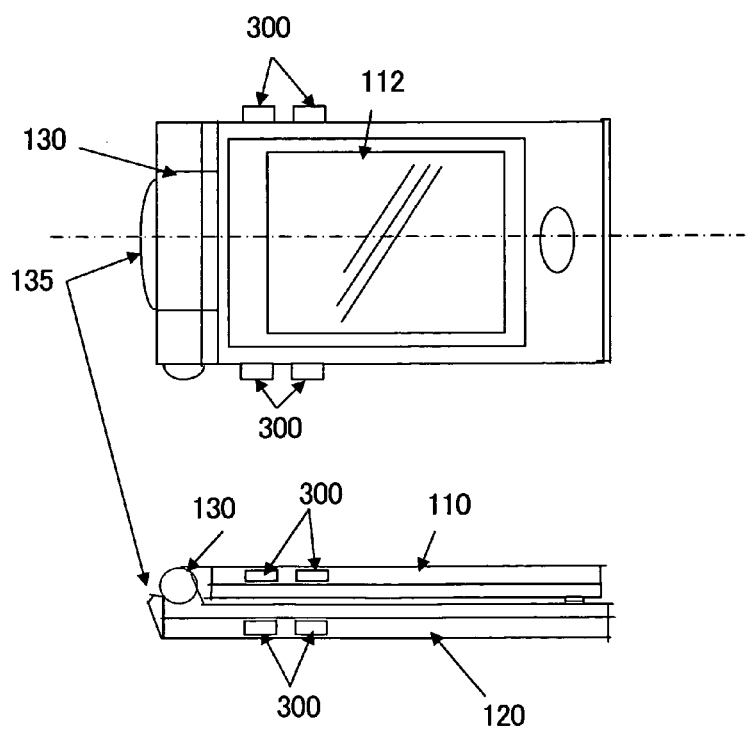
FIG. 35 is a perspective view of the portable phone that folds the movable-side housing while facing an LCD display to a front side.

After the one touch opening part rotates the movable-side housing 110 by 160°, the movable-side housing 110 can be twisted between 0° and 180° as shown in FIG. 34. Thereby, a user can view the LCD screen 112 on the movable-side housing from any direction. During twist, a cam part in the bearing 107 of the auxiliary rotational part 101 provides clicks at 90° and 180°. As shown in FIG. 35, the movable-side housing 110 can be folded while twisted by 180°. Thereby, a user can view the LCD screen 112 in a compact state that folds the PDC 100. For example, the user can enjoy the Internet and game, etc. by operating operational buttons provided at a side surface of the movable-side housing 110 and the fixed-side housing 120.

Figure 36:
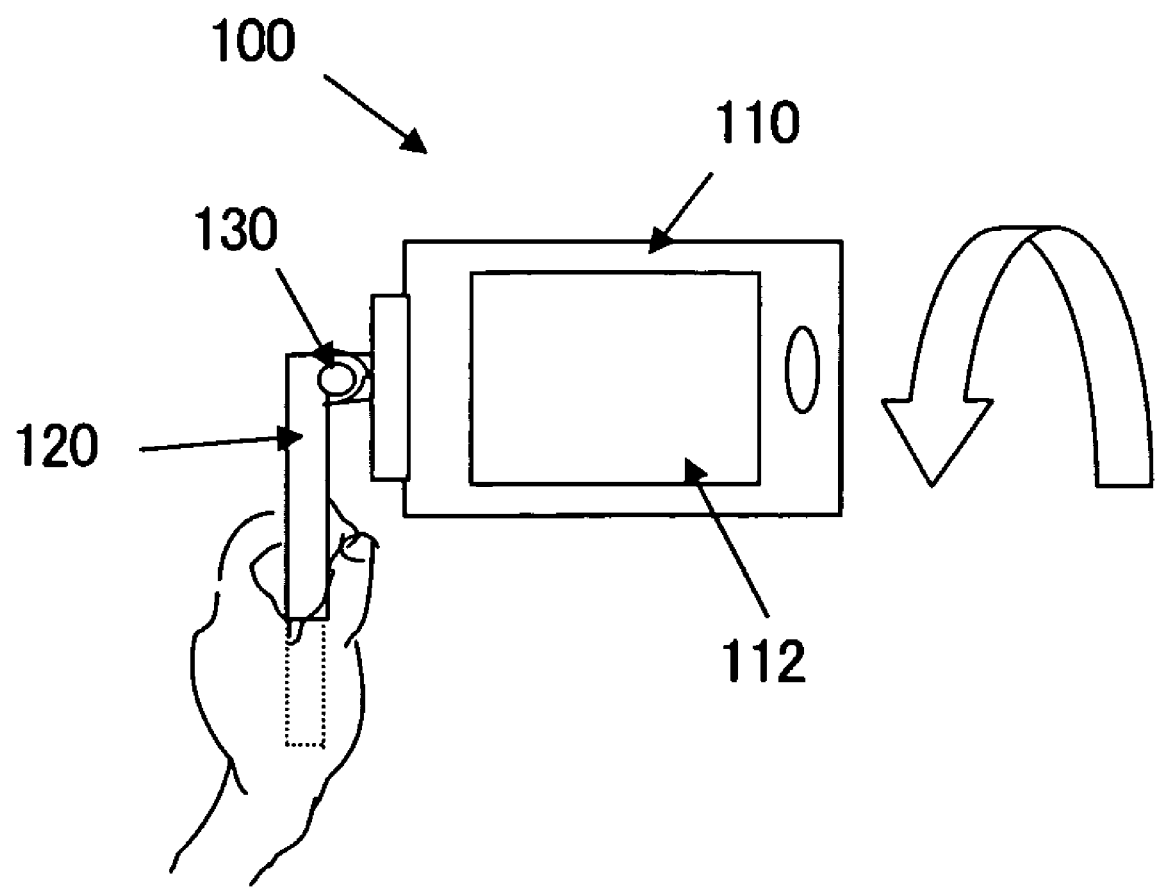
FIG. 36 is an explanatory view of a use example of this portable phone that enables the movable-side housing to be rotated for camera photographing while an LCD screen is viewed.

Even after the free stop part freely stops the movable-side housing 110, the movable-side housing 110 can be twisted at that position. For example, the user easily takes a still or motion picture with the PDC 100's camera function, while holding the fixed-side housing 120, as shown in FIG. 36, and viewing the LCD screen 112.

First Variation of Opening Permission Section

Figure 37:
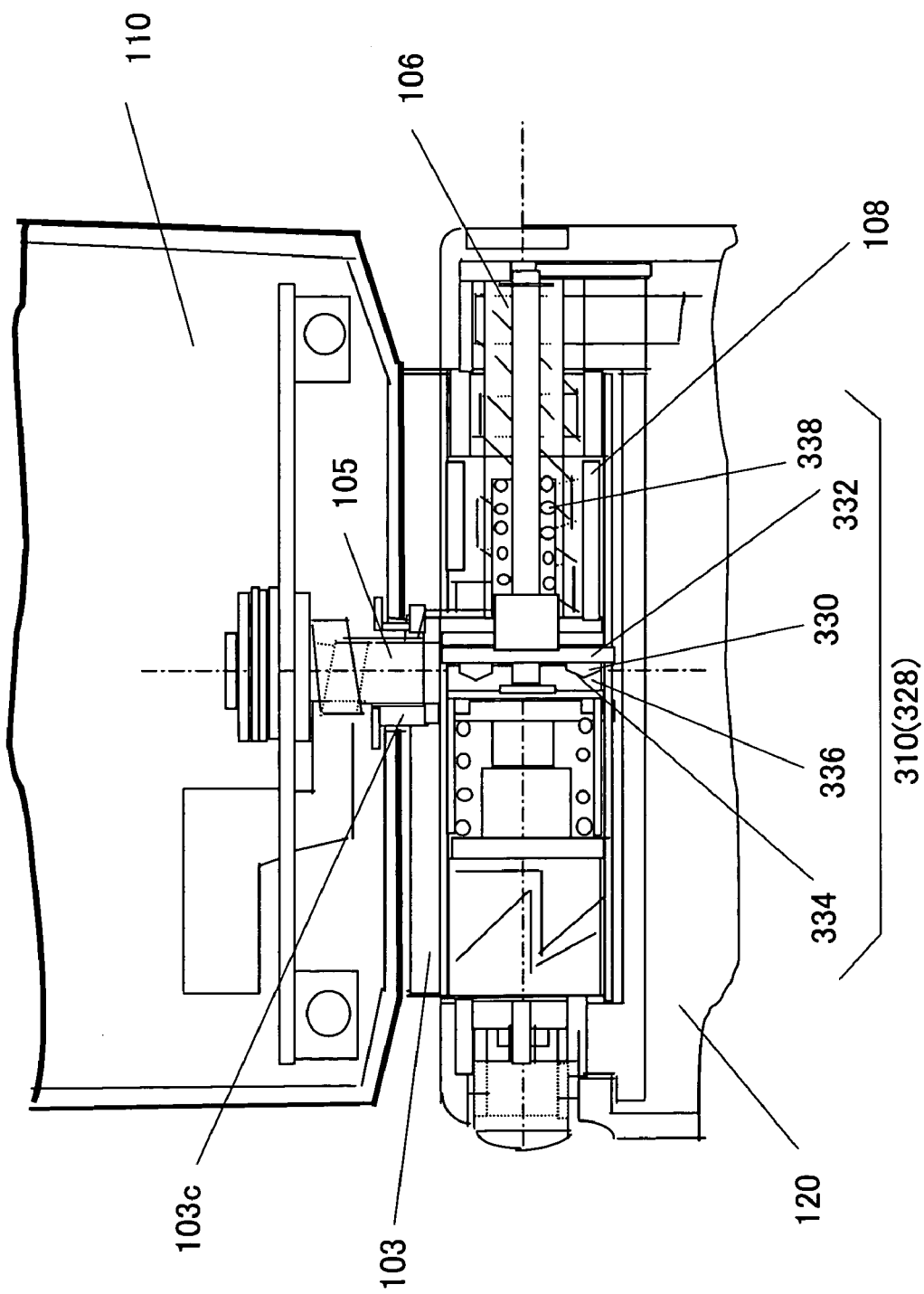
FIG. 37 is a schematic sectional view of an angled cam as one exemplary opening permission section of a first variation according to the present invention.

FIG. 37 shows a structure of the hinge part 130 that has an angled cam 328 as a first variation of the opening permission section. This hinge part 130 separates the hinge cover 103 from the cylindrical part 103c, and provides the cylindrical part 103c in the bobbin 108. The angled cam 328 includes a holding plate 332 that forms a cone cam 330 on its surface, a groove plate 336 that forms a cone groove 334 engageable with the cone cam 330, and a coil spring 338 that engages the cone cam 330 with the groove 334.

The shaft 106 is partially hollow, which accommodates the coil spring 338, which forces the holding plate 332 against the groove plate 336. The holding plate 332 is fixed onto the bobbin 108, and rotates with the bobbin 108 as the movable-side housing 110 opens. The coil spring 338 rotates the groove plate 336 with the holding plate 332 up to the best call angle. This is realized when the (escape) torque generated by an engagement force between the cone cam 330 and the groove 334 is set greater than the torque generated by a rotational force of the outer cam 150 and the inner cam 160A. However, when the movable-side housing 110 opens larger than the best call angle, a rotation stop means (not shown) stops rotations of the outer and inner cams 150 and 160A and groove plate 336 and the movable-side housing 110 stops opening. Thereby, the opening angle of this PDC 100 is maintained to be the best call angle, and a user can comfortably place a call and execute other operations. At this time, the stopper 135 does not contact the rear surface 10b of the movable-side housing 110, as shown in FIG. 15.

With the large load or rotation moment for further opening the movable-side housing 110, the cone cam 330 of the angled cam 324 comes off from the groove 334 in the groove plate 336 and the holding plate 322 can further rotate. As the holding plate 332 rotates, the movable-side housing 110 rotates and reduces the load in the opening direction until the stopper 135 contacts the rear surface 110b of the movable-side housing 110.

Figure 38:
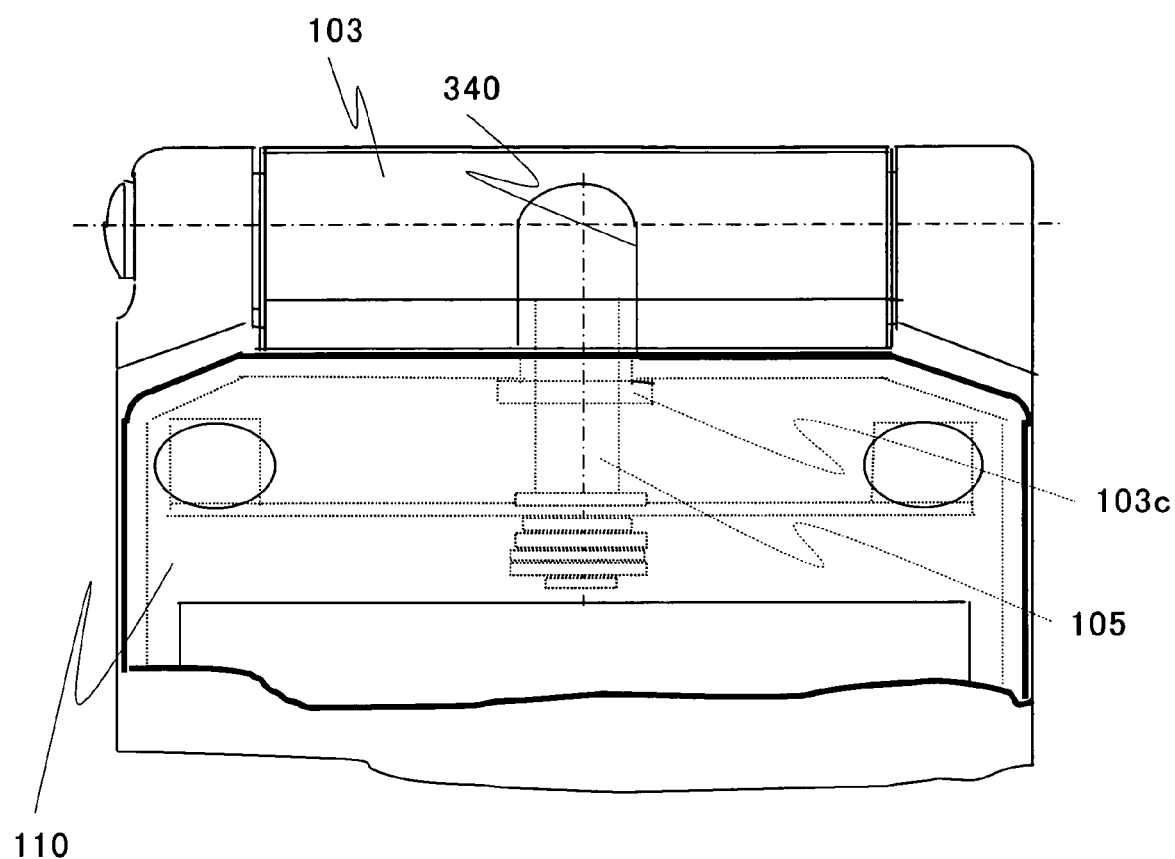
FIG. 38 is a top view for explaining the hinge part that has a U-shaped recess in the portable phone shown in FIG. 37.

As the holding plate 332 rotates, the bobbin 108, orthogonal axis 105, cylindrical part 103c rotate accordingly, whereas the hinge cover 103 that is a separate member from the cylindrical part 103c does not rotate. As shown in FIG. 38, the hinge cover 103 forms a recess of a U-shaped groove that enables the orthogonal shaft 105 and the cylindrical part 103c to rotate independent of the hinge cover 103.

Figure 39:
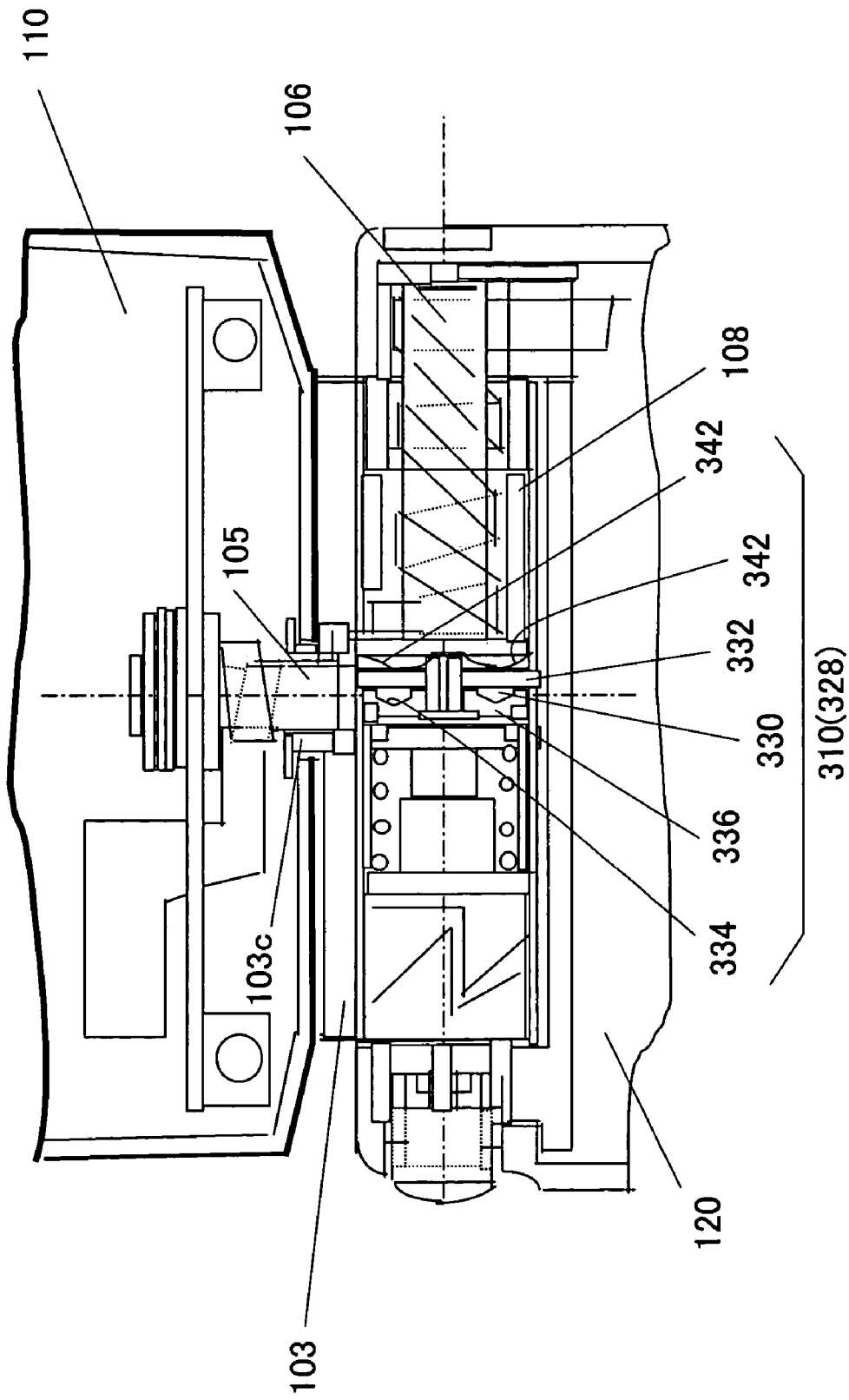
FIG. 39 is a schematic sectional view of the angled cam of another embodiment applicable to the exemplary opening permission section of a first variation according to the present invention.

This angled cam 328 can use a flat spring 342 instead of the coil spring 338, as shown in FIG. 39, for similar effects. In this case, it is not necessary to form a hollow part in the axis 106, and the flat spring 342 can be arranged between the bobbin 108 and the holding plate 332.

Second Variation of Opening Permission Section

Figure 40:
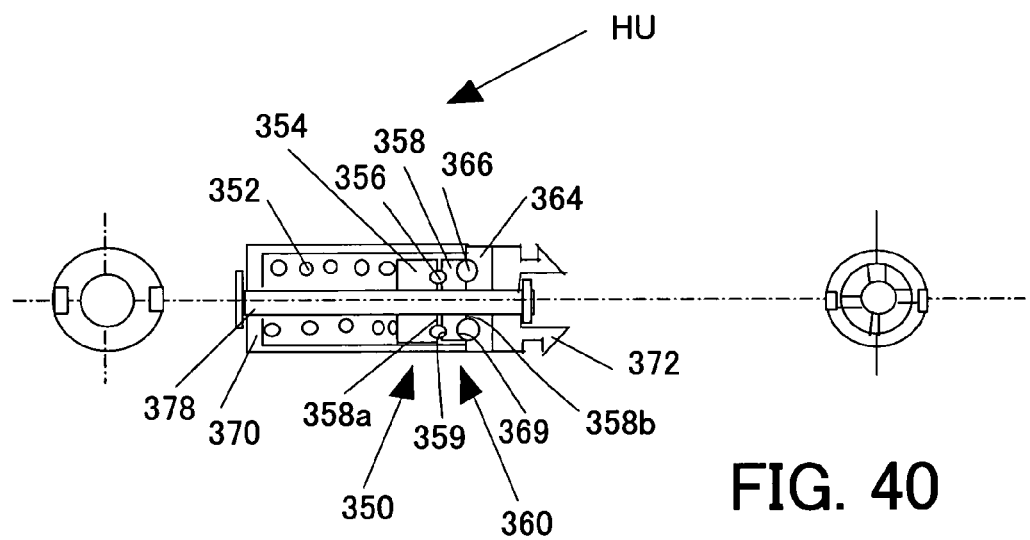
FIG. 40 is sectional and side views of a hinge unit used for an exemplary opening permission section of a second variation according to the present invention.

The hinge unit HU can be configured as shown in FIG. 40 when the hinge part 103 needs a free stop part and does not need a one touch open part. This hinge unit HU accommodates two ball cams 350 and 360. The ball cam 350 serves as a free stop part, whereas the ball cam 360 serves as an opening permission section 310.

A coil spring 352 forces a holding plate 354 of the ball cam 350. The holding plate 354 holds balls 356, which are engageable with an approximately semispherical groove 359 in one surface 358a on a groove plate 358. The other surface 358b on the groove plate 358 forms an approximately semispherical groove 369 engageable with balls 366 of the ball cam 360. The groove plate 358 serves as a groove plate for both of the ball cams 350 and 360. The holding plate 364 holds the balls 366 of the ball cam 360.

The coil spring 354 forces the holding plate 354 against the holding plate 364 via the groove plate 358, and thereby the balls 356 against the groove 359 and the balls 366 against the groove 369. Each ball 356 has a diameter smaller than that of a ball 366. In other words, a moment necessary for the balls 356 to come off from the groove 359 is smaller than a moment necessary for the balls 366 to come off from the groove 369. This is because an engagement force by the ball cam 350 is necessary to maintain the PDC 100 at a folding state or at an opening state at the best call angle, while an engagement force by the ball cam 360 is necessary to protect the orthogonal shaft 105 and movable-side housing 110 from damages.

Figure 41:
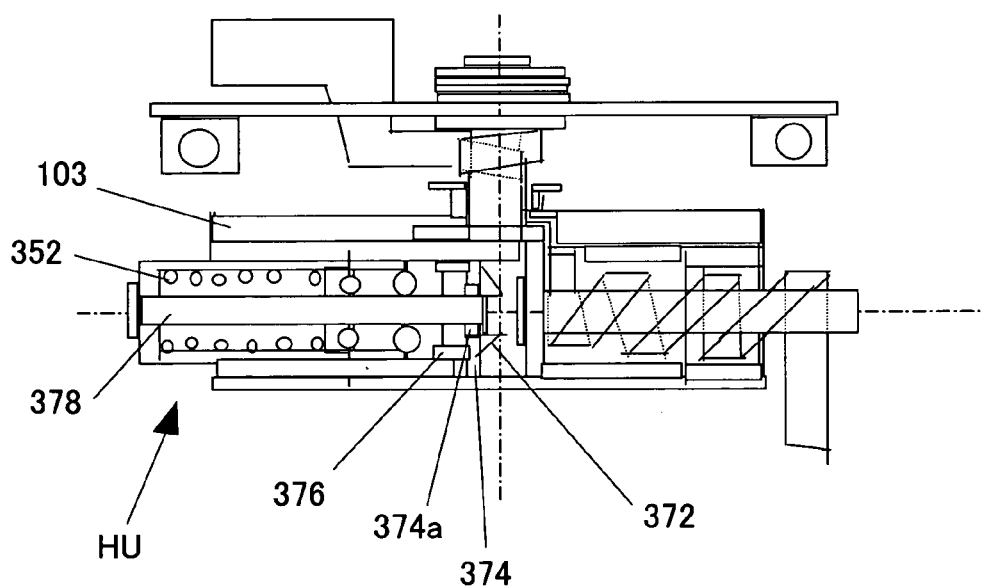
FIG. 41 is a schematic sectional view of the hinge part that uses a hinge unit shown in FIG. 40.

The hinge unit HU is covered with a cover 370 and formed as a unit. An engagement part 372, such as a so-called snap fit, is formed at the end. As shown in FIG. 41, the hinge cover 103 includes a standing surface 374 that forms a hole 374a for engagement with the engagement part 372. The hinge unit HU can be easily mounted by inserting the hinge unit HU into the hinge cover 103 and by engaging the engagement part 372 with the hole 374a.

The standing surface 374 forms a projection 376, which is engageable with an engagement part (not shown) on the holding plate 364 so that the holding plate 364 rotates with the hinge cover 103. The holding plate 354 is connected to the fixed-side housing 120, for example, via the shaft 378, and does not rotate while the movable-side housing 110 rotates.

When the PDC 100 is folded, the balls 356 and 366 are engaged with grooves 359 and 369, respectively. As the movable-side housing 110 opens from this state, the holding plate 354 maintains stationary while the groove plate 358 and the holding plate 364 rotate. The balls 356 first come off from the groove 359, making the movable-side housing 110 openable. The movable-side housing 110 can maintain its arbitrary opening angle from the folded state to the best call angle due to the coil spring 352's force. When the opening angle becomes the best call angle, a rotation stop means (not shown) stops rotations of the groove plate 358. Thereby, the opening angle of this PDC 100 is maintained the best call angle, and a user can comfortably place a call and execute other operations. At this time, the balls 356 are engaged with the groove 359 again, a user can feel a click at an opening angle of the best call angle.

With a large load or rotational moment to further open the movable-side housing 110, the holding plate 364 rotates while the groove plate 358 stops in turn. The balls 366 come off from the groove 369, and allow the movable-side housing 110 to open. Thereby, the load decreases, and the movable-side housing 110 and orthogonal axis 105 are protected from damages. Of course, when the load is eliminated, the balls 366 are again engaged with the groove 369 and the movable-side housing 110 resets to the best call angle.

Third Variation of Opening Permission Section

Figure 42:
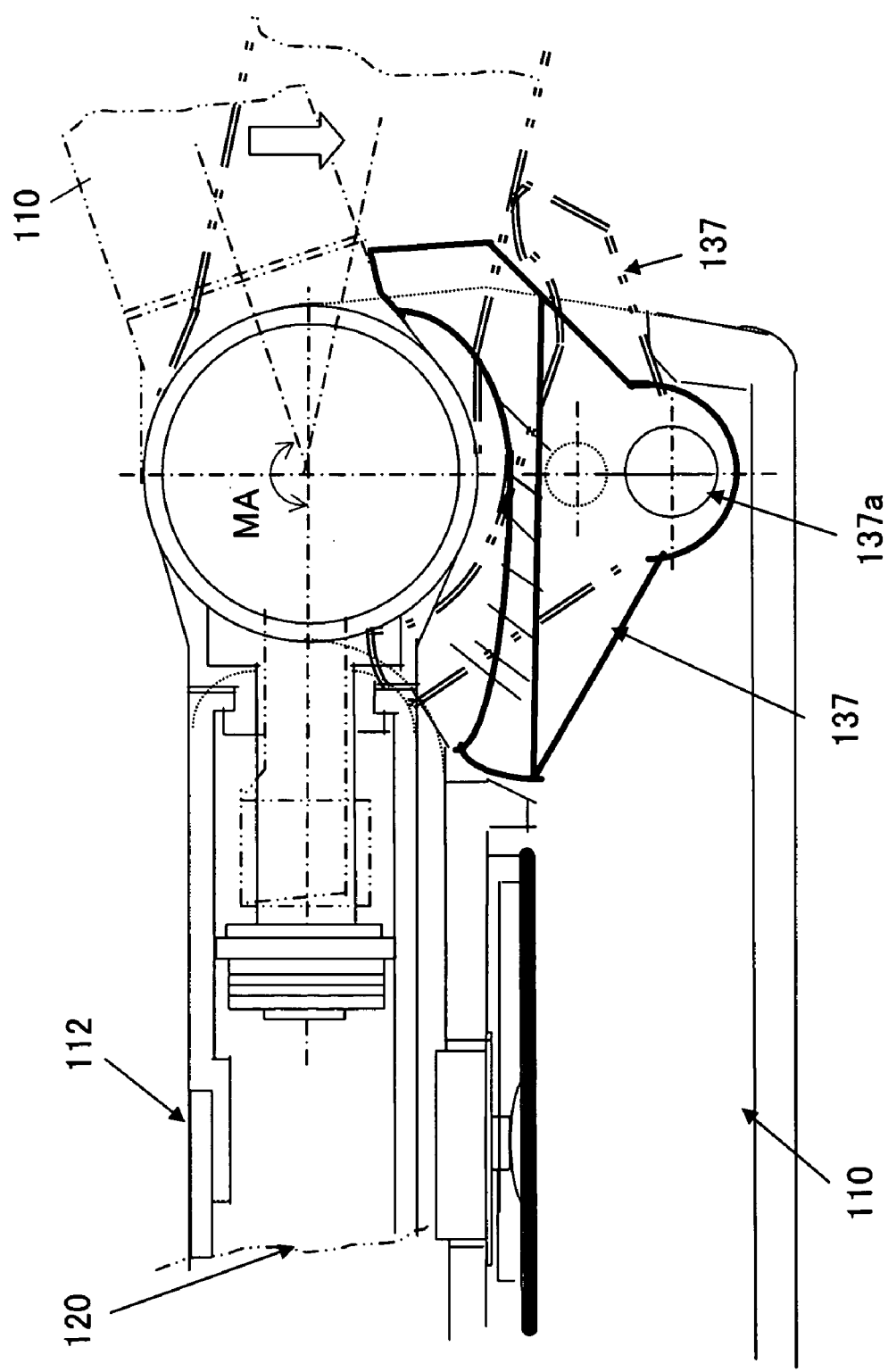
FIG. 42 is a schematic sectional view of a stopper as one exemplary opening permission section of a third variation according to the present invention.

FIGS. 42 and 43 are schematic sectional views near the hinge part 130 that has stoppers 137 and 138 as the opening permission section 310 of a third variation. These stoppers 137 and 138 support a rear surface of the movable-side housing 110, i.e., the rear surface part 10b or the front surface part 110a when the movable-side housing 110 is twisted by 180°.

The opening permission section 310 shown in FIG. 42 includes the stopper 137 that supports the rear surface of the movable-side housing 110. The stopper 137 contacts the movable-side housing 110 having an opening angle of the best call angle, and restricts its further opening. The stopper 137 can pivot around an axis 137a. A torsion coil spring (not shown) is provided onto the stopper 137. One end of the torsion coil spring is fixed onto the fixed-side housing 120 and the other end is attached to the stopper 137. As a result, the stopper 137 is forced to reset to a position shown by a solid line even when it displaces as shown by an alternate long and two short dashes line in FIG. 42.

Figure 44:
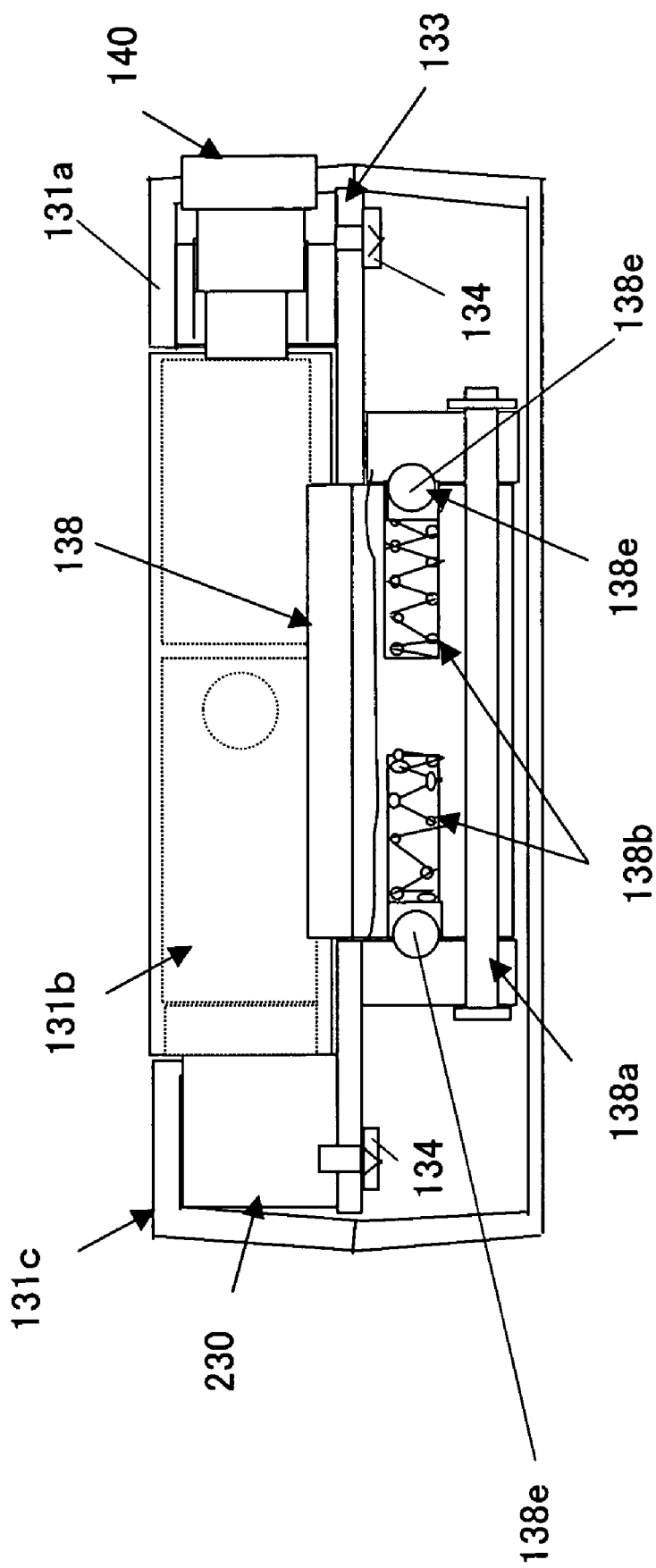
FIG. 44 is a schematic side view of a concrete structure of the stopper shown in FIG. 43.

Similarly, the opening permission section 310 shown in FIG. 43 includes, as shown in FIG. 44, a stopper 138, a compression coil spring 138b, a pair of ball cams 138c, and a pair of blocks 138d. Here, FIG. 44 is a schematic sectional view of one exemplary angular restriction part.

The stopper 138 contacts the movable-side housing 110 with an opening angle of the best call angle, and restricts its further opening. The blocks 138d are fixed on the fixation plate 133, and have semispherical grooves 138e. A shaft 138a is connected to the fixation plate 133, and supports the stopper 138 rotatably. The coil spring 138b forces the ball cams 138c against the grooves 138e in the blocks 138d. The ball cams 138c hold the stopper 138 with the fixation plate 133. The ball cams 138c drop in the grooves 138e, and lock the stopper 138. When the convex 131b in the hinge part 130 contacts and applies the load to the stopper 138, the ball cams 138c come off from the grooves 138e, and move against an elastic force by the coil spring 138b to release the lock. When the stopper 138 resets to the position shown by a solid line in FIG. 43, the ball cams 138c return to the grooves 138e and lock the stopper 138. In general, the torque for the ball cams 138c to escape and the torque for the ball cams 138c to enter can be set so that the escaping torque is greater than the entering torque. A returning torque can be set to the manually returning torque of the stopper 138.

Figure 45:
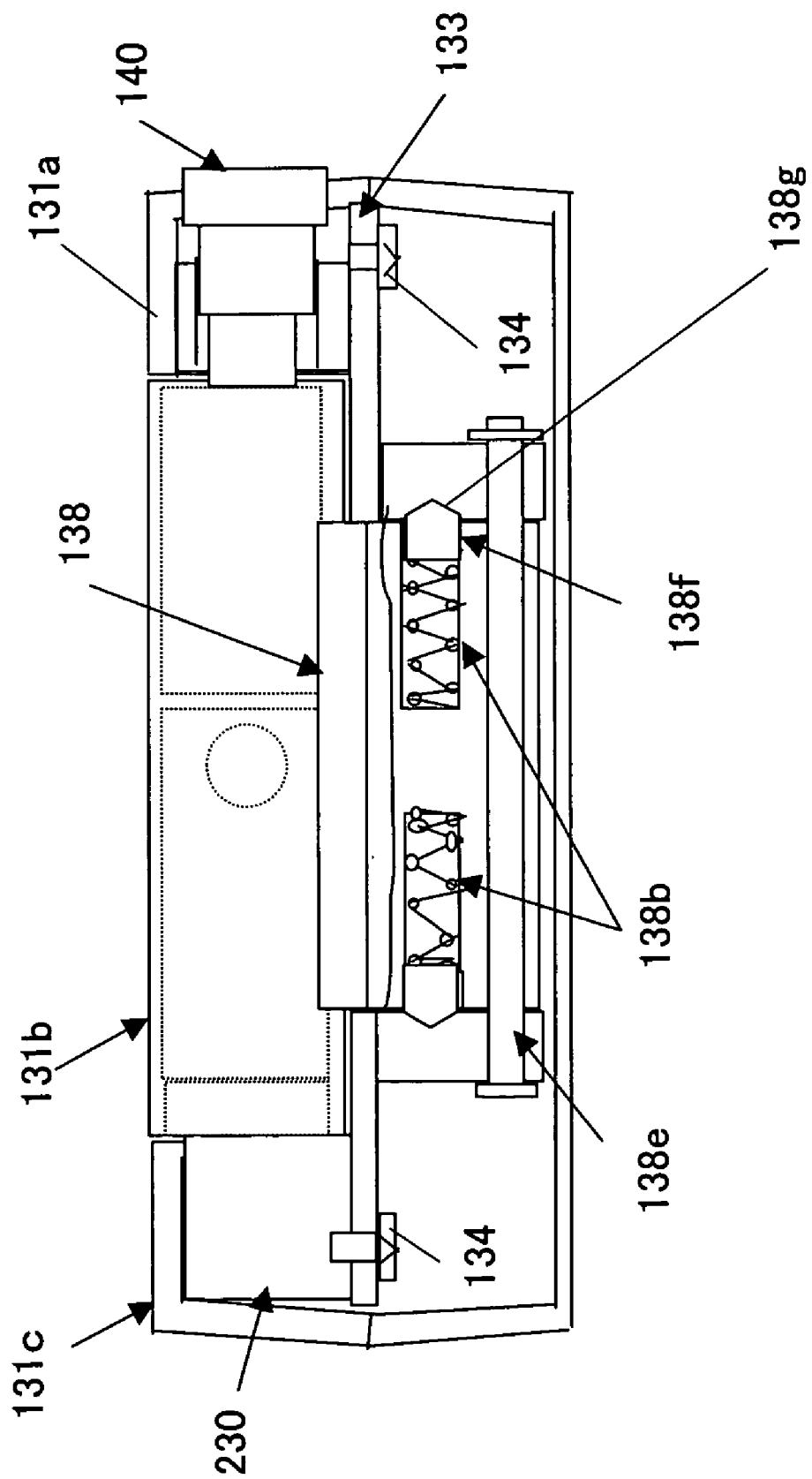
FIG. 45 is a schematic side view of another concrete structure of the stopper shown in FIG. 43.

Of course, the cam can have a shape different from a ball shape. FIG. 45 shows an exemplary angular restriction part that has a cam 138f with an angular section and a groove 138g.

As a result, the stopper 138 is forced to reset to a position shown by a solid line even when it displaces as shown by an alternate long and two short dashes line in FIG. 43.

Further, the present invention is not limited to these preferred embodiments, and various variations and modifications may be made without departing from the scope of the present invention. For example, the present invention is not limited to a PDC, and is applicable to other mobile radio communication apparatuses.

Thus, the present invention can provide a mobile radio communication apparatus that improves operational comfortableness and safety for a call function and a secondary function (such as a camera function) as well as maintaining a miniaturization. More specifically, the one touch opening part quickens opening and, for example, a response to any incoming call. The second housing is conveniently rotatable in various directions around the orthogonal axis orthogonal to the rotational center axis of the hinge part, for example, when this mobile radio communication provides the Internet, photographing, games, etc.

In addition, the opening permission section protects the housing, axis, and each mechanical component in this mobile radio communication apparatus from damages, for example, even when a user applies a large load or rotation moment in the opening direction.

What is claimed is:

1. A mobile radio communication apparatus comprising:
a first housing;
a second housing foldable over said first housing; and
a hinge part that foldably connects said second housing to said first housing around a rotational center axis,
wherein said hinge part includes:
a one touch opening part that automatically opens said second housing from a folded state by a first angle relative to said first housing around the rotational center axis in a non-stop motion;
an auxiliary rotational part that rotates said second housing around an orthogonal shaft orthogonal to the rotational center axis of said hinge part; and
an opening permission section that allows said second housing to open at an angle greater than the first angle relative to said first housing.

2. A mobile radio communication apparatus according to claim 1, wherein said opening permission section allows said second housing to open at an angle greater than the first angle relative to said first housing, when a rotation moment applied to said second housing in an opening direction is equal to or greater than a predetermined rotation moment.

3. A mobile radio communication apparatus according to claim 1, wherein said opening permission section does not allow said second housing to open at an angle greater than the first angle relative to said first housing, when a rotation moment applied to said second housing in an opening direction is smaller than a predetermined rotation moment.

4. A mobile radio communication apparatus according to claim 1, wherein said opening permission section resets an angle between said first and second housings to the first angle, when a rotation moment applied to said second housing in an opening direction changes from a value equal to or greater than a predetermined rotation moment to a value smaller than the predetermined rotation moment.

5. A mobile radio communication apparatus according to claim 1, wherein when said opening permission section allows opening, only said second housing rotates relative to said first housing by the angle greater than the first angle.

6. A mobile radio communication apparatus according to claim 1, wherein when said opening permission section allows opening, both said second housing and said hinge part rotate relative to said first housing by the angle greater than the first angle.

7. A mobile radio communication apparatus according to claim 1, wherein said opening permission section is a stopper provided on said first housing, said stopper supporting a rear surface of said second housing.

8. A mobile radio communication apparatus according to claim 1, wherein the stopper elastically deforms, and allows said second housing to open at an angle greater than the first angle relative to said first housing.

9. A mobile radio communication apparatus according to claim 1, wherein the stopper rotates around a rotational axis parallel to the rotational center axis, and allows said second housing to open at an angle greater than the first angle relative to said first housing.

10. A mobile radio communication apparatus according to claim 1, wherein said opening permission section includes a cam member provided on said hinge part.

11. A mobile radio communication apparatus according to claim 10, wherein said cam member is one of a ball cam and an angled cam.

12. A mobile radio communication apparatus according to claim 1, wherein said hinge part includes a free stop part that maintains said second housing at a second angle different from the first angle relative to said first housing.

13. A mobile radio communication apparatus according to claim 1, wherein said free stop part does not work while said second housing that has been opened by said one touch opening part is being folded.

14. A mobile radio communication apparatus according to claim 9, wherein said free stop part works while said second housing that has been opened by said one touch opening part is being folded.

15. A mobile radio communication apparatus according to claim 1, wherein said hinge part further includes a damper part that brakes an opening action of said second housing by said one touch opening part.

16. A mobile radio communication apparatus according to claim 15, wherein said damper part brakes said second housing when said second housing forms a third angle or larger relative to said first housing.

17. A hinge part that foldably connects a first housing, said hinge part comprising:
   a one touch opening part that automatically opens the second housing from a folded state by a first angle relative to the first housing around the rotational center axis in a non-stop motion;
   an auxiliary rotational part that rotates the second housing around an orthogonal shaft orthogonal to the rotational center axis of said one touch opening part; and
   an opening permission section that allows said second housing to open at an angle greater than the first angle relative to said first housing.

18. A method of opening a mobile communication apparatus, comprising:
   opening automatically a second housing from a folded state by a first angle relative to a first housing around a rotational center axis in a non-stop motion;
   rotating said second housing around an orthogonal shaft orthogonal to the rotational center axis; and
   allowing said second housing to open at an angle greater than the first angle relative to said first housing.

* * * * *